United States Patent

[11] 3,591,109

| [72] | Inventor | Frank W. McLarty |
| | | 634 West 10th St., Apt. 8, Dallas, Tex. 75208 |
| [21] | Appl. No. | 562,939 |
| [22] | Filed | June 29, 1966 |
| [45] | Patented | July 6, 1971 |

[54] ROTARY WING AIRCRAFT
12 Claims, 41 Drawing Figs.

[52] U.S. Cl. .................................................. 244/17.23, 244/17.19
[51] Int. Cl. ...................................................... B64c 27/08
[50] Field of Search ............................................ 244/17.11, 17.17, 17.19, 17.21, 17.23, 17.25, 17.27, 6, 7

[56] References Cited
UNITED STATES PATENTS

| 2,478,847 | 8/1949 | Stuart ............................ | 244/7 |
| 2,623,711 | 12/1952 | Pullin et al. ..................... | 244/17.17 |
| 2,959,373 | 11/1960 | Zuck .............................. | 244/7 |

FOREIGN PATENTS

| 213,656 | 5/1955 | Australia ....................... | 244/17.23 |

Primary Examiner—George E. A. Halvosa
Assistant Examiner—Paul E. Sauberer

ABSTRACT: This invention is a vertical-lift aircraft whose various features operating in cooperative conjunction with each other as illustrated in the drawings make the craft substantially foolproof, so that any sensible owner-operator capable of driving an automobile safely can fly one of said aircraft with almost perfect safety, even though he or she may never have been off the ground previously.

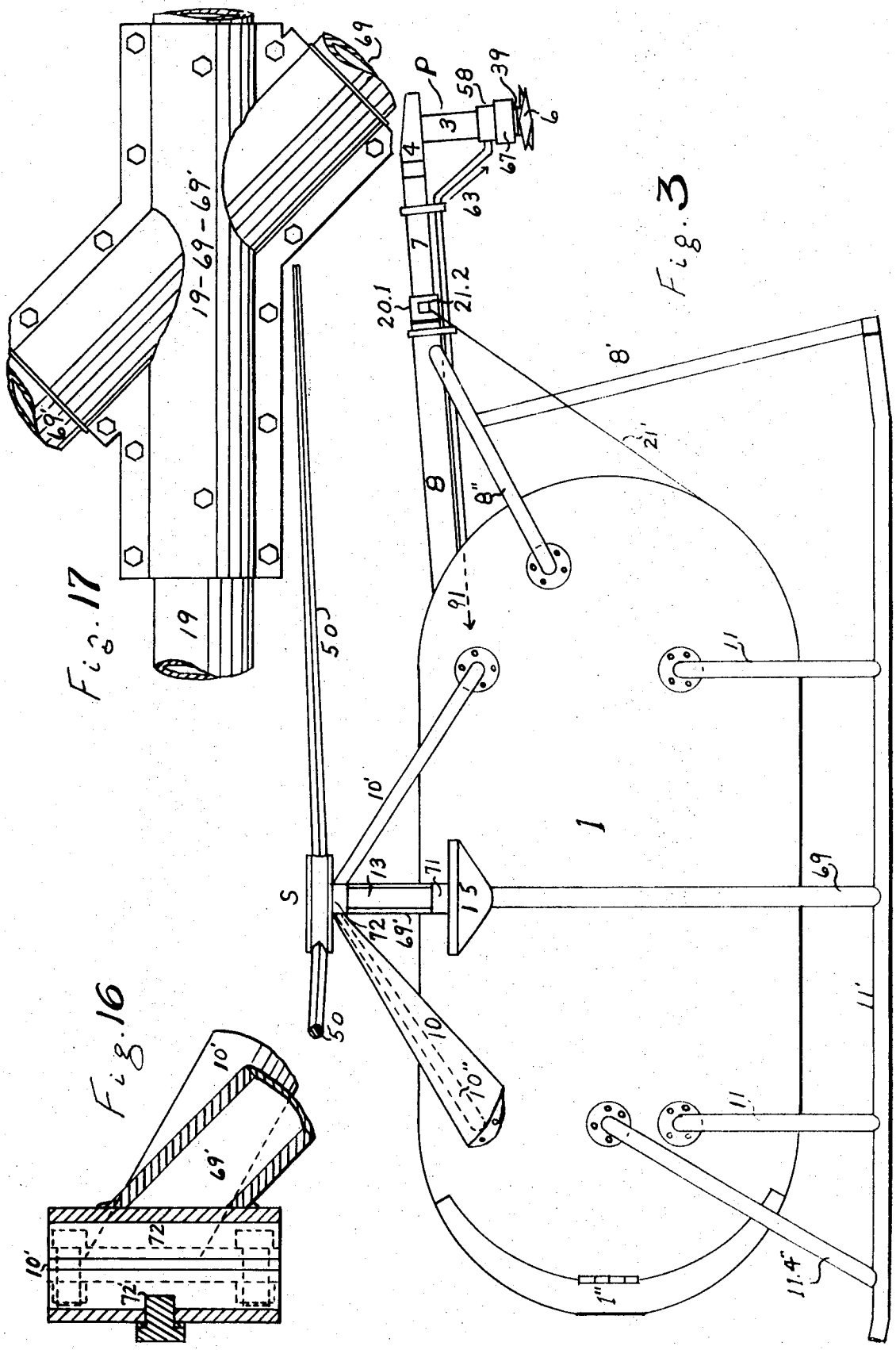

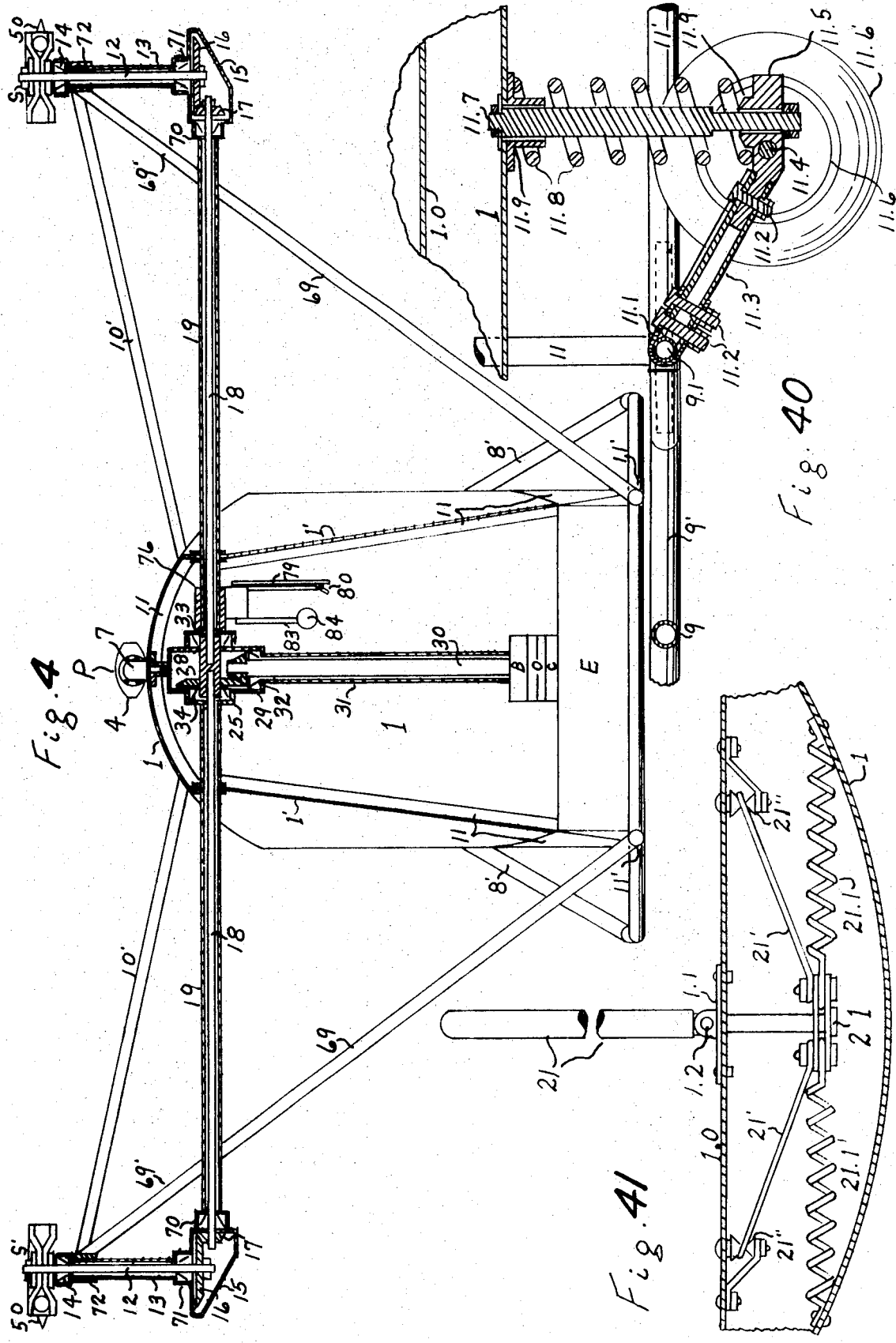

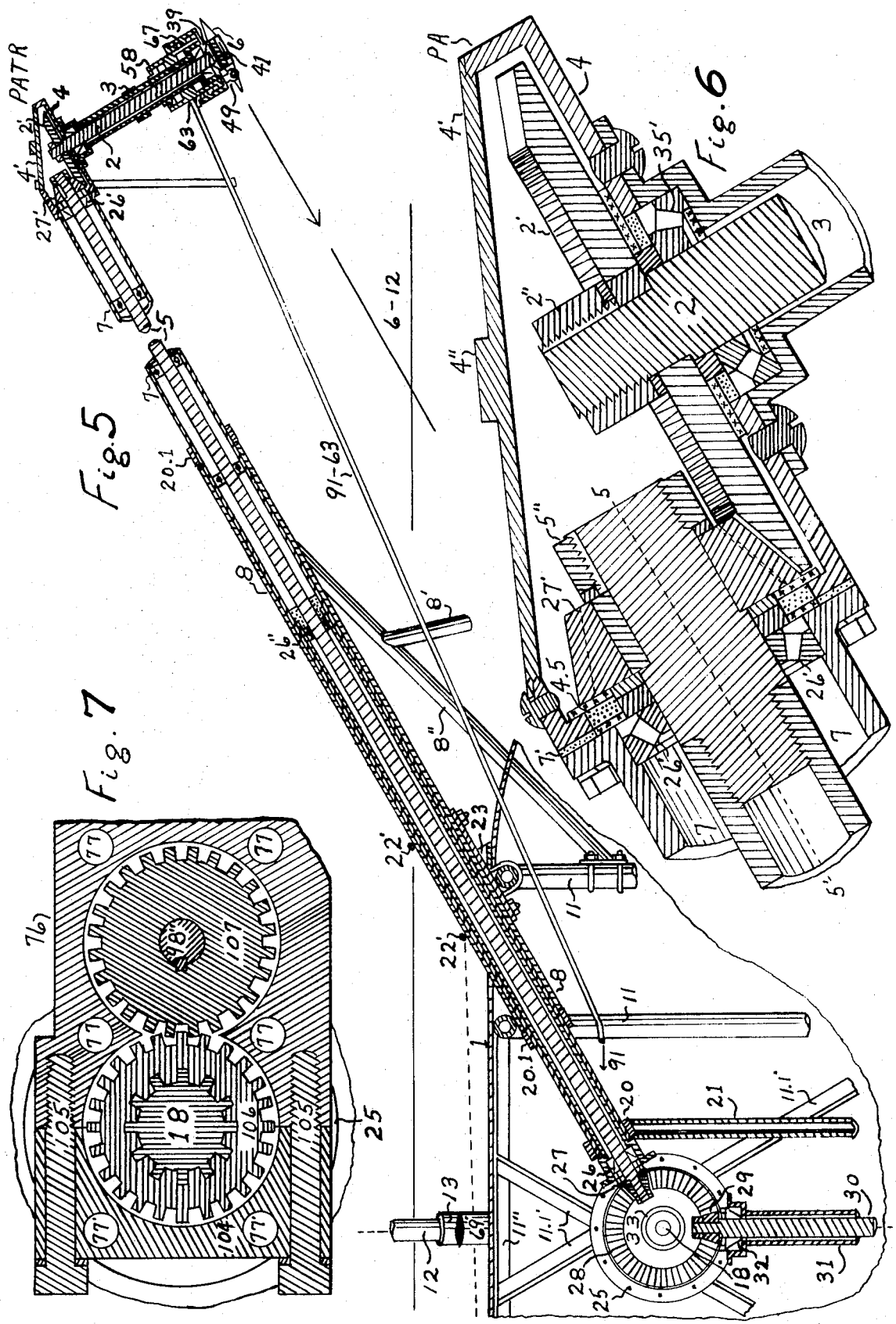

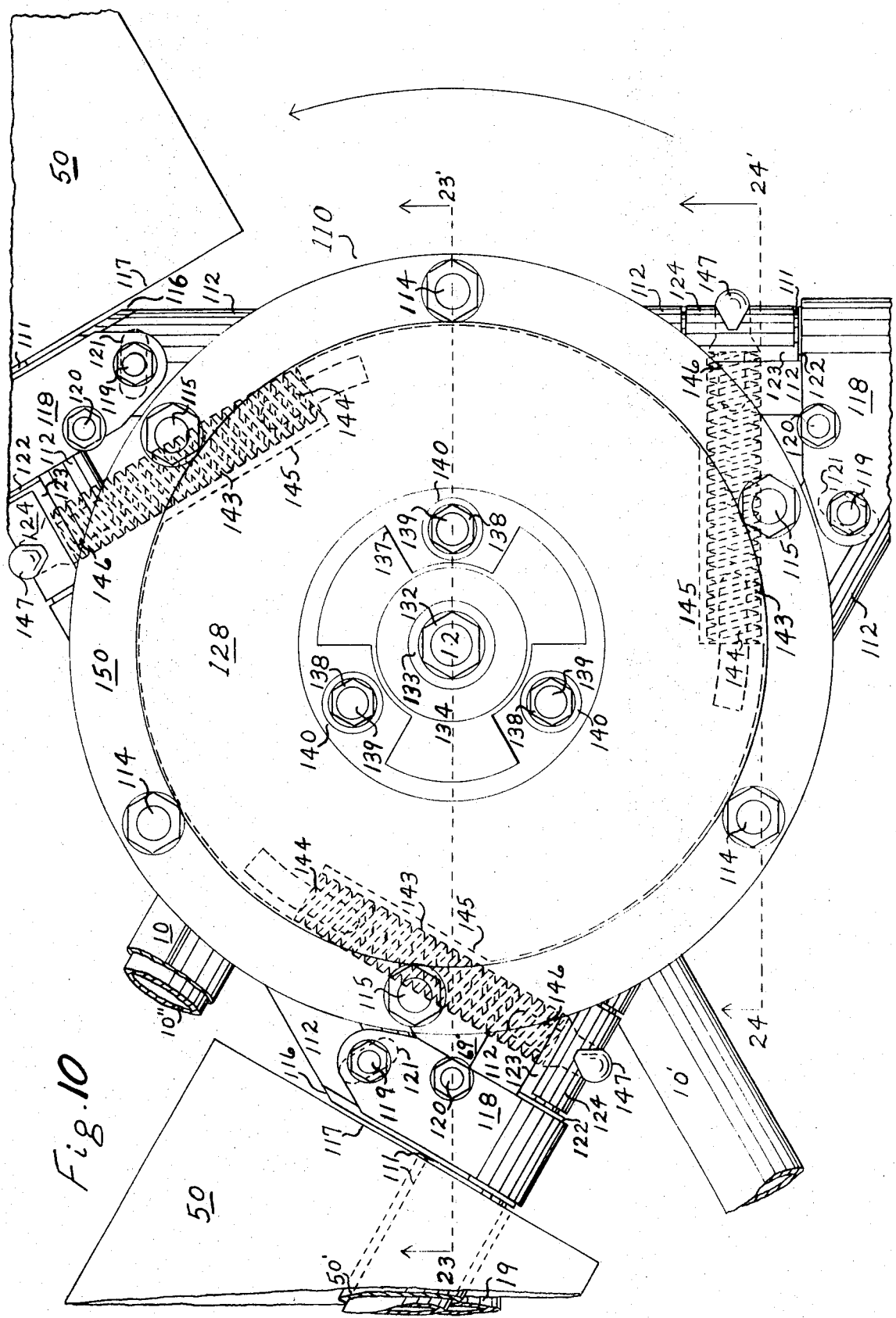

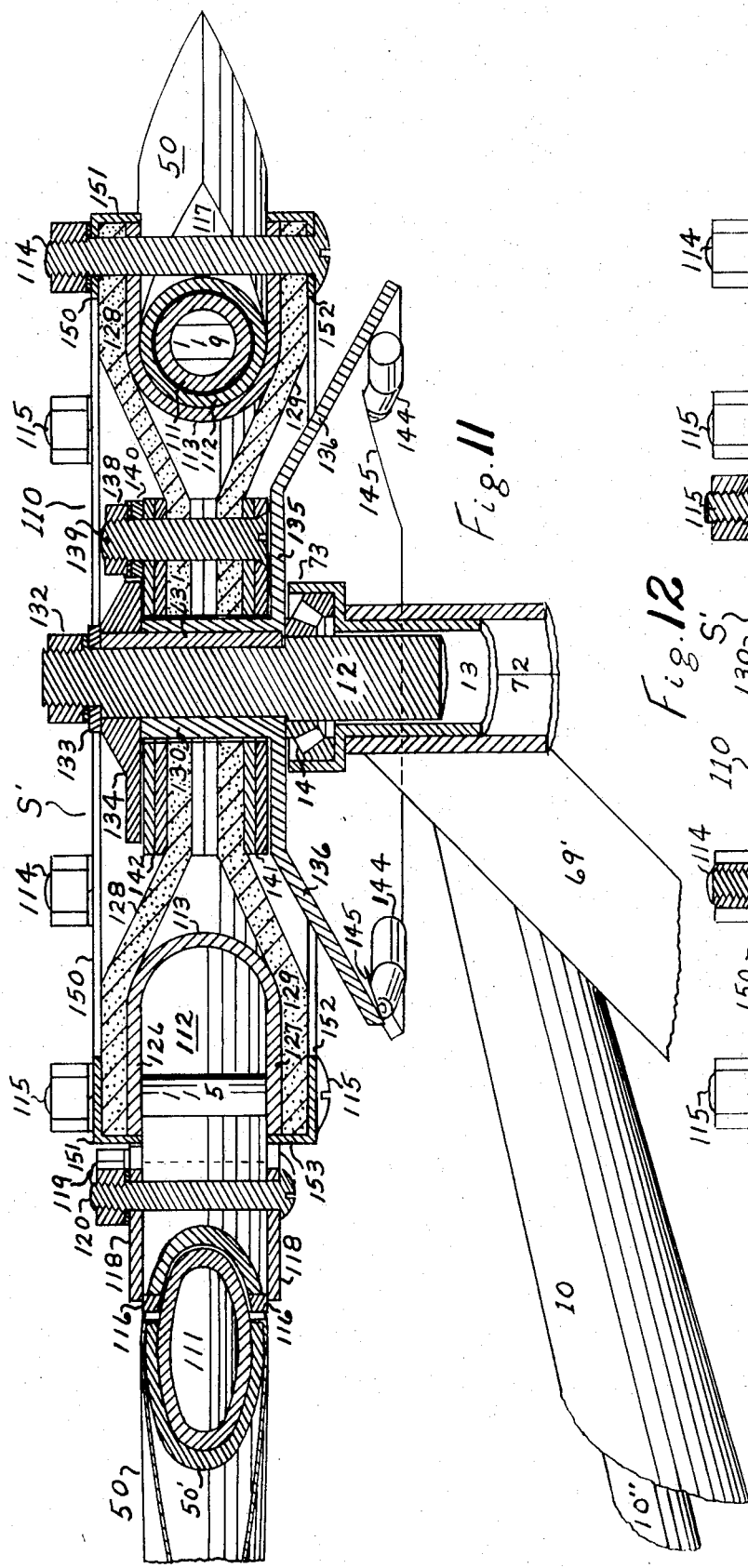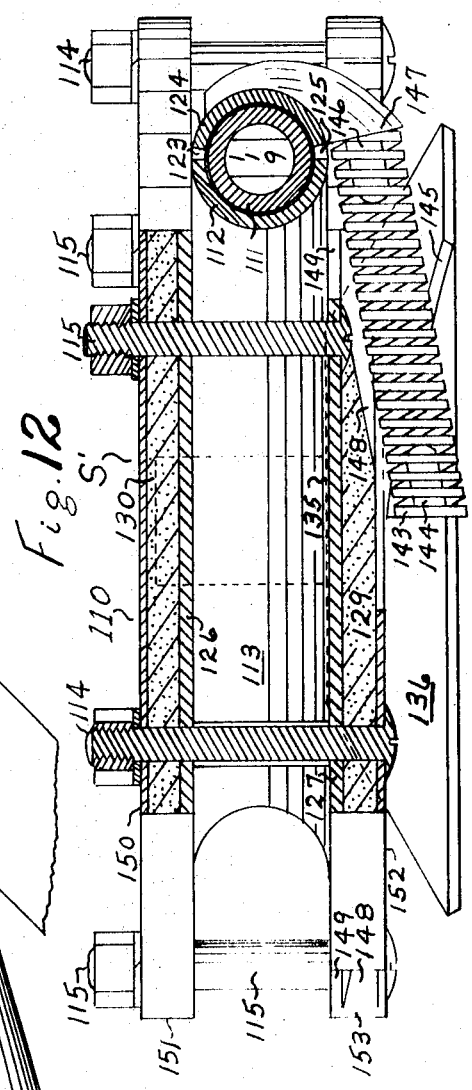

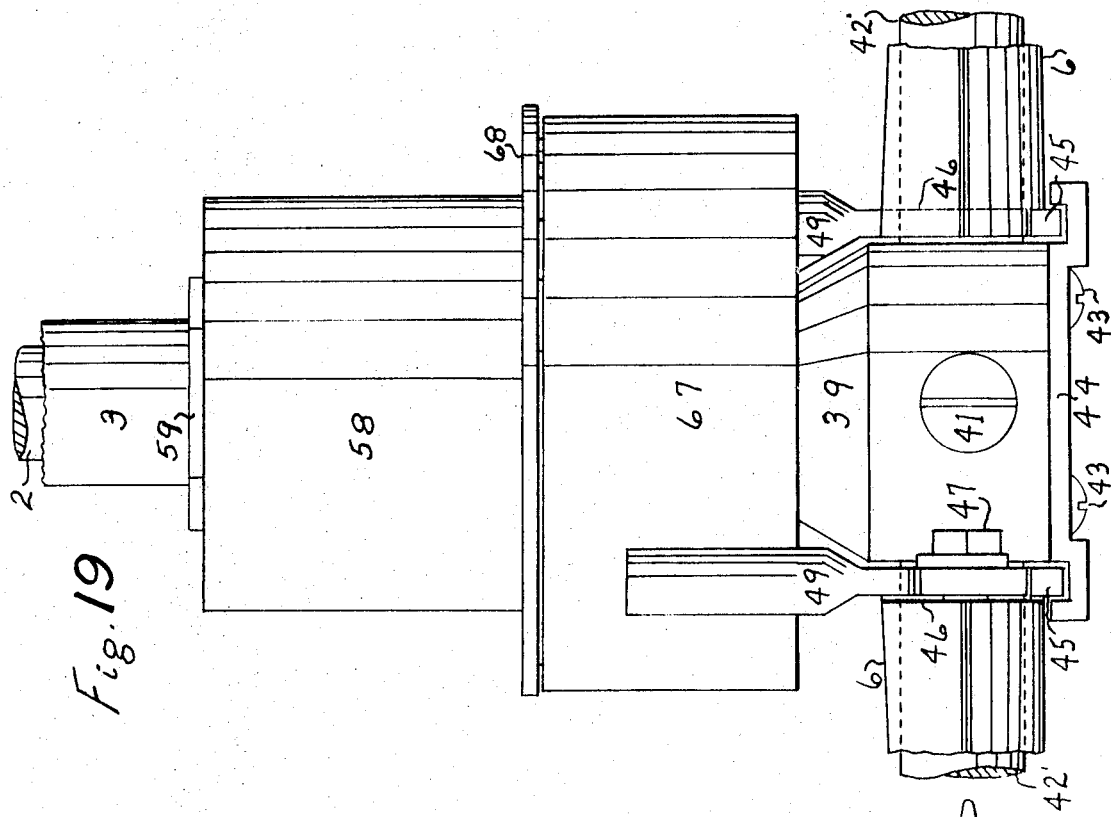

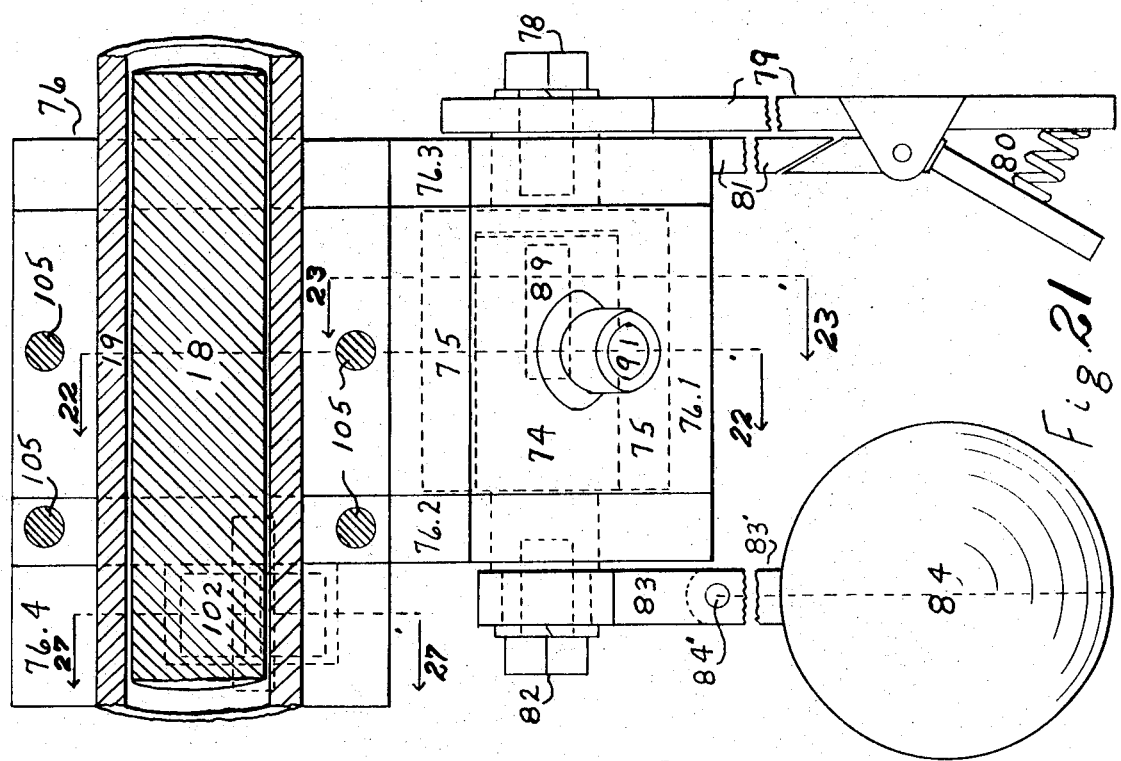
Fig. 21
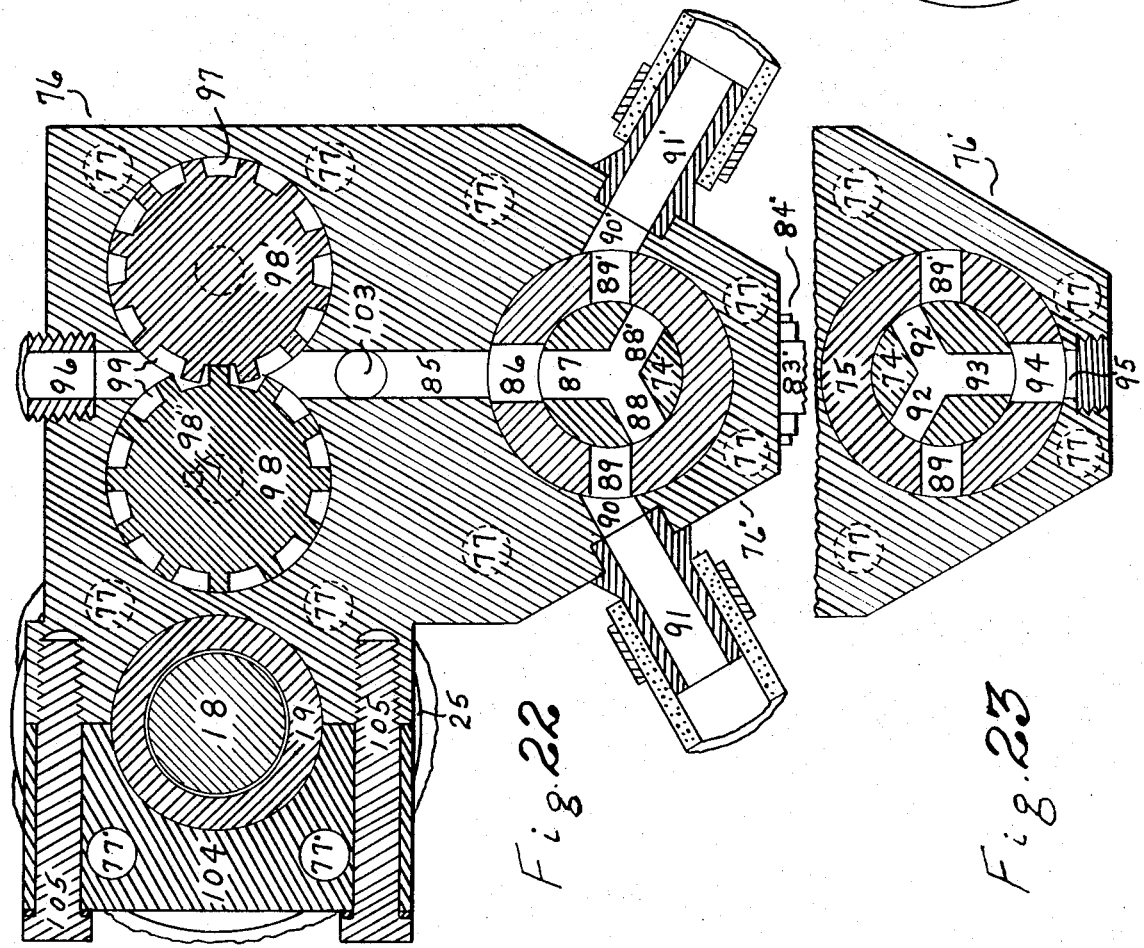
Fig. 22
Fig. 23

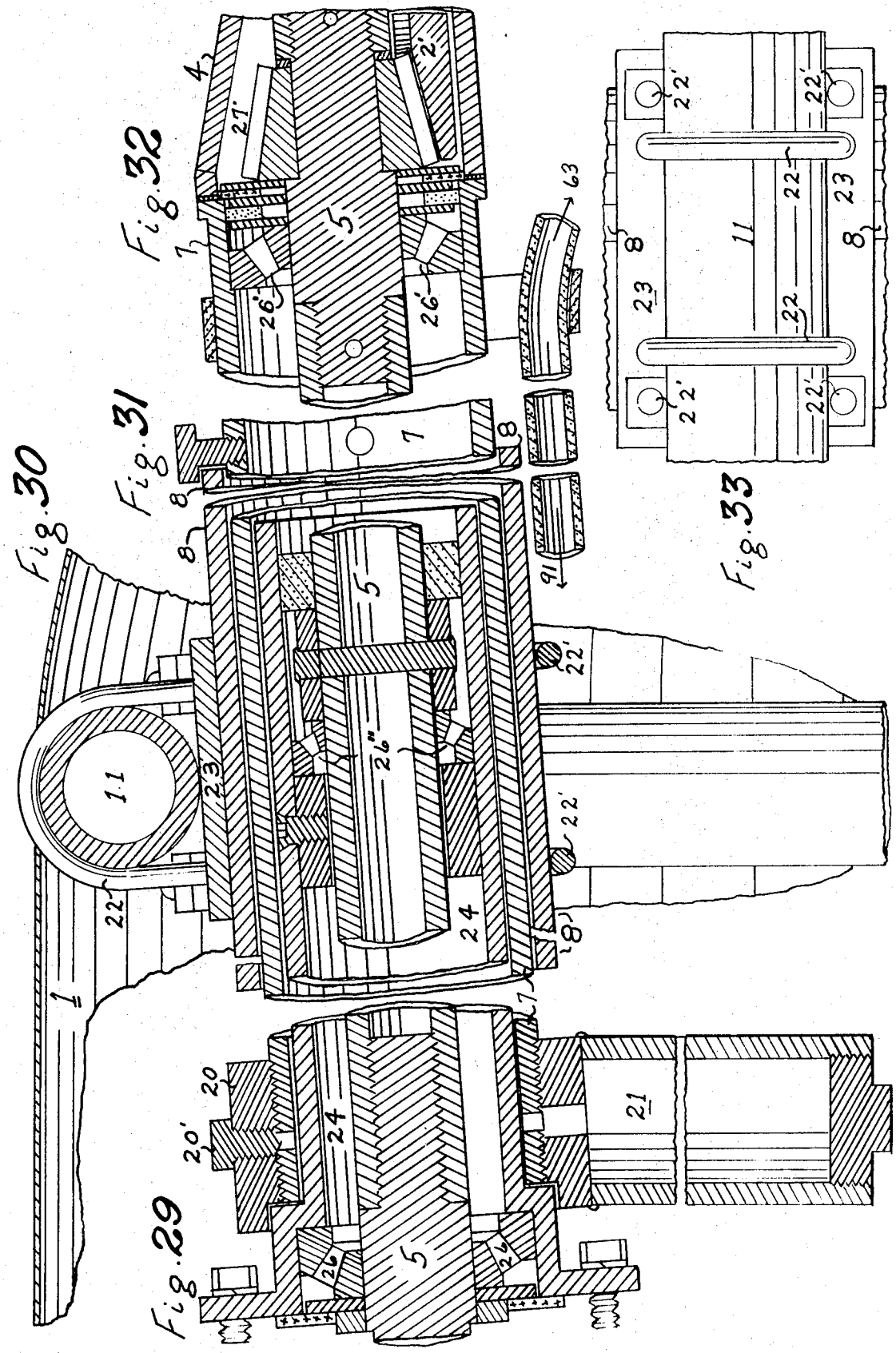

ROTARY WING AIRCRAFT

This invention relates to new and useful improvements in the art of rotary wing aircraft having means other than aerodynamic autorotation whereby an engine mounted on the craft rotates the blades of main sustaining rotors mounted in pairs side-by-side with respect to a vertical plane including the longitudinal axis of the fuselage body in translational flight, although the plane can hover and travel rearward as well as turn from side to side with respect to that vertical plane in addition to moving vertically. This phase of the invention relates particularly to an auxiliary fuselage-tilt and directional-control rotor mounted rearward of the generally cylindrical fuselage, although a similar mounting with some limitation can be mounted at the front of the fuselage for such purposes.

The invention relates particularly in said art to means pivotally mounting tubular housings of drive shafts of sustaining rotor assemblies, by way of contrast with the countertorque rotors mounted on the tail appendages of the fuselages of helicopters having a single main sustaining rotor and with aircraft of the "flying banana" type of fuselage having rotors of different blade length mounted thereon in tandem in translational flight, at considerable distances from a prime mover power source located in a normally somewhat horizontally disposed generally cylindrical and horizontally streamlined, with hemispherical front and rear end wall-tips of the same diameter as the cylindrical fuselage, which need not be exactly round, fuselage or suitable body framework mounting said prime mover engine, which in normal powered flight rotates said drive shafts, which, however, turn in flight at somewhat constant speed, regardless of the rotational speed of the engine drive shaft, rotationally interconnected with said rotor drive shaft by means of a conventional overrunning clutch well known in the art, by virtue of rotational interconnection of said drive shafts with the hubs of a pair of rotors mounted on upright shafts mounted side-by-side at equal distances with respect to said fuselage and having hubs regulating pitch of the blades mounted thereon in response solely to amount, as well as lack thereof completely, of torque of the engine on said rotor mounting shafts, as is explained in detail in another application submitted herewith in response to "Restriction Requirement" of Aug. 1, 1958, in my copending application Ser. No. 688,318.

One object of the invention overall is to provide a pair of inverse right and left opposed outrigger frameworks mounted at the sides of said fuselage having maximum rigidity and minimum weight, along with minimum resistance to downdraft of blades of rotors attached to the upper tips of shafts mounted in suitable bearings in upright tubular housings forming outer right and left segments of said outrigger frameworks, which have truss framework members, disposed at angles almost 45° between vertical and horizon, whose widely spaced lower tips are attached to parallel members of a landing framework, spaced below the fuselage, by upright frame members projecting downward from the internal fuselage frame members, and disposed somewhat parallel to the longitudinal axis of said fuselage, the diagonally disposed truss framework members thus serving with minimum weight in conjunction with quite stiff aligned and horizontally disposed lateral tubular housings, attached rigidly to the sidewalls of the fuselage, from which they emerge adjacent the arched roof thereof, and having mounted therethrough in suitable bearings drive shafts on whose outer tips are rigidly mounted, inside gear boxes rigidly attached to the outer tips of said horizontal lateral tubular housings and to the lower tips of the aforesaid upright tubular housings of the rotor shafts, bevel gears, whose teeth mesh with the teeth of corresponding bevel gears mounted rigidly on the lower tips of the rotor shafts, with which they thereby are rotationally interconnected.

The foregoing construction, in which the tubular horizontal housings of the paired drive shafts constitute primary very stiff elements of the outrigger frameworks, permits employment throughout of bevel gears, now in mass production for use in the automobile industry, mounted on perpendicularly disposed shafts, since the normally horizontally disposed laterally aligned drive shafts have axial splines on their inner adjacent tips inserted in corresponding grooves in a bevel ring gear retainer mounted rotatably in a central gear box and driven by a bevel pinion gear, in said gear box, rotationally connected with the overrunning clutch joining the shaft mounting the bevel pinion to the drive shaft of the engine, whether the tubular housings mounting the shafts of the side-by-side rotors are rotatable with respect to the fuselage, as will be described in the accompanying application having to do with the side-by-side rotors primarily, or are fixed with respect to the fuselage, as is to be described presently.

A second object is to provide, in conjunction with the foregoing paired right and left outrigger frameworks, means outside the fuselage insuring that the upright tubular housings of the side-by-side mounted rotor shafts do not alter their positions relative to the fuselage by rotating around the horizontal lateral tubular housings of the aligned drive shafts as well as bracing additionally the upright tubular housings against movement relative to the fuselage, said means consisting firstly of a pair of symmetrically disposed right and left bracing frame members disposed diagonally relative to a somewhat vertical upright plane including the axes of the upright main sustaining rotor shafts as well as to horizontal and vertical planes including the longitudinal axis of the fuselage, to whose internal framework the rear tips of said bracing frame members are attached adjacent the vertical plane marking the juncture of the generally cylindrical fuselage to its hemispherical rear tip at about the same height as the aforesaid lateral tubular housings emerging from the sides of the fuselage, the forward upper tips of said pair of bracing frame members being attached rigidly to segmented tubular mounting sleeves attached somewhat rigidly to the upper half of the tubular housings of said rotor shafts adjacent the upper tips thereof mounting the suitable bearings of said shafts, and consisting secondly of corresponding forwardly disposed bracing frame members attached to said tubular mounting sleeves at their rear upper outer tips and to the internal framework of the forward half of the fuselage adjacent the vertical plane marking the juncture of the generally cylindrical fuselage to its substantially hemispherical front wall-tip, said pair of diagonally disposed forward bracing frame members serving as tensional spars of enclosing narrow fixed stabilizing wings having greater chords at their points of attachment to the forward sidewall of the fuselage adjacent its hemispherical front end wall-tip than at their outer tips respectively and being so disposed relative to the fuselage that they give suitable very substantial backsweep toward their outer tips as well as correspondingly substantial dihedral angles respectively relative to the vertical plane including the longitudinal axis of the fuselage, to whose front tip said small stabilizing fixed wings give some necessary instantaneous lift in event of diminution of power, elective by the pilot or otherwise, of the engine while the craft may be traveling forward at high translational speed, although the tilt of the said stabilizing fixed wings, not generally corresponding to fixed stub wings mounting rotors at their outer tips in some craft, is such that, in ordinary flight powered by the engine rotating the drive shafts of the several rotors, the small stabilizing wings serve essentially to streamline the enclosed tubular and somewhat conical bracing frame members in the downwash of air from the blades of the side-by-side mounted sustaining rotors.

A third object is to provide means simultaneously controlling longitudinal tilt of the fuselage relative to the horizon around its lateral axis and preserving lateral stability of the craft, as a supplement to the gyroscopic stabilizing tendency of the side-by-side sustaining rotors turning in opposite directions and having resiliently flexible hubs mounted on shafts as described in the accompanying application in response to "Restriction Requirement" of Aug. 1, 1958, of application Ser. No. 688,318, consisting of an auxiliary tail mounted rotor having pitch of its blades collectively adjustable and reversible by suitable means such as illustrated and claimed in my copending application Ser. No. 688,318 and having the orbital path of rotation of those blades, disposed substantially in a plane perpendicular to the mounting shaft and diagonal with respect to the longitudinal axis of the fuselage, tilted in normal straight forward translational flight under power of the engine at an angle between a plane perpendicular to the longitudinal axis of the fuselage and a second plane including that axis line and intersecting the first said plane along a line at least almost horizontal, said auxiliary rotor tending by variation of its axial thrust and lift dependent thereon in part to increase said angle between the orbital path of its blades and the horizon for forward movement of the craft, and vise versa, and having means of shifting the weight of said auxiliary rotor laterally in two directions by substantially the same considerable amount with respect to a vertical plane including the longitudinal axis of the fuselage, thereby creating at the option of the pilot a torque on the fuselage around said axis as a result of gravitational pull of the earth on said rotor and its mounting assembly displaced laterally with respect to the pivotal mounting thereof on the fuselage, while laterally creating a horizontal thrust of the tail rotor in the opposite direction as a means tending to rotate the fuselage around its vertical axis for steering the craft, which has a means of laterally swinging the auxiliary steering and fuselage tilt control rotor with respect to said vertical plane containing the longitudinal axis of the fuselage below an axis substantially in said plane and defined by a tubular bracket rigidly attached to the interior framework of the fuselage, through whose outer wall protrudes longitudinally and rearwardly a tubular bracket through which is mounted a tubular housing, pivotally oscillatable therethrough by up to 180°, of a drive shaft rotatably mounted in suitable radial axial thrust bearings and rotationally interconnected with the shafts mounting the side-by-side main sustaining rotors, there being rigidly attached to the rear end of said tubular housing a gear box in which a bevel gear is rigidly mounted on the rear tip of said longitudinally disposed drive shaft with its teeth meshing with the teeth of a second bevel gear in the gear box mounted on the tip of a second shaft mounted in suitable opposed axial thrust bearings in a second tubular housing rigidly attached to the said substantially closed gear box, at somewhat right angles to the longitudinally disposed drive shaft previously mentioned, the auxiliary rotor being mounted on the lower tip of the second said shaft and having its blades rotating substantially perpendicular to the axis of said shaft.

A fourth object is to provide a tilt-sensitive valve assembly mechanism as means of controlling flow of fluid under pressure, derived from a suitable pump driven at somewhat constant speed in flight by one of the shafts rotationally interconnected with the shafts respectively mounting the side-by-side main sustaining rotors, whether those shafts be turning under aerodynamic autorotation in descent of the aircraft or under power derived from the engine, through suitable flexible fluid-tight conduits, connected fluidtight to said valve mechanism, to one or the other alternatively of the fluid compartments of a cylinder adjusting the pitch of the blades of the auxiliary fuselage-tilt control rotor, irrespective of lateral swinging of said rotor, through at least 90°, in response to gravitational pull thereon as well as in response to pivotal oscillation by the pilot of the longitudinally disposed drive shaft housing in its tubular bracket.

A fifth object is to provide in conjunction with the aforesaid tilt-sensitive valve mechanism, mounted in the fuselage, means whereby the pilot at his election may determine the tilt relative to the horizon at which the tilt-sensitive valve mechanism will keep the fuselage simply by his adjusting with respect to a quadrant, rigidly mounted within the fuselage, a lever determining the posture of conduits through a second cylindrical tubular valve segment, enclosing the tilt-sensitive valve member by telescoping it, inside a cylindrical cavity having the same axis as the two valve members inside the central body member of the valve assembly mechanism.

A sixth object is to provide means whereby the pilot, utilizing the foregoing means of controlling the longitudinal tilt of the fuselage by reversing the pitch of the blades of the auxiliary tilt control rotor mounted rearward of the craft in addition to his variation of the speed of the engine by suitable adjustment, can have an attendant effect rescue missions, such as picking a man, living or dead, off the surface of water, by opening a pair of opposing doors, normally closing in flight a large opening in the hemispherical front tip of the fuselage and extending almost from the floor to the ceiling of the fuselage, mounted on hinges having vertical axes at the opposed outer edges of said doors, beneath which is disposed a demountable forwardly widening extension of the landing framework beneath the fuselage slightly, the forward extension of said landing framework having members spaced laterally apart sufficiently for mounting between them a net stretcher whereby a man's body, or other such floating object, may be lifted from the surface of the water in response to the downward pull of the blades of the tail rotor exerting a torque around the lateral horizontal axis of the fuselage as a fulcrum supported by the main sustaining side-by-side mounted rotors.

A seventh object is to provide somewhat symmetrically corresponding diverging longitudinally disposed rearward extensions, integrally attached to the parallel longitudinally disposed landing frame members, spaced beneath the fuselage, having their rear tips, disposed parallel to each other, sloping up gradually toward their rear ends, to which are demountably attached securely upright diagonally disposed bracing frame members joining the said rear tips of the landing frame members to diagonally disposed braces securing the rear tip of the longitudinally disposed rearward protruding tubular bracket through which is mounted the pivotally oscillatable tubular housing of the drive shaft of the steering and fuselage tilt control rotor of the aircraft, which on landing may utilize the said tail rotor, having somewhat horizontally disposed blades whose pitch is easily adjustable and reversible at the election of the pilot, to cause the aircraft to settle down to the landing platform gently with the two rear tips of the landing framework, slightly rearward of the hemispherical rear wall tip of the fuselage, touching down first at two points and permitting the landing frame then to rock forward on further settling of the craft, until the forward tip of the fuselage settles down on a readily detachable wheel truck hingeably attached to the midsection of a cross frame member of the landing framework beneath the fuselage, whose front half on landing of the craft rests in part on a resilient coiled compression spring-mounted on said, alternatively detachable, hinging framework of the truck having pneumatic tires to absorb landing shock as a supplement to said resilient coiled spring, which also supports a part of the load of the aircraft, when it is taking off from a running start in lifting a load too heavy to raise vertically by means of the engine rotating the several airfoil bladed rotors.

An eighth object is to provide alternative means, operative singly or in conjunction, countering the very slight reactionary torque tendency of the craft to rotate around its vertical axis in flight, as a result of power applied to the somewhat upright shaft of the steering and fuselage-tilt control tail rotor, such as: (1) attaching to the longitudinally disposed drive shaft tubular housing, pivotally oscillatable in the fuselage bracket of the tail rotor, a steering lever disposed at an angle to a plane including the axis of said tubular housing in said bracket as well as including the axis of the shaft extending through a second tubular housing rigidly attached to the tail gear box, perpendicular to the first said tubular drive shaft housing for the most economical cost installation, and mounting the steering rotor on the lower tip thereof; (2) attaching a perpendicularly disposed hand rest to one side of the lower tip of a steering lever attached to the said drive shaft housing with the longitudinal axis of said steering lever, attached to said tubular housing rigidly, being in the plane including the axis of the same said shaft extending through the second tubular housing rigidly attached to the tail gear box, somewhat perpendicular to the first said tubular drive shaft housing at least, and mounting the steering rotor on the lower tip thereof; (3) disposing the axis of the ring gear rotatable retainer, and the aligned horizontal lateral drive shafts having their splined inner tips inserted in the axially disposed grooves thereof for rotating the side-by-side mounted main sustaining rotors, mounted in the central gear box within the fuselage at a slight angle from the vertical plane including the longitudinal axis of the fuselage and also disposing the axis of the bracket enclosing the longitudinally disposed tubular housing of the drive shaft inserted therethrough at a slight angle laterally with respect to said vertical plane including the longitudinal axis of the fuselage; (4) employing, in the tubular housing extending through said bracket of the fuselage, suitable round bearing blocks having holes therethrough not in the respective centers thereof and thus mounting the drive shaft in its partially telescoping tubular housing at a slight lateral angle from the axis of said tubular housing in the longitudinally disposed tubular bracket pivotally mounting it, thereby necessitating a very slight modification of the aforesaid ring gear and the meshing pinion mounted on the front tip of said drive shaft with its teeth meshing with those of the said ring gear, if the lateral displacement of the axis of the said drive shaft is appreciable from the vertical plane containing the longitudinal axis of the fuselage and the axis of the tubular housing mounted in the longitudinally disposed tubular bracket projecting rearward through the wall of the fuselage; (5) mounting on top of said drive shaft tubular housing, adjacent its juncture with the gear box rigidly attached to the rear tip of the tubular housing, an upright vane diagonally disposed with respect to the axis of said housing, so that any backwash of air from the blades of the main sustaining side-by-side mounted rotors will tend to rotate the rear gear box around the vertical axis of the aircraft and also will tend very slightly to rotate said gear box around the axis of said tubular housing in said bracket, whether the axis of the drive shaft inside the tubular housing coincide with the axis of said housing in said longitudinally disposed tubular bracket or not.

A ninth object is to provide resilient means such as coiled tension springs, connected at one end respectively to the fuselage wall and at the opposing end respectively to the tip of a lever whereby the pilot can oscillate said drive shaft tubular housing pivotally through said fuselage-mounted bracket, as means supplementing the weight of the rotor swinging below said bracket-housing axis in tending to bring the axis of rotation of the tail rotor into the position, substantially in a vertical plane including the longitudinal axis of the fuselage, in which said steering rotor will guide the aircraft in a straight line forward under power of the engine.

Suitable construction to carry out the features of the invention is described herewith, from which description other special objectives will be apparent to make a very simple and inexpensive aircraft, that will carry more passengers father on less fuel at much higher speeds than helicopters, and that can be operated with complete safety by any sensible person who can operate an automobile, even though he may never have been off the ground previously.

FIG. 3 is a left side longitudinal elevation of the craft shown in FIG. 1.

FIG. 4 is a vertical lateral cross section looking rearward through the craft shown in FIG. 1.

FIG. 5 is a fragmentary longitudinal vertical cross section at the center of the upper rear portion of the fuselage shown in FIG. 3.

FIG. 6 is a detail vertical longitudinal cross section through the gears mounted on the upper tips of the shafts shown in FIG. 5.

FIG. 7 is a detail vertical cross section of an alternative intermeshing gear arrangement driving the hydraulic pump.

FIG. 10 is a top plan view of the resiliently flexible but stiff hub member of one of the rotors.

FIG. 11 is a vertical cross section of the rotor hub shown in FIG. 10.

FIG. 12 is a vertical cross section through the rotor hub of FIG. 10 at the plane indicated by line 24-24'.

FIG. 16 is a detail vertical lateral cross section through the center of one of the mounting sleeves.

FIG. 17 is a detail elevation of the attaching means of the tips of the truss members.

FIG. 18 is a detail vertical cross section through the axis of the lower fragment of the rotatable shaft.

FIG. 19 is a detail rear view of the auxiliary control rotor shown in FIG. 18.

FIG. 21 is a fragmentary detail vertical cross section through the axis of one of the horizontal lateral shafts shown in FIG. 4.

FIG. 22 is a detail vertical cross section through FIG. 21 at line 22-22'.

FIG. 23 is a detail vertical cross section through the control valve shown in FIG. 21, at line 23-23'.

Figure 25:
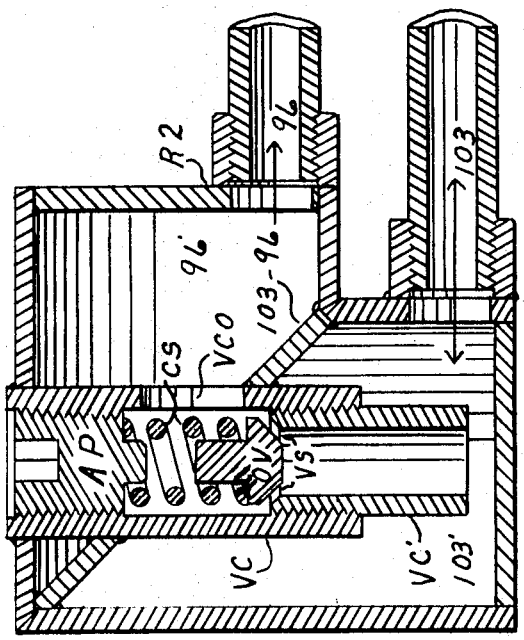
Figure 26:
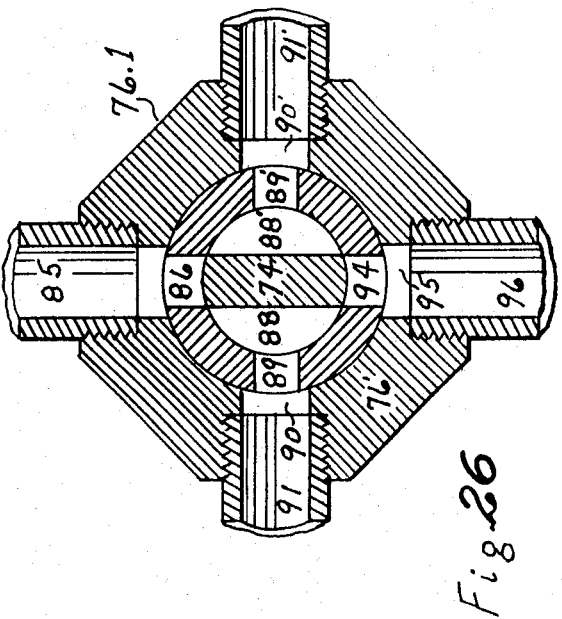
Figure 24:
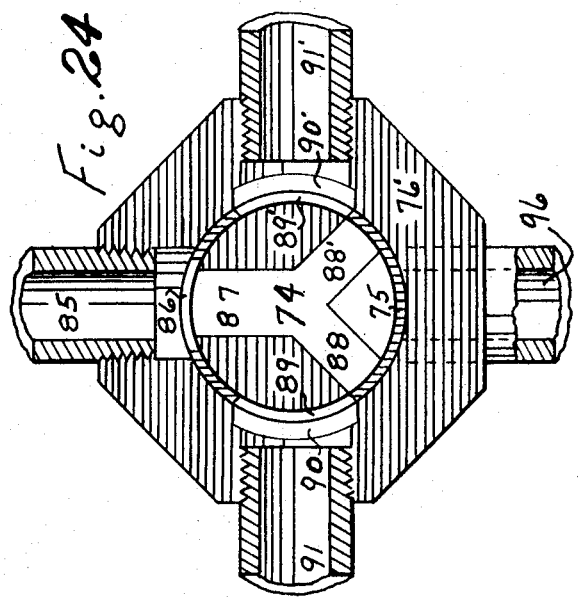

FIGS. 24—26 are views of the hydraulic pump and valve mechanism.

Figure 27:
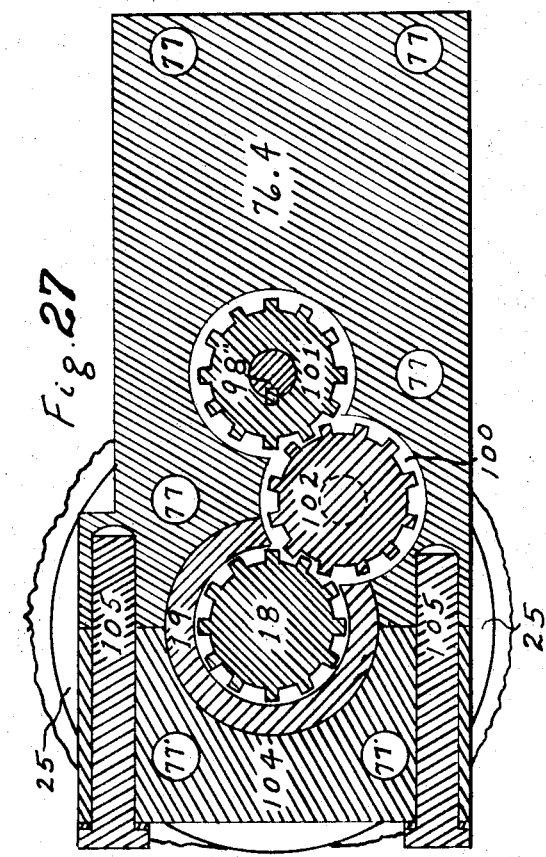

FIG. 27 is a detail vertical cross section at line 27-27' of FIG. 21.

Figure 28:
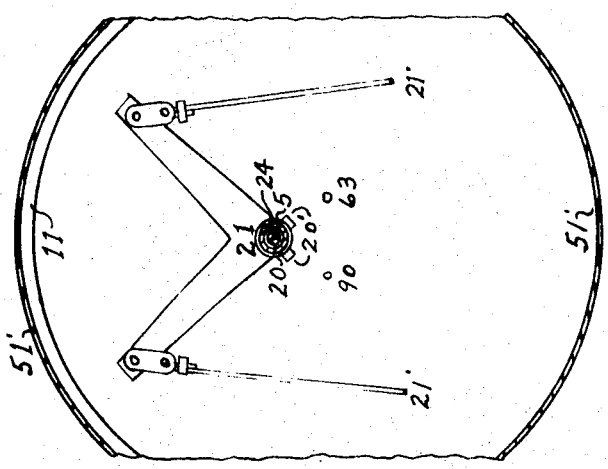
Figure 20:
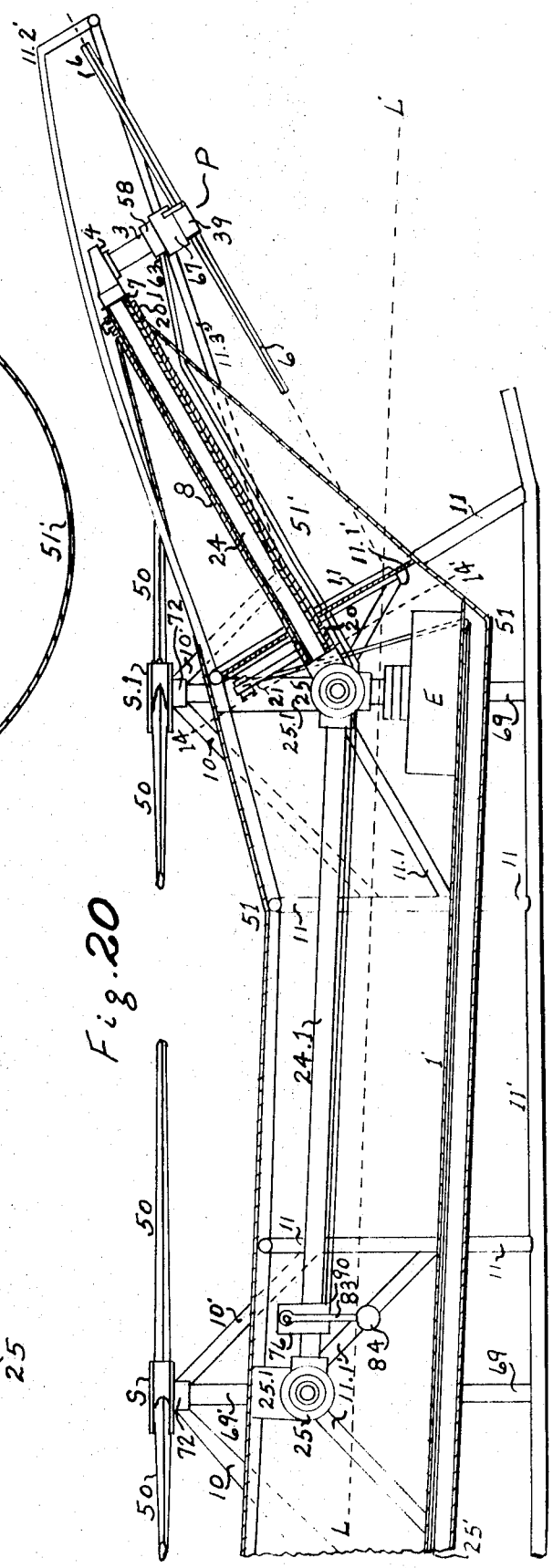
FIG. 20 is a fragmentary longitudinal vertical cross section through the center of the rear portion of the fuselage shown in FIG. 2.

FIG. 28 is a detail vertical cross section through the rear conical tip of the fuselage shown in FIG. 20, at line 14-14'.

FIG. 29 is a vertical longitudinal cross section through the axis of a rotor drive shaft.

FIG. 30 is a vertical cross section through the axis of the drive shaft shown in FIG. 29.

FIG. 31 is a cross section of the tubular housing shown in FIG. 30.

FIG. 32 is a cross section through the axis of the drive shaft shown in FIGS. 29—31.

FIG. 33 is a plan view of attachment means for the bracket shown in FIG. 30.

Figure 34:
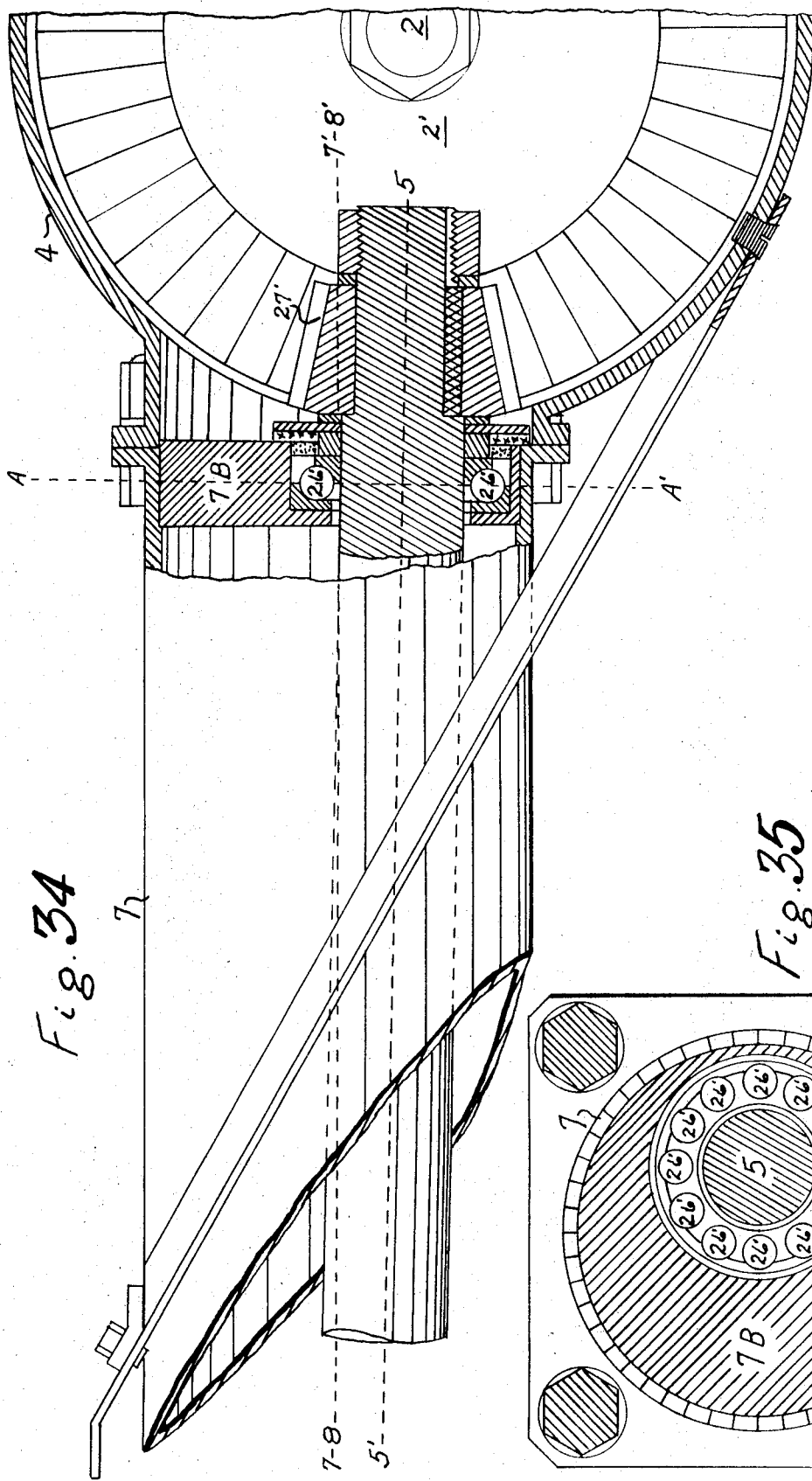

FIG. 34 is a plan view of the rear tip of an alternative drive shaft tubular housing.

Figure 35:
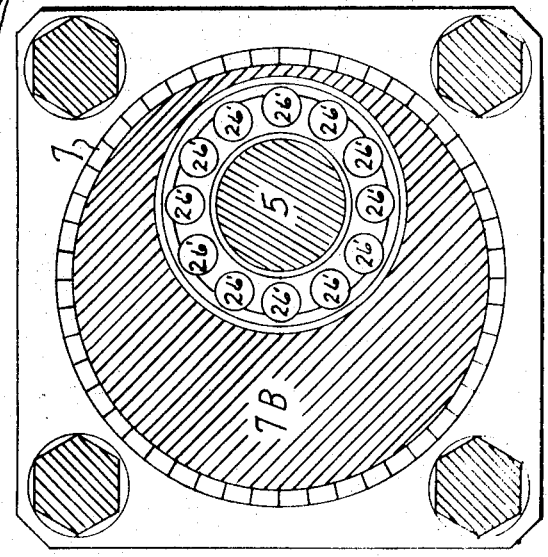

FIG. 35 is a cross section through a rear ball bearing at line A-A' of FIG. 34.

Figure 36:
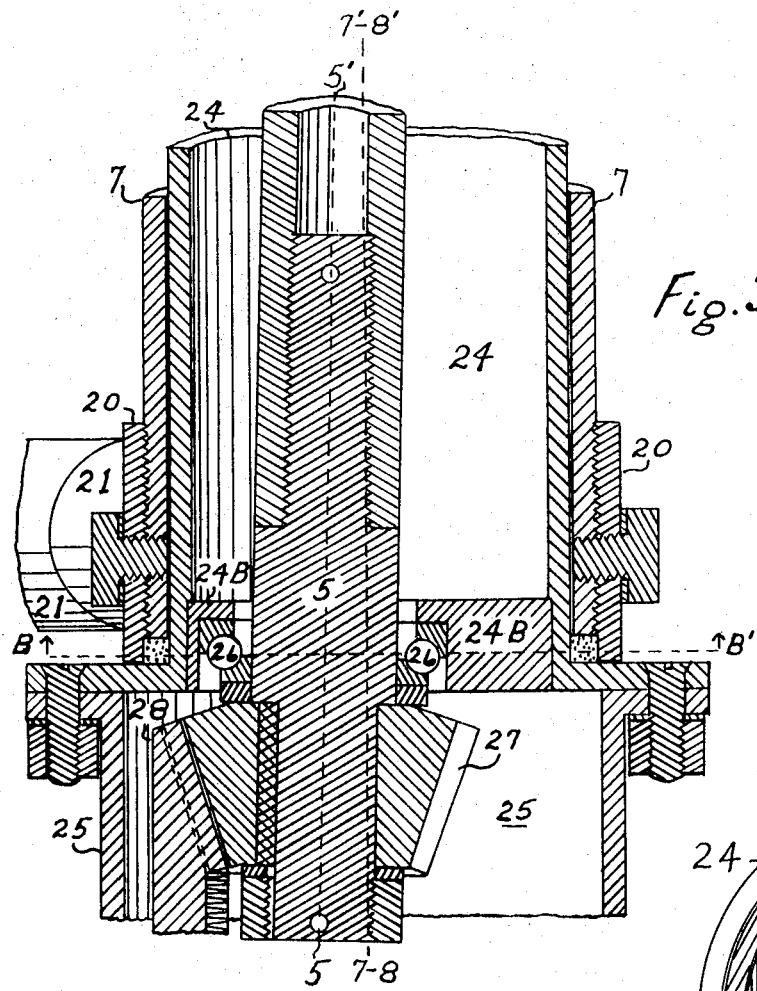

FIG. 36 is a cross section through the front tip of a diagonally disposed drive shaft.

Figure 37:
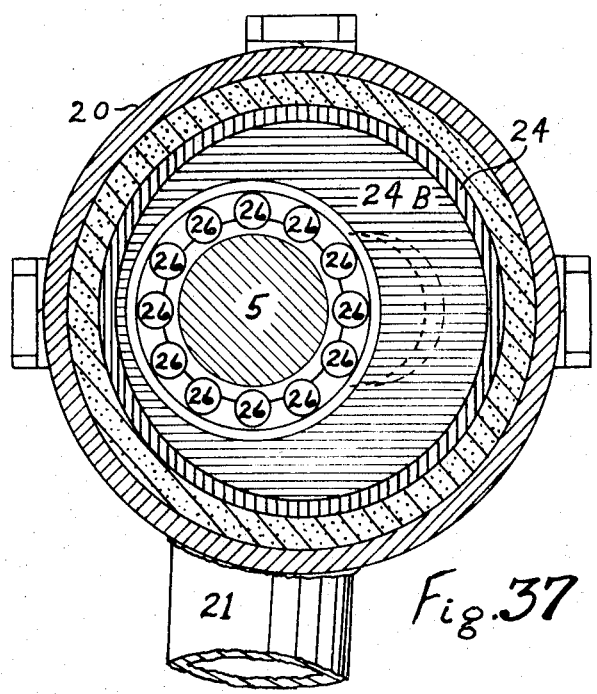

FIG. 37 is a cross section of the ball bearing and drive shaft shown in FIG. 36, at line B-B'.

Figure 38:
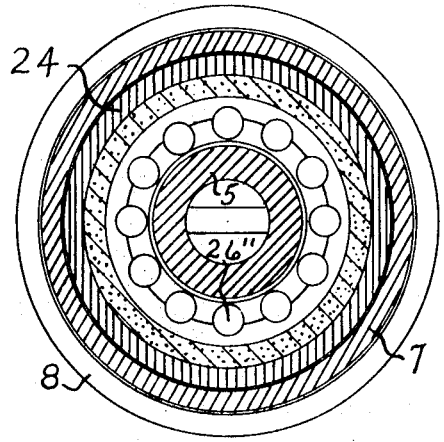

FIG. 38 is a lateral cross section through the drive shaft of FIG. 36.

Figure 39:
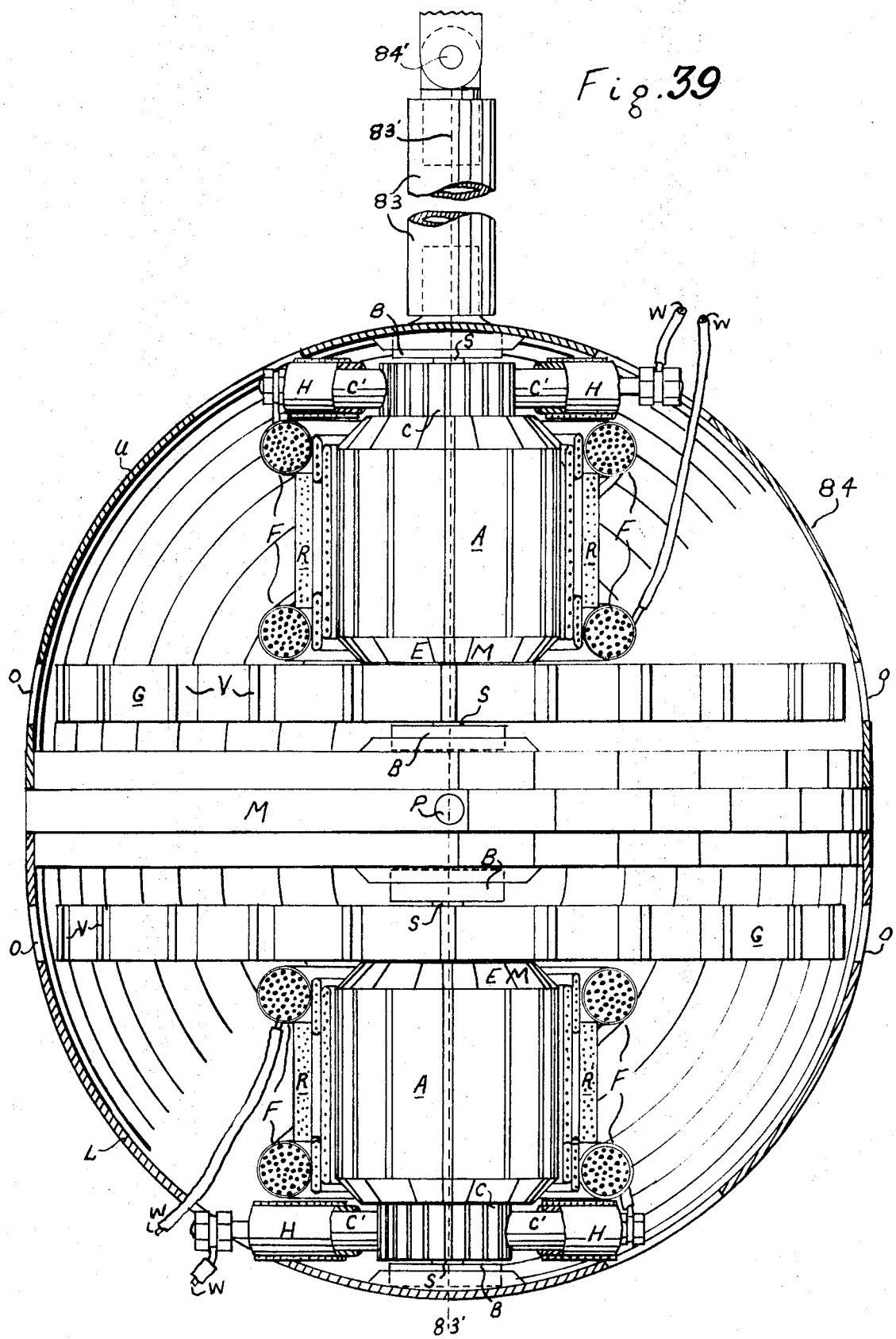

FIG. 39 is a cross section through the vertical axis of an alternative double-rotor gyroscope arrangement.

FIG. 40 is a cross section through the center of the floor of the fuselage, rearward of the hemispherical front tip thereof.

Figure 2:
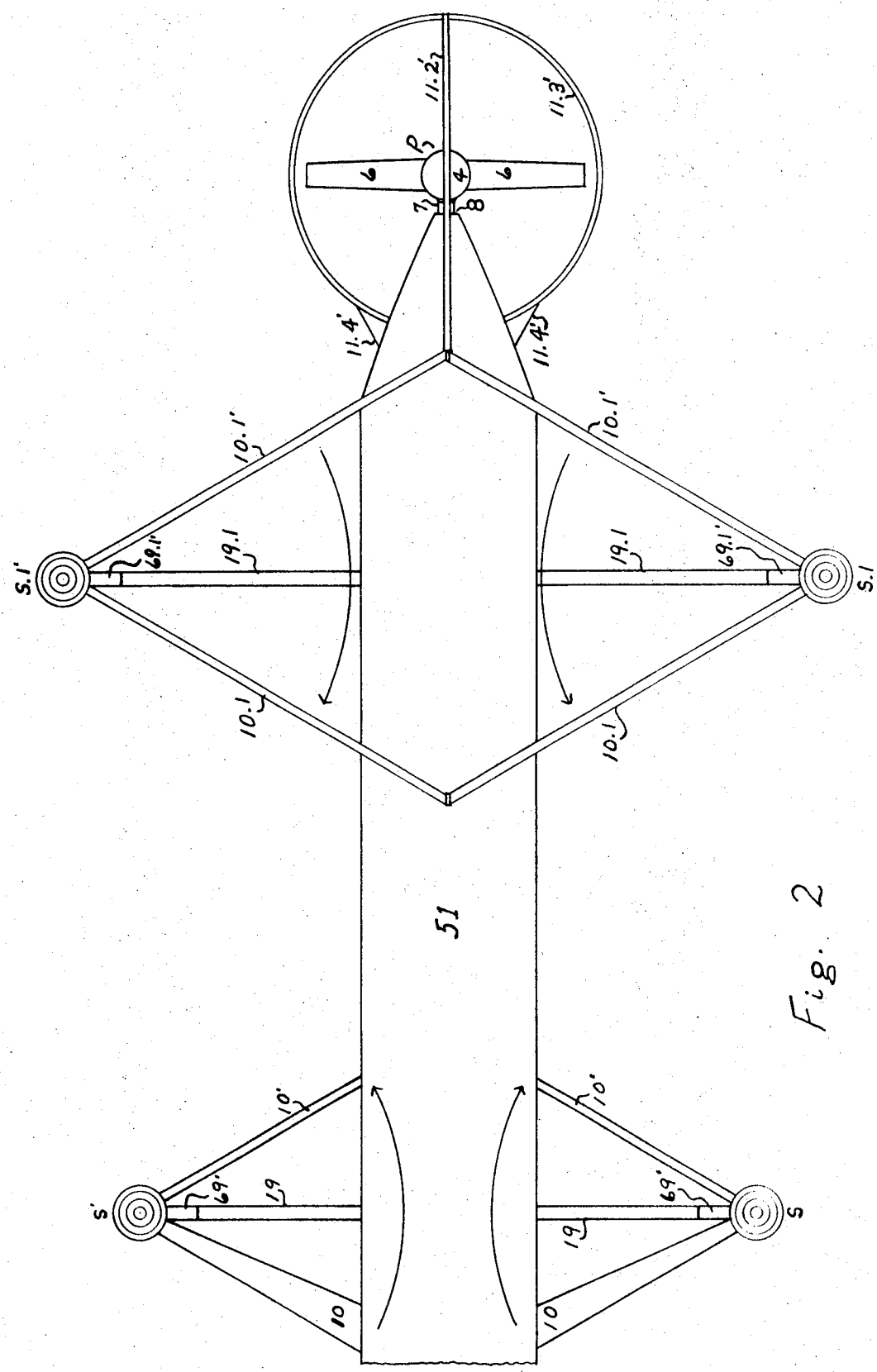
FIG. 2 is a fragmentary top plan view of a similar but larger aircraft.

FIG. 41 is a cross section of the floor and lower wall of the fuselage shown in FIGS. 2 and 20.

Figure 1:
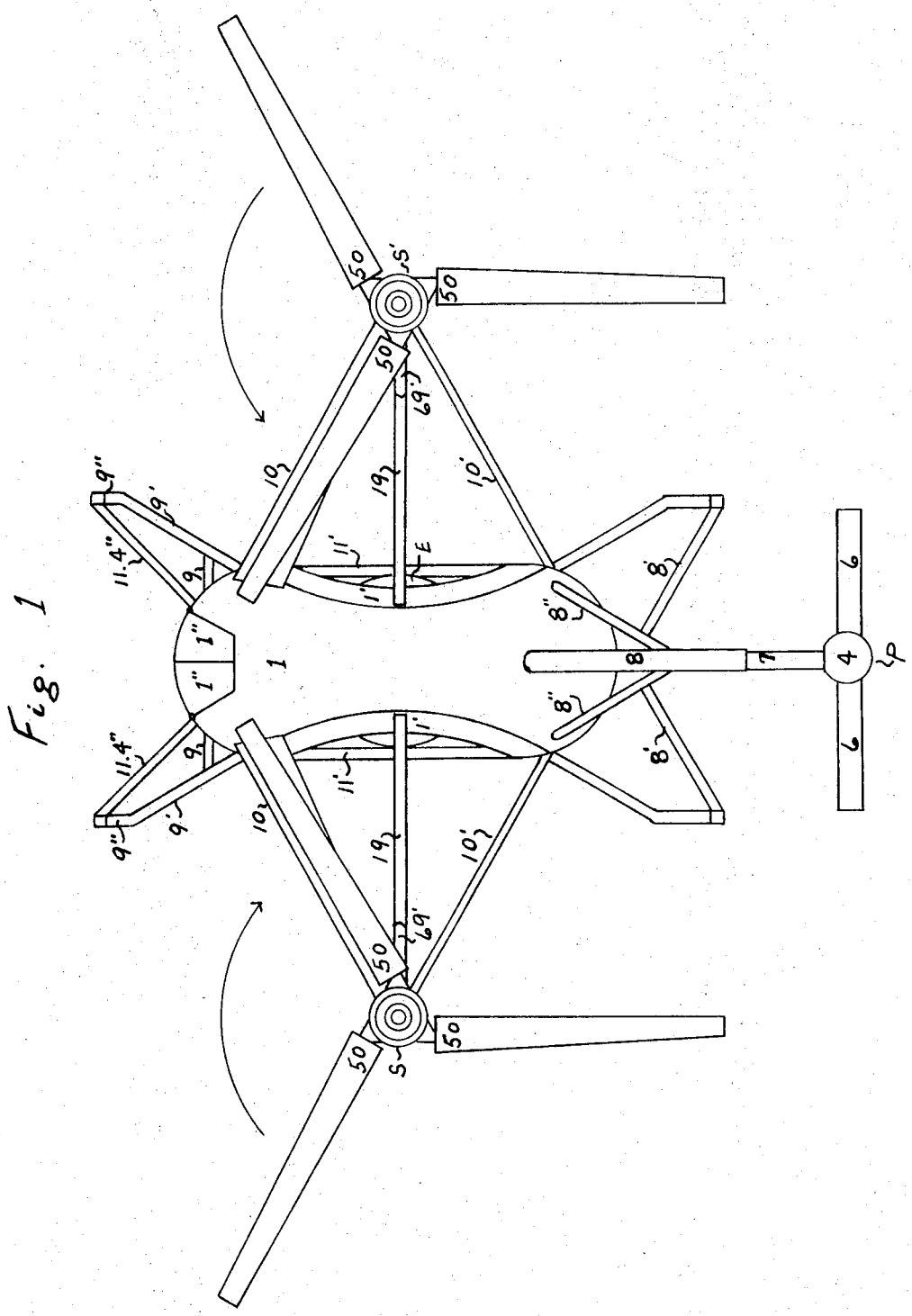
FIG. 1 is a top plan view of a rotary wing aircraft sustained primarily by two contrarotating side-by-side mounted rotors.

The invention will be understood most readily from a reading of the following descriptive specifications in conjunction with the accompanying drawings, wherein the most important features of the invention are shown by example, and wherein like figures and parts are designated by like numerals, in so far as possible corresponding to similar parts in my copending earlier application Ser. No. 688,318 to facilitate comparison therewith, and wherein:

FIG. 1 is a top plan view of a rotary-wing aircraft sustained primarily by two contrarotating side-by-side mounted rotors each having three blades completely and automatically self-controlling, as to aerodynamic autorotation and otherwise as to degree of blade pitch according to amount of mounting shaft torque and also as to longitudinal oscillation of said blades relative to their mounting shafts on axes perpendicular thereto respectively, in response to amount of torque by the engine on their respective mounting shafts, as explained in detail in the accompanying application describing in detail features of FIGS. 22, 23, and 24 of my copending application Ser. No. 688,318 in response to "Restriction Requirement" of Aug. 1, 1958, and sustained additionally under most circumstances in small part by a third auxiliary fuselage-tilt and steering direction control rotor assembly P having two airfoil blades with variable and reversible pitch, the auxiliary rotor drive shaft housing assembly being mounted to oscillate pivotally through a cylindrical tubular bracket fixedly mounted to protrude rearward longitudinally from the hemispherical end wall of the fuselage in my novel pivotal mounting that permits use of only the one auxiliary rotor, through pivotally controlled shifting by the pilot of its axis of rotation with respect to a vertical plane containing the axis of the drive shaft enclosing tubular housing extending through said tubular bracket, to determine whether the craft moves to the right or left and to determine also tilt, lateral as well as longitudinal, relative to the horizon of the generally cylindrically shaped fuselage, having streamlined front and rear tips, and thereby of the two main sustaining rotors through their stiff but resiliently flexible hubs, for moving forward or rearward as well as for vertical movement and hovering in flight, dependent on the pilot's adjustment of the engine throttle, either directly or through a conventional speed governor well known to the art.

FIG. 2 is a fragmentary top plan view of a somewhat similar but much larger rotary-wing aircraft having two pairs of such corresponding right and left mounted main sustaining rotors, the two rotors of one pair not necessarily being the same in orbital area as that of the other pair of rotors, mounted side-by-side on the sides of a single long generally cylindrical fuselage, at the rear end of which is mounted a somewhat similar shaft-housing assembly pivotally mounting, through a tubular bracket fixedly protruding longitudinally through the rear fuselage wall, of a similar auxiliary fuselage tilt and direction control rotor. Fragmentary FIG. 2 does not show airfoil blades corresponding to those shown in FIG. 1 which are to be mounted on the paired right and left hubs S,S' and S.1, S.1' similar to the airfoil blades attached to the rotor hubs S,S' shown in FIG. 1; and the rear tips of the landing framework members also have been omitted from FIG. 2.

FIG. 3 is a left side longitudinal elevation of the craft shown in FIG. 1 and shows one workable position of the auxiliary control rotor P relative to the other two side-by-side main sustaining rotors and to the fuselage, to which its pivotally mounted shaft-housing assembly frame is attached, pivotally oscillatable through a tubular bracket protruding rearward therefrom.

FIG. 18 is a detail vertical cross section through the axis of the lower fragment of the rotatable shaft and its completely telescoping tubular housing of the auxiliary control rotor designated P in FIG. 1. Details of the pivotally mounted hydraulic control mechanism regulating pitch of the blades of the auxiliary rotor have been explained and claimed in my copending application Ser. No. 688,318.

FIG. 19 is a detail rear view of the auxiliary control rotor shown in FIG. 18 at right angles thereto and shows fragmentarily the portions adjacent the hub of the two airfoil blades of the control rotor generally designated P in FIGS. 1, 2, and 3.

FIG. 4 is a vertical lateral cross section looking rearward through the craft shown in FIG. 1 at the plane passing through and including the shaft axes of the two main sustaining rotors S, S'.

FIG. 5 is a fragmentary longitudinal vertical cross section at the center of the upper rear portion of the fuselage shown in FIG. 3 but with the axis of oscillation of the tubular housing of the drive shaft through the tubular bracket, protruding rearward from the fuselage, being at a somewhat greater angle with respect to the horizon than in FIG. 3 and at twice the scale of FIG. 3 and shows bevel gears, in a gear box somewhat centrally located in the fuselage, driving all the several rotor mounting shafts in conjunction from a power source beneath said bevel gears.

FIG. 6 is a detail vertical longitudinal cross section through the gears mounted rigidly on the upper tips of the shafts rotating in tubular housings attached rigidly to the rear gear box shown in FIG. 5 and shows details of tapered roller bearings mounting said shafts in said tubular housings with suitable seals against excessive lubricant leakage from said rear gear box.

FIG. 20 is a fragmentary longitudinal vertical cross section through the center of the rear portion of the fuselage shown in FIG. 2 and shows the tubular housings enclosing the drive shafts of the rotors thereof.

FIG. 21 is a fragmentary detail vertical cross section through the axis of one of the horizontal lateral shafts shown in FIG. 4 and shows a means of mounting the hydraulic pump and tilt-sensitive control valve mechanism regulating mean collective blade pitch of the auxiliary rotor on the housing of said shaft.

FIG. 22 is a detail vertical cross section through the aforesaid shaft, its tubular housing, hydraulic pump displacement gears, and control valve of FIG. 21 perpendicular to the axes of each at the plane of line 22–22' thereof.

FIG. 23 is a detail vertical cross section through the same control valve in another perpendicular plane at line 23–23' of FIG. 21.

FIG. 27 is a detail vertical cross section at line 27–27' of FIG. 21 perpendicular to the drive shaft.

FIG. 7 is a detail vertical cross section of an alternative intermeshing gear arrangement driving the hydraulic pump by means of said shaft at the same vertical plane as FIG. 27 but in the opposite direction of rotation, as might be required with some rotary displacement hydraulic pumps alternatively employed.

FIG. 28 is a fragmentary detail vertical cross section through the rear conical tip of the long cylindrical fuselage shown in FIG. 20 at the lateral perpendicular plane indicated by line 14–14' therein at double scale.

Figure 8:
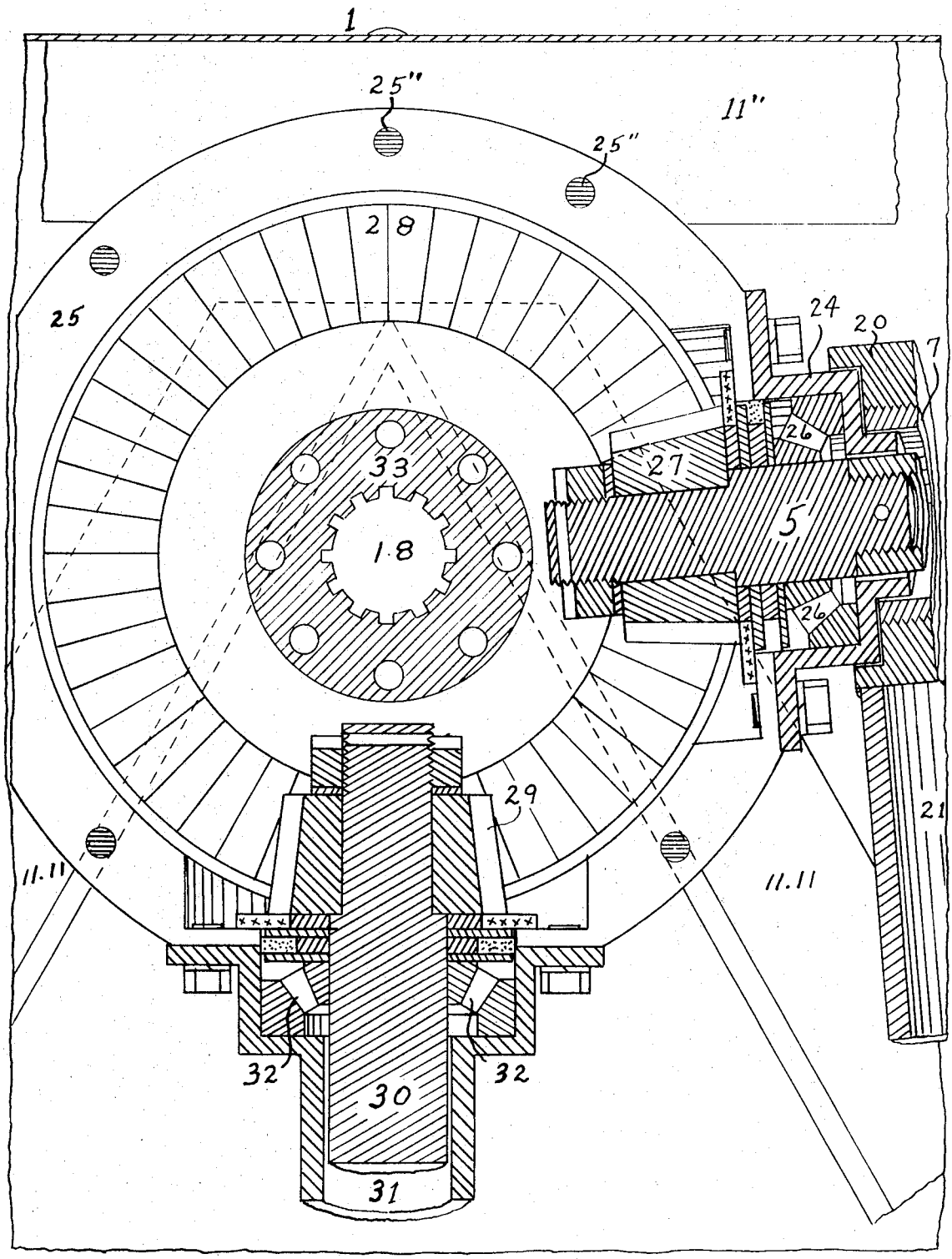
FIG. 8 is a fragmentary detail vertical cross section through the axis of the drive shafts indicated in FIGS. 3 and 5.

FIG. 8 is a fragmentary detail vertical cross section through the axes of drive shafts indicated in FIGS. 3 and 5 but showing in much larger scale the central transmission ring gear housing box, ring gear and rotatable retainer thereof telescoping in its grooves an axially splined tip of a normally horizontally and laterally disposed shaft therein, and means of attaching said central gear housing box rigidly to the roof and walls of the fuselage in which it is mounted and in turn mounts the tubular drive shaft housings.

Figure 9:
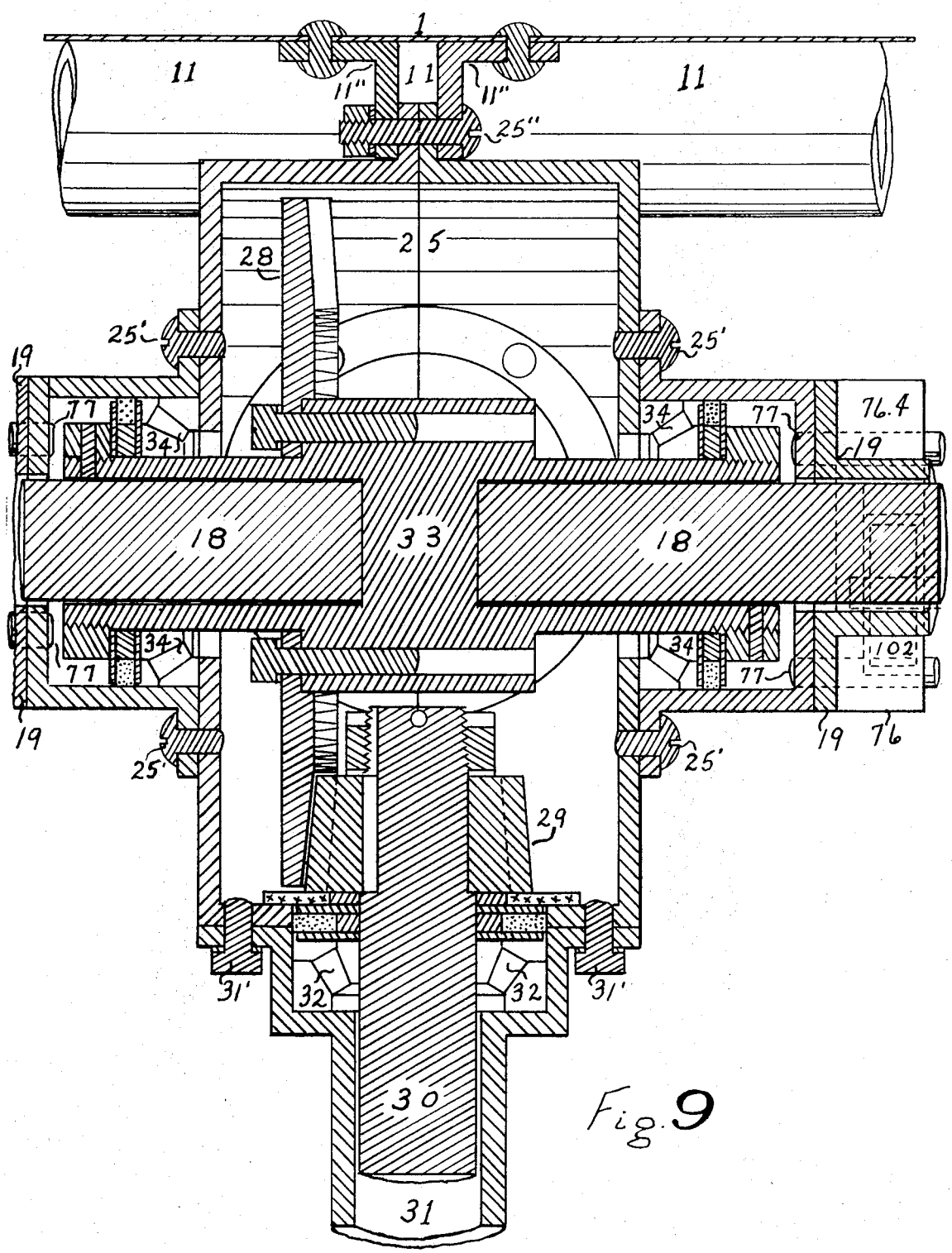
FIG. 9 is a detail vertical cross section at right angles to FIG. 8.

FIG. 9 is a detail vertical cross section at right angles to FIG. 8, through the axes of horizontal and vertical drive shafts of the rotors, showing attachment of the ring gear housing box to the enclosing member of the drive gears of the rotary displacement hydraulic pump and to a rigidly attached interior fuselage framework adjacent the crest of its roof.

FIG. 29 is a fragmentary detail vertical longitudinal cross section through the axis of a rotor drive shaft, disposed substantially longitudinally of the fuselage and diagonally with respect to the horizon and to the vertical axis of said fuselage, mounting rigidly on its front tip a small bevel gear driven by the ring gear shown in FIGS. 5 and 8 and 4 and showing keyed attachment to the drive shaft tubular housing of the pilot's normally somewhat vertically disposed steering lever, by which the pilot on occasion can oscillate freely and pivotally, through the rearward protruding tubular bracket of the fuselage, by as much as 180° for a short interval the entire housing of the rear gear box and its tail rotor assembly attached rigidly to the rear tip of said tubular housing of the aforesaid longitudinally disposed drive shaft, which in this instance is almost but not quite parallel to the longitudinal axis of the fuselage.

FIG. 30 is a fragmentary detail vertical longitudinal cross section through the axis of the same drive shaft shown in FIG. 29, as well as FIGS. 31 and 32, of the fuselage tilt-and-steering control rotor, showing a cross section of the tubular bracket through which the tubular housing of said drive shaft is pivotally mounted and by which that tubular housing is, in this instance, suspended beneath a fixed interior framework of the fuselage, and also showing a tapered roller bearing within another enclosed tubular housing, rigidly bolted to the ring gear box, within the pivotally mounted drive shaft housing within which the longitudinally disposed drive shaft rotates to turn the auxiliary control rotor by means of bevel gears as indicated in FIGS. 5 and 6.

FIG. 31 is a short fragmentary detail cross section, at the rear of the fuselage tubular bracket, of the pivotally mounted tubular housing shown in the adjacent figures and showing multiple stud bolts screwed into the oscillatory tubular housing as illustration of a simple means of maintaining the longitudinal position of said drive shaft housing relative to the fuselage bracket through which it is pivotally mounted and thereby with respect to the radial and axial thrust bearings mounting the front tip of the drive shaft in the smaller tubular housing, of said drive shaft, rigidly attached to the central gear box rather rigidly mounted in the fuselage and rotatably mounting the ring gear retainer therein.

FIG. 32 is a fragmentary detail vertical longitudinal cross section through the axis of the drive shaft shown in FIGS. 29, 30, and 31 showing an antifriction radial and antithrust bearing mounted in the rear tip of said oscillatory tubular housing, in which rotates that drive shaft 5 mounting a bevel pinion gear by which said shaft rotates a toothed gear of corresponding bevel in turn mounted within the rear gear box on the upper tip of auxiliary rotor mounting shaft 2 mounted in this instance at right angles to the said drive shaft axis as indicated in FIGS. 5 and 6.

FIG. 33 is a plan view from above of a simple means of fixed attachment of the tubular longitudinally disposed bracket, shown fragmentarily in FIG. 30 as well as in FIGS. 1 and 3, protruding rearward through the fuselage wall, to one of the inverted U-shaped tubular interior frames of the fuselage, also shown in FIG. 5.

FIG. 10 is a top plan view of the resiliently flexible but still hub members of one of the main sustaining side-by-side mounted rotors, shown on the right-hand side of FIG. 1 and explained and claimed in the accompanying additional application in accordance with "Restriction Requirement" of Aug. 1, 1958, each having three blades rotating in substantially the same orbital path and having their angles of attack regulated individually as well as collectively by amount of torque or lack thereof of the rotor-mounting shaft acting on respective coiled compression springs whose forward tips are attached beneath the respective axes thereof to the respective cylindrical blade roots having oscillatory pivotal cantilever mountings in said hub's exterior annular bracket-mounting member.

FIG. 11 is a vertical cross section of the rotor hub shown in FIG. 10 through the axis of the rotor mounting shaft along the planes indicated by line 23—23' of FIG. 10 and shows a simple means whereby the outer and upper tips of the outrigger frameworks of the fuselage and their diagonally but symmetrically disposed bracing members are attached by means of a cylindrical mounting sleeve, alternatively vertically bisected, to the upper segment of the upright tubular housing of the rotor mounting shaft adjacent the upper bearing cup formed by the expanded upper tip thereof.

FIG. 12 is a vertical cross section through the rotor hub of FIG. 10 at the plane indicated by line 24—24' thereof and shows one of the coiled compression springs whereby each of the corresponding blades of said main sustaining rotor has its angle of attack determined individually by the amount of pressure exerted on the lug of the blade root by its respective coiled compression spring in response to amount of torque, or lack thereof in event of diminution of torque on the shaft at the election of the pilot or otherwise to such extent that aerodynamic autorotation of the paired rotationally interconnected rotors occurs as the means of sustaining the rather slowly descending craft, exerted by the engine on the rotor shafts and thereby on the respective lugs and blade roots to which they are fixedly attached securely, the outer portion of the hub being rotatable within small limits relative to the annular inner portion of the hub, keyed on the rotor shaft, on which the rear tips of the coiled compression springs are mounted.

FIG. 34 shows fragmentarily from above the rear tip of an alternative drive shaft tubular housing oscillatable through the rear fuselage tubular bracket, but with the drive shaft, shown by horizontal cutaway down to the axis thereof in part, of the auxiliary rotor as mounted diagonally through the said oscillatable tubular housing as an alternative means of overcoming small torque of said auxiliary rotor in rotative reaction on the fuselage around its vertical axis, which otherwise, in the absence of other countering means, might cause the aircraft to drift off a straight forward course, there being shown also in this figure a small, numerically undesignated, diagonally disposed vertical vane attached to the top of the drive shaft tubular housing and to the rear gear box as still another alternative means of preventing such rotation of the fuselage around its vertical axis in flight.

FIG. 35 is a somewhat vertical cross section through the aforesaid alternative rear ball bearing and through the axis of the drive shaft of FIG. 34 at the plane perpendicular to said diagonally disposed drive shaft indicated by line A—A' of that figure.

FIG. 36 is a somewhat horizontal cross section through the front tip of the longitudinally but slightly diagonally, laterally as well as vertically, disposed drive shaft, at the axis thereof, whose rear tip is shown in FIG. 34 and is an alternative arrangement for mounting said drive shaft of the auxiliary rotor in ball bearings in lieu of the central mounting of the corresponding drive shaft in the vertical center of tapered roller antifriction bearings in FIGS. 29, 30, 31, and 32.

FIG. 37 is an almost vertical lateral cross section of the ball bearing and drive shaft and tubular housing shown in FIG. 36 at line B—B' looking rearward of the aircraft.

FIG. 38 is an almost vertical lateral cross section through the drive shaft of FIG. 36 mounted alternatively in a roller bearing at the approximate center of the telescoping tubular housings at the same plane as the intermediate tapered roller bearing shown in FIG. 30.

FIG. 39 is a detail vertical cross section through the vertical axis of an alternative double-rotor gyroscope arrangement, employing a common axis and rotating in opposite directions at the same speed, suitable for installation in a hollow sphere 84, shown in FIGS. 21, 22, attached rigidly to the lower tip of the tilt-sensitive lever 83 having the same vertical longitudinal axis as the two enclosed gyros, rotationally stablilizing relative to the horizon the cylindrical valve member 75, which regulates flow of fluid under pressure through the valve mechanism shown in those figures to control longitudinal tilt of the fuselage regardless of pivotal oscillation by the pilot of his steering tubular housing extending through its pivotal tubular bracket.

FIG. 40 is a fragmentary vertical longitudinal cross section through the center of the floor of the fuselage immediately rearward of the hemispherical front tip thereof and shows one wheel of a small alternatively detachable two-wheel truck, having pneumatic tires, whose axle mounting framework has its front tip hingeably mounted, by easily removable means, on a tubular cross member of the landing framework at is midpoint and has its rear tip supported by a vertical rod, around which is mounted a coiled compression spring that resiliently supports a portion of the weight of the fuselage on landing of the craft on a landing platform.

FIG. 41 is a fragmentary vertical cross section of the floor and lower wall of the generally cylindrical fuselage shown in FIGS. 2 and 20 and shows a steering lever adjacent the pilot's seat by which he can adjust lateral disposition of the tail rotor by means of cables extending rearward beneath the fuselage floor to pulleys beyond which said cables are attached to a forked lever by which the longitudinally disposed pivotally mounted tubular housing of the drive shaft is oscillatable through the tubular bracket, coiled tensional resilient springs being attached to the wall of the fuselage and to the lower tip of the lever laterally tiltable by the pilot in order that the tensional springs may augment the weight of the tail steering rotor in tending to bring that tail rotor into such position, relative to a vertical plane encompassing the longitudinal axis of the fuselage, that the craft will tend to fly without turning to right or left except in response to action of the pilot in deviating said steering lever from its normal vertical position.

Figure 13:
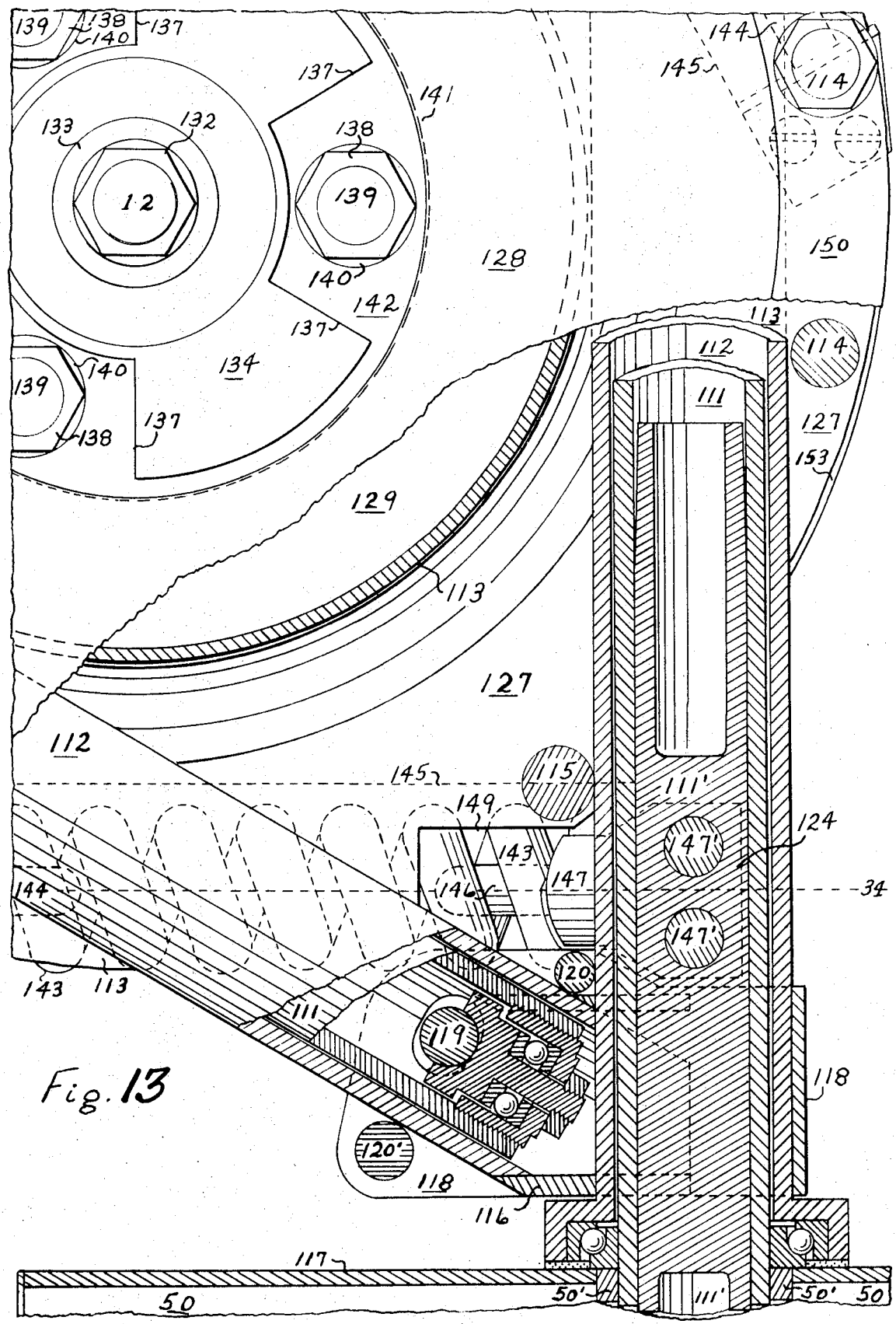
FIG. 13 is an optional alternative means of mounting the blade roots shown in FIG. 10.
Figure 14:
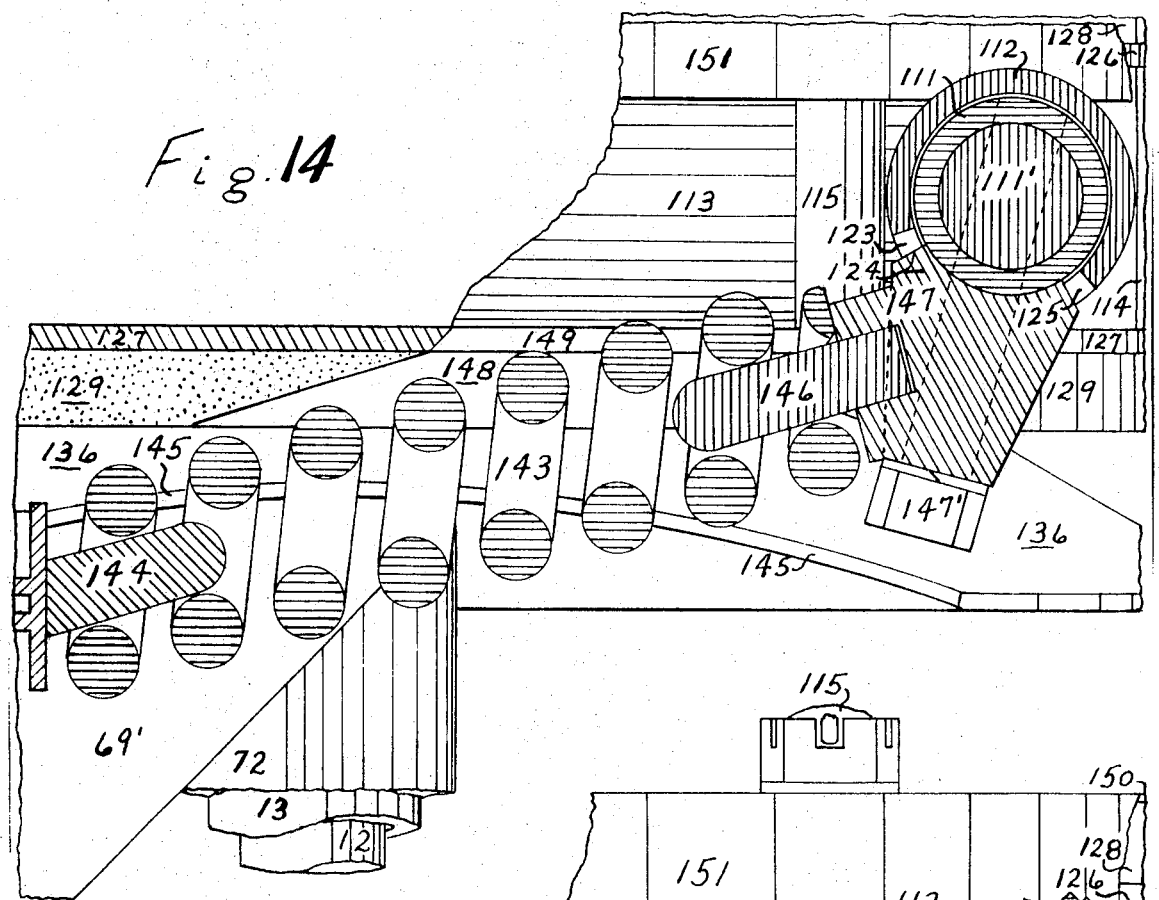
FIG. 14 is a fragmentary vertical cross section through FIG. 13 at line 144-34.
Figure 15:
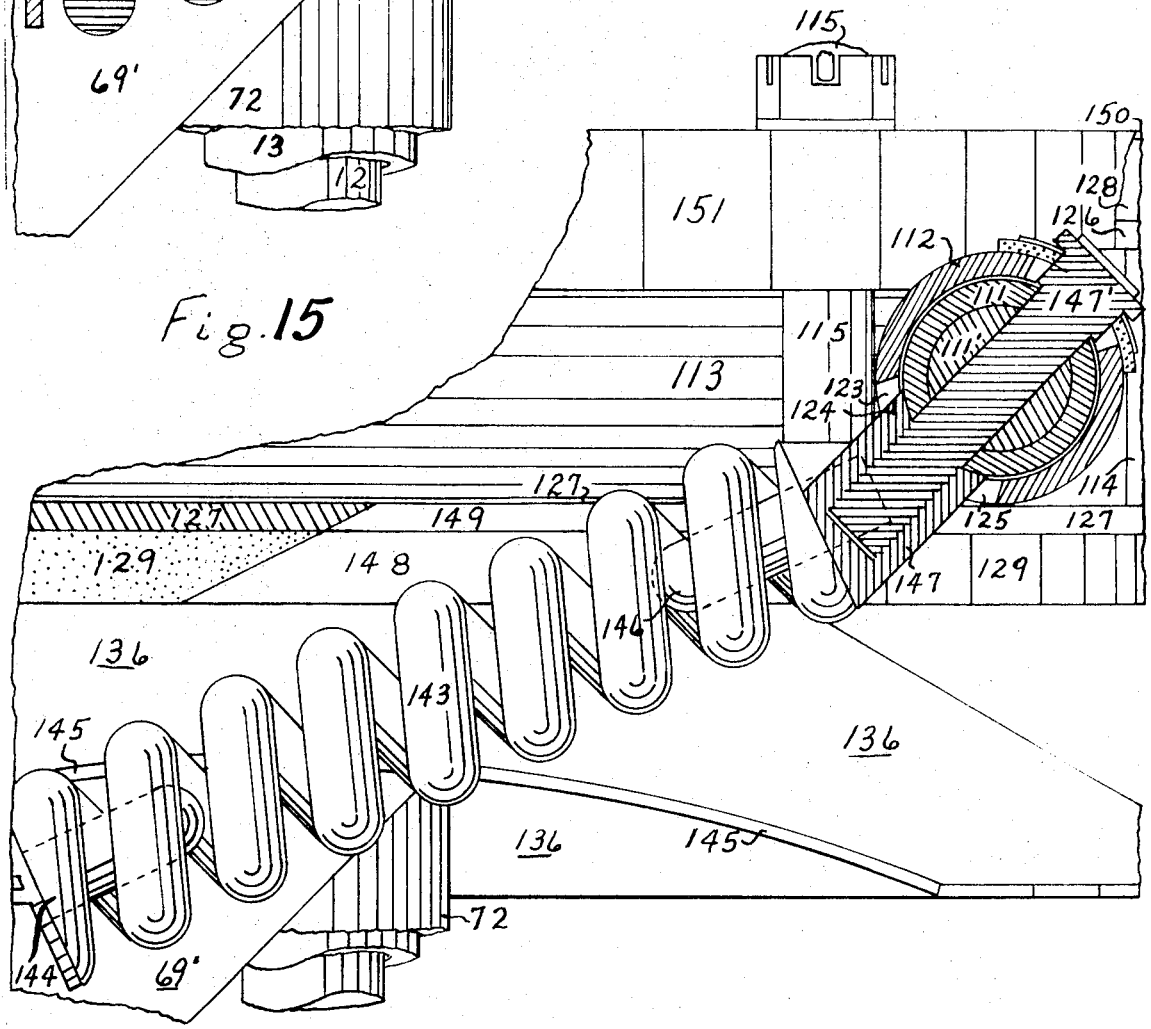
FIG. 15 is a fragmentary vertical cross section perpendicular to the axis of the cylindrical blade root shown in FIGS. 13 and 14.

FIG. 15 is a fragmentary vertical cross section perpendicular to the axis of the cylindrical blade root shown in FIGS. 13 and 14 adjacent to the coiled compression spring shown therein and shows another alternative means of attaching rigidly the pitch adjusting and rotor turning lug to the cylindrical blade root in lieu of the arrangement therefor shown in FIGS. 12 and 14 alternatively.

FIG. 16 is a detail vertical lateral cross section through the center of one of the alternatively segmented cylindrically vertically disposed mounting sleeves attached to the respective upper tips of the diagonally disposed bracing members mounted adjacent the respective upper tips of the upright tubular housings mounting the respective shafts of the main sustaining rotors.

FIG. 17 is a detail elevation of a suitable means of rigidly attaching the tips of aligned bracing frame truss members to the respective lateral tubular horizontal drive shaft housings constituting primary segments of the outrigger frameworks on which the side-by-side main sustaining rotors are mounted rotatably.

In both FIGS. 1 and 2 are shown top plan views of an auxiliary fuselage-tilt and lateral direction control rotor assembly, generally designated by the letter P, having its longitudinally and somewhat horizontally disposed drive shaft housing 7 pivotally mounted through a tubular bracket 8 protruding rearward through the outside wall of the generally cylindrical fuselage, designed by numeral 1 in the smaller craft shown in FIG. 1 and by 51 in FIG. 2 showing a much longer such fuselage having a somewhat conical rear wall-tip. FIG. 1 also shows two paired main sustaining rotors having hubs S and S' mounted side-by-side on each side of fuselage 1 by means of inversely corresponding outrigger frameworks having members 10, 10', 19, 69', without its aligned companion segments 69 observable in that figure below tubular housings 19, which cause very little resistance to downdraft from blades 50 of those rotors, each of which has three blades as indicated in the separate application filed herewith in response to "Restriction Requirement" of Aug. 1, 1958. It must be appreciated here at once, however, that the tail rotor P shown in both FIGS. 1 and 2 will operate entirely differently by employment of the resiliently flexible side-by-side main sustaining rotor hubs shown in FIGS. 10, 11, and 12 from the way in which the pivotally mounted tail rotor assembly P would operate when other main sustaining rotors are employed such as those used in helicopters and engine-rotated rotary wing aircraft having side-by-side mounted rotors as contemplated by some U.S. patents, because such other rotors usually have blades that are pivotally mounted on their hubs, on horizontal axes perpendicular to the longitudinal axes of the respective blades, to flap up and down individually or in pairs, thereby largely divorcing the blades from their mounting shafts, to avoid excessive vibration, blade stresses, etc., and thus depriving them to that extent of gyroscopic tendencies to maintain lateral stability of the craft in flight, not to mention that the long blades of the sustaining rotor of a helicopter rotate rather slowly in order to keep their tip speed below that of sound. And, among other things, it also must be appreciated at once that my tail rotors P will operate entirely differently, when they are disposed rearwardly between the tips of blades of side-by-side main sustaining rotors, whether rotating as indicated by the curved arrows in FIG. 1 or as indicated in FIG. 2 by similar arrows, from the way in which they would affect a helicopter having a single main sustaining rotor directly in front of such a pivotally mounted tail rotor assembly, subject to the rotary downward backwash of the main sustaining rotor, and operating in conjunction with a single main sustaining rotor subject to rotational precession, in accordance with the well-known law of physics that a force operating on a rotating body will tend to manifest itself 90° from the place of operation, as a result of longitudinal tilting of the fuselage mounting the shaft of said main sustaining rotor, thereby tending to tilt its mounting shaft laterally, if the blades of said rotor are not quite completely divorced from their mounting shaft by pivotal flapping to avoid "roughness" of air travel etc.

It is contemplated that all the rotors shown in FIG. 2 will turn in unison by virtue of rotational interconnection of their mounting shafts, by means of suitable bevel gears and drive shafts, although turning in complete unison is not necessary, if the fuselage be sustained n part on water by displacement thereof. But, regardless of the number of side-by-side main sustaining rotors, it is contemplated that such a rotor on one side of the fuselage will have blades 50 approximately equal in length to the blades 50 of its paired rotor on the opposite side of the fuselage turning in the opposite direction, so that reactionary torque in rotation of one of a pair of rotors will exactly equal reactionary torque in rotation of the other rotor of said pair. It therefore is appropriate to designate such craft having my pivotally mounted rotors P at the end of the fuselage, whether at both front and rear thereof or only at the rear as shown in the drawings, as a "Lateral Autocopter" as opposed to the presently more common "helicopter," in which a "countertorque rotor" acting as an airscrew under necessarily constant control of the pilot to keep the fuselage from rotating in the opposite direction from the single main sustaining rotor turned by the engine rotating its mounting shaft, beneath which is located the center of gravity almost directly as a means of maintaining equilibrium of the craft almost automatically by gravity, although there are other such means that can be made available to the pilot of such craft. The name "Autocopter" to describe an aircraft intended for vertical ascent was used as early as a U.S. patent of Dec. 3, 1935, U.S. Pat. No. 2,023,105, to J. W. Smith, but his craft contemplated two rotors of equal size mounted in tandem as a means of providing offsetting torques by the engine on the rotors having upright mounting shafts, and such similar craft later came to be called "Flying Bananas" when operated during the forties and fifties by the U.S. Armed Services. The appropriateness of the name "Lateral Autocopter" to describe my rotary winged aircraft having paired side-by-side rotors of equal size turning in opposite directions by means of a prime mover engine E in powered flight seems obvious and will be used by me hereafter for brevity to distinguish my aircraft described in conjunction with my copending application Ser. No. 688,318 from "helicopters+ having a "tail rotor" mounted at the rear tip of a fuselage integral rearward extension to countertorque of the engine on the single main sustaining rotor and also from "flying bananas" having two engine-powered rotors in tandem as illustrated by Smith's patent. Each of the four main sustaining rotors S, S' and S.1, S.1' of my "Lateral Autocopter" shown in FIGS. 2 and 20 may have its blades 50 of suitable length mounted on hubs such as that illustrated in FIGS. 10, 11, and 12; but it will be appreciated later that at least one of the larger rear hubs S.1 or S.1' may have pitch of its blades 50 of suitable length, whether two, three, or four, or more blades per hub, regulated both collectively and individually in the same way as are the blades 6 of the tail rotor P shown in my copending application Ser. No. 688,318 and in the present application.

A side view of the pivotally mounted control rotor assembly P of FIG. 1 is shown in FIG. 3, while a vertical cross section of the auxiliary control rotor assembly P of FIG. 2 is shown in FIG. 20. Such pivotal mountings of tubular housings 7 of drive shafts 5, disposed somewhat horizontally and longitudinally of the fuselage as shown in the present drawings, of such rotor assemblies P of course alternatively might be made on both sides or both ends of an aircraft. But pivotally mounted auxiliary control rotor assembly P is shown in FIGS. 1 and 3 as well as in FIGS. 2 and 20 only at the rear end of a fuselage, 1 and 51, where its pivotal oscillation and disposition relative to the axis of oscillation of tubular housing 7 through tubular bracket 8, substantially in a vertical plane containing the longitudinal axis of the generally cylindrical fuselage, have special significance, not only for steering the craft by tendency to rotate the fuselage around its vertical axis relative to the points of the compass, but also for lifting and tilting the fuselage, primarily longitudinally about a lateral horizontal axis, but also laterally around the longitudinal axis to a limited extent for lateral stabilization, to determine whether the craft, regardless of the number of paired side-by-side mounted sustaining rotors, will hover or move vertically or go forward or rearward and on a desired course with respect to the compass. In FIG. 1 are indicated two completely self-controlling three-bladed main sustaining rotors, which are automatically self-controlling as to blade pitch both individually and cyclically as well as collectively by amount of torque of the engine on the mounting shaft, and as to gradual limitation, by resiliently flexible segments of the hubs, of universal oscillation of the outer annular segment of the hub affording substantially cantilever but pivotal mounting of the blade roots in each hub in accordance with the accompanying application in response to "Restriction Requirement" of Aug. 1, 1958. Their hubs S and S' are mounted at equal distances from the longitudinal vertical center plane of fuselage 1, which is generally cylindrical with rounded hemispherical end wall-tips that make it symmetrically streamlined below the orbital paths of blades 50 for rapid translational flight as well as in the downdraft from said blades. These two main sustaining rotors are specially constructed for operating in unison in pairs, turning in opposite directions, in rotational conjunction with the pivotally mounted rotor P rearward of the fuselage, because it is necessary that the rotor hubs S and S' have a somewhat resilient mounting on their respective shafts 12 so that those side-by-side rotors impart their gyroscopic stabilizing tendencies to lateral stabilization of fuselage 1 by means of their said mounting shafts 12, even though the hubs provide gradually limiting universal oscillation of blades 50 with respect to the axes of said shafts to minimize vibration and stresses on blades 50 and the mounting outrigger frameworks resulting from variations of lift around the orbital paths of the blades due to differences of relative airspeed in forward translational flight, since the lateral stabilization of the control rotor P on the fuselage is rather limited and since it is quite necessary that the blades 50 of side-by-side mounted rotor hubs S and S' respond almost immediately to tilting of fuselage 1 by rotor P both longitudinally and laterally in response to pivotal oscillation of rotor assembly P, on its axis disposed longitudinally of the fuselage, as well as in response to variations in collective pitch of the blades of rotor P. And, by way of contrast with a "helicopter" having somewhat vertically flapping blades on horizontal pivots perpendicular to the longitudinal axes of said blades of its single main sustaining rotor substantially in front of an auxiliary countertorque tail rotor, it may be noted that, while the resiliency of my flexible hubs S and S' of the side-by-side mounted main sustaining rotors affords gyroscopic stabilization imparted by the relatively shorter blades 50 of the two rotors, those side-by-side rotors turning in opposite directions will respond most readily to longitudinal tilting quite quickly of the fuselage by tail rotor P, because rotational precession of rotor S will exactly offset rotational precession laterally of rotor S' turning in unison in the opposite direction in accordance with the rotational interconnection of the respective mounting shafts, so that neither of these rotors can tilt laterally in the normal sequence in response to vertical movement of tail rotor P in response to its blade pitch collective variation, because the mounting shafts of the side-by-side rotors are kept parallel by the outrigger frames in which they are mounted to rotate.

At the same time it must be noted that, whereas use of a single main sustaining rotor having such a somewhat cantilever mounting of its blade roots in the hub of a helicopter operating in conjunction with a smaller countertorque tail rotor would tend to produce lateral tilt of the fuselage by virtue of precession of said main sustaining rotor, when the tail of the fuselage might be moved vertically in response to action of the tail rotor or otherwise, my craft having side-by-side paired rotors turning in opposite directions tends to be unaffected laterally by vertical movement of the tail of the fuselage in response to variation of lift of the tail rotor P, as mentioned above, and also tends to respond directly, by lateral banking, to torque around the longitudinal axis of the fuselage 1 imparted by lateral shift of the weight of swinging rotor assembly P, when that rotor assembly P is oscillated pivotally in the manner presently to be described.

All of the three rotors shown in FIG. 1 are designed to adapt themselves automatically, without knowledge or action of the pilot, to such cross currents of air as those to which they may be subjected by virtue of their use with the pivotally mounted fuselage steering and tilting control rotor assembly P, even though the craft may be traveling at much higher forward translational speed than can be accomplished by present single or tandem rotor "helicopters" having much longer blades for sustaining the same loads under unfavorable disc-loading ratios, not to mention from another angle that one of my "lateral autocopters" having two side-by-side main sustaining rotors of approximately the same blade length as a present "-helicopter" having a single main sustaining rotor can carry more than twice the cargo of such a "helicopter," because the single fuselage and outrigger frameworks at the sides of the generally cylindrical fuselage of my "lateral autocopter" will weigh much less than would two fuselages of the two such conventional helicopters with their respective necessarily long rearward integral extensions of their fuselages mounting their two necessary countertorque rotors completely rearward of their long main sustaining rotor blades, which are handicapped in translational flight.

In FIG. 3 rotor assembly P is shown in a position normal for approximately vertical ascent, descent, and hovering of this smaller craft, intended for family use to transport up to six passengers at speeds up to more than 200 miles per hour with safety, shown in FIG. 1 with the orbital path of blades 6 perpendicular to a somewhat vertical, but hidden and not quite vertical, upright shaft 2 rotating in suitable opposing antifriction radial and axial thrust bearings in tubular housing 3 as indicated fragmentarily in my copending application Ser. No. 688,318. Tubular housing 3 is attached rigidly to a closed gear box 4, in which are carried a bevel gear mounted rigidly on the upper tip of upright shaft 2 rotatable through tubular housing 3, and a second bevel gear, having teeth meshing with teeth of the first said bevel gear as indicated by numeral 27' in detail FIG. 20, rigidly keyed on the rear tip of a somewhat horizontal shaft 5 as shown in FIGS. 5, 6, 29, 30, 34, 32, 34, by means of which blades 6 of auxiliary steering and fuselage-tilt control rotor P are rotated by the aircraft engine E as shown in FIGS. 1 and 3, whose drive shaft is rotationally interconnected by means of an overrunning clutch together with suitable shafts and bevel gears with the aforesaid shaft 5, regardless of where the engine may be located inside the fuselage and alternatively below it on the landing gear framework as indicated by FIG. 6. A tubular housing 7 as shown in FIGS. 1, 3, 5, 6, 29, 30, 31, and 32, having mounted therein suitable antifriction axial and radial thrust bearings, mounts therethrough the somewhat horizontal shaft 5 of the meshing bevel gear 27' and in turn is pivotally mounted through tubular bracket 8, which protrudes rearward from the upper rear portion of the fuselage wall of fuselage 1 and is held substantially rigid with respect to the fuselage 1 by a mostly exterior bracing framework consisting of diagonally and symmetrically disposed tubular bracing members 8'', whose upper rear tips are attached somewhat rigidly to tubular bracket 8 adjacent the rear tip thereof, and whose forward lower tips, and whose forward lower tips inserted through corresponding holes in the rear hemispherical wall of fuselage 1 are spaced apart by substantially the diameter of the fuselage and respectively are joined somewhat rigidly to vertical segments of an interior fuselage framework member 11 adjacent the hemispherical rear end wall-tip of the fuselage.

Fuselage 1 shown in FIG. 3 indicates a specialized fuselage or body framework that is novel in its construction for utilizing to best advantage the pivotally mounted tail rotor assembly P and for utilizing advantageously in conjunction therewith my novel side-by-side mounted rotors S and S', so designated whether blades 50 are shown mounted in the hubs in the drawings or not. Fuselage 1 shown in FIGS. 1 and 3 is generally cylindrical with its front and rear wall tips being generally hemispherical of the same diameter as the cylindrical segments of the fuselage, which is sufficient to mount therein four stretchers, in upper and lower banks or bunkers, for transporting four wounded men with room enough in the aisle between the two pairs of stretchers for seating the pilot and an attendant in front of him. The interior framework of generally cylindrical fuselage 1 is of maximum strength for minimum weight and consists primarily of two inverted U-shaped tubular members 11, whose upper curved sections conform to the roof of the fuselage 1, to which they are rigidly attached at points adjacent the planes marking the junctures of the hemispherical end walls to the front and rear cylindrical intermediate sections adjacent thereto. Thus, while fuselage 1 is more than long enough to place therein four stretchers for transporting wounded men, its rear end wall-tip has a streamlined rear termination that offers minimum resistance to downdraft of air from blades 50 retreating rearward in turning in opposite directions with their outer tips extending over the top of the fuselage 1 to some extent during the retreating phase of their respective orbits in rapid forward translational flight.

Likewise there is minimum resistance to downdraft of air from blades 50 by a leading framework largely beneath the aforesaid generally cylindrical fuselage and consisting primarily of a parallel pair of tubular landing frame members 11', joined rigidly to each other by multiple cross frame members to form a landing framework disposed a short distance below fuselage 1 with that suitable spacing being maintained by at least the four somewhat vertical legs formed by the lower tips of the inverted U-shaped tubular fuselage frame members 11, which protrude downward through holes in the cylindrical wall of the fuselage, adjacent its hemispherical front and rear end walls of the same diameter, and at their lower ends are attached rigidly to the landing framework thereby forming a substantially rigid central section of the landing framework below fuselage 1. The rear tips of the parallel longitudinally disposed landing frame members 11' below fuselage 1 diverge farther from each other laterally at suitable angles rearward of the attached tips of the rear inverted U-shaped tubular fuselage frame member 11 before protruding upward slightly and parallel to each other toward their rear tips, somewhat rearward of fuselage 1, which thereby form a kind of laterally spaced rockers on which the craft can land initially and then rock forward with less shock on the fuselage and its passengers than would be a direct landing on parallel tubular frame members 11' immediately below the fuselage. The rear tips of the longitudinally disposed landing frame members 11' are reinforced by and simultaneously reinforce the rearward protruding tubular bracket 8, through which tubular housing 7 of drive shaft 5 of rotor assembly P is pivotally mounted, by means of upright diagonally and symmetrically disposed right and left bracing frame members 8' spaced rearward of fuselage 1 with their upper tips attached somewhat rigidly to diagonally and symmetrically disposed right and left bracing frames 8'' intermediate their respective tips and with their lower tips attached, fixedly but in an easily demountable connection, to the rather widely spaced rear tips of longitudinally disposed landing frame members 11' forming the rockers of the landing framework, whose disposition in flight is controlled automatically by blades 6 of auxiliary rotor assembly P in response to axial movement of nonrotating cylinder 58 shown in FIG. 3 as mounting rotatable cylinder 67 linked to pitch controlling hydraulic means, as set forth in FIGS. 4 and 5 of my copending application Ser. No. 688,318, in conjunction with a tilt-sensitive valve mechanism to be explained more fully later herein.

FIG. 4 reveals, from a vertical lateral plane perpendicular to the longitudinal axis of fuselage 1 and passing through the horizontal and vertical axes of the tubular shaft housings 19 and 13 of the outrigger frameworks mounted on each side of the fuselage by means of the landing framework as well as fuselage 1, gear box 4 and longitudinally disposed housing 7 of drive shaft 5 at the same level as in FIG. 3. And in detail FIG. 30 it is indicated that tubular bracket 8, which protrudes rearward through the rear end wall of fuselage 1 as indicated in FIG. 3, is rather rigidly attached to the upper midpoint of the inverted U-shaped tubular interior frame member 11 of the fuselage by means of a bracket formed by a somewhat horizontal plate 23, shown in plan from above in FIG. 33, having eight holes suitably spaced for insertion therethrough of the threaded tips of four U-bolts 22 and 22' passing respectively around the midsection of tubular frame member 11 and the tubular cylindrical bracket 8 beneath it, which both are drawn tightly against the intermediate mounting plate 23 by nuts screwed on the respective threaded tips of the four U-bolts. Secure attachment of long tubular bracket 8 to interior fuselage frame member 11 spaced considerably rearward of the substantially vertical plane passing through the axes of the shafts mounting the side-by-side rotors is quite important, since that bracket 8 has to withstand the strains of weight of rotor assembly P mounted on still longer drive shaft housing 7 on landing of the craft as well as the opposing left of that rotor in flight, although mounting of bracket 8 is reinforced by its secured protrusion through its corresponding hole in the rear end wall of the fuselage, and although long drive shaft housing 7 is counterbalanced to some extent through the somewhat rigidly mounted tubular bracket 8 by virtue of the fact that the front portion of tubular housing 7 extends considerably forward of the attachment of bracket 8 to inverted U-shaped tubular frame 11 and in that forward segment of housing 7 is snugly but rotatably mounted around a second smaller cylindrical tubular housing 24, shown in FIGS. 5, 29, and 8, whose position in the fuselage 1 is fixed by virtue of its fixed attachment to a gear box 25 somewhat rigidly mounted in the fuselage.

In detail FIG. 9 as well as in FIG. 4 it is indicated that the somewhat centrally disposed gear box 25 located near the laterally arched, but generally longitudinally disposed, roof of the generally somewhat cylindrical fuselage 1, to which that gear box is rigidly attached by means of bolts 25'' inserted through holes in interior fuselage frames 11'' riveted to the roof, has cylindrical side bearing-enclosing compartments, whose vertical annular flanges are bolted to the sidewalls of the central gear box 25 by means of multiple bolts 25'. In those two cylindrical side compartments are mounted the outer races of two opposed sets of tapered roller bearings 34, whose smaller inner races rotatably mount in said gear box a retainer 33 of ring gear 28, whereby is rotated continually in flight, at somewhat but not exactly the same speed, shaft 5, on whose forward tip shown in FIG. 8 is rigidly mounted a bevel pinion gear 27, whose teeth mesh with the ring gear 28 in continual rotational connection between shaft 2 shown in FIGS. 5 and 6 mounting blades 6 of the tail rotor and parallel shafts 12 mounting the side-by-side rotor hubs S and S' as indicated in FIG. 4, whose loosely telescoping upright tubular housings 13 have corresponding expanded upper tips 73 mounting tapered roller bearings 14 immediately below said rotor hubs and have corresponding opposed lower tips 71, mounting opposed tapered roller bearings, rigidly attached to respective outside lateral gear boxes 15, which are in turn rigidly attached to corresponding outer expanded tips 70 of substantially aligned horizontal lateral tubular housings 19, in which continually rotate in flight at somewhat constant speed their respective aligned shafts 18, whose adjacent axially splined inner tips are inserted in corresponding grooves of aligned cylindrical recesses of rotatable retainer 33 of ring gear 28, and whose outer tips are mounted in correspondingly opposed tapered roller bearings in the expanded outer tips 70 of the lateral horizontal tubular housings 19 attached to gear boxes 15, in which on the outer tips of the respective lateral horizontal shafts 18 are rigidly mounted small bevel pinion gears 17, whose teeth mesh with the corresponding much larger bevel gears 16 rigidly mounted on the respective lower tips of main sustaining rotor shafts 12, thereby making said shafts 12 rotate much more slowly than shafts 18 and the ring gear 28, whose rotatable retainer 33 serves not only to turn shafts 18 by means of its axially splined grooves but to support therein by means of its bearings 34 the inner tips of those shafts 18, whose splines fit the said grooves loosely enough to prevent vibrational slapping of said shafts, if those shafts 18 cannot have their axes kept perfectly aligned at all times by the outrigger frameworks incorporating lateral horizontal housings 19 as their primary segments.

FIG. 4 indicates that shaft housings 19 may be segmented, and the segments of each said housing 19 may have corresponding vertically disposed annular flanges provided with corresponding holes through which, as well as through corresponding holes in the sidewalls of the fuselage, may be inserted multiple tip-threaded bolts, which are not shown because of small scale of FIG. 4, whose nuts will join the respective inner and outer segments of tubular housings 19 by means of said bolts and thereby tend to keep housings 19 from moving with respect to the fuselage, although other means of accomplishing that purpose more fully will be explained later herein. Note, however, in detail in FIG. 9 that each of the lateral shaft housings 19 has been provided with a vertical annular flange at its tip, which is bolted by means of stud bolts to threaded corresponding recesses in the parallel vertical side faces of the cylindrical bearing-retaining compartments of the central gear box 25. Two of the multiple said stud bolts are designated by numeral 77 in FIG. 9 and also serve in part to mount on one housing 19 a driving means of a pressure fluid pump in a hydraulic valve assembly mechanism to be explained later herein also. It will be appreciated that additional radial ball bearing assemblies may be inserted in lateral housings 19 around shafts 18 intermediate the tips thereof. Because of the necessary small scale of the parts, no crosshatching of cylindrical shafts 18 and 12 and their bisected bevel gears 17 and 16 has been shown, because such crosshatching would only be confusing. Diagonal lines in the expanded tips 71 and 70 of housings 13 and 19 are used to indicate the axes of tapered roller bearings in FIG. 4, although it will be appreciated that radial and axial thrust bearings, either ball bearings or tapered roller bearings, alternatively, with axes of reverse axial thrust may be employed, particularly if the shafts 18 are not made readily slidable from the grooved recesses of retainer 33 for demounting said shafts 18 in the most desirable arrangement shown in FIGS. 8 and 9.

FIG. 4 indicates that a suitable engine E, such as a conventional reciprocating piston engine having its cylinders radially disposed around the axis of a crankshaft as is well known in the art, may be mounted in a compartment below the floor of the fuselage 1 and may transmit its power in flight through a conventional friction clutch C, manually operable by the pilot, and through an overrunning clutch O, of conventional design well known to the art permitting the upper segment thereof to rotate freely in one direction at a faster rate than the engine drive shaft, having its free segment, alternatively subject to restraint of a conventional brake B such as is well known to the art, rigidly attached to the lower tip of an upright, but not necessarily vertical, shaft 30 rotatable in suitable bearings at its upper and lower tips through a tubular housing 31, whose expanded upper tip enclosing the upper tapered roller bearing 32 shown in FIGS. 8, 9 has a horizontal annular flange provided with multiple holes by which stud bolts 31' join housing 31 to corresponding threaded holes in the lower horizontal face of central gear box 25. It will be understood, however, that I am making no claim of having invented such an engine E, whether having reciprocating pistons or some other kind of prime mover engine such as a gas turbine engine having suitable speed reduction gears well known to the art, and likewise make no claim as to the driving means such as the clutch C, the overrunning clutch O, and the brake B, all of which are well known to the art. It is intended hear merely to specify that shaft 30 is rotatable in suitable bearings 32 in a cylindrical tubular housing 31 rigidly attached to the face of gear box 25, in which is rotatable a small bevel pinion gear 29 having its teeth meshing with those corresponding of ring gear 28 and being rigidly attached to the tip of shaft 30, by which engine E rotates ring gear 25 in powered flight at most times, but which is free to turn faster than the engine E drive shaft at any time by virtue of the overrunning clutch between said shaft 30 and the drive shaft of engine E, which would turn about 10 times as fast as rotors S and S' according to the dimensions of the rotationally interconnecting ears shown as mounted rigidly on shafts 30, 33, 18, and 12. Since the axes of the aforesaid shafts are perpendicular to their respective counterparts, it is possible therefore to employ bevel gears and a ring gear now in mass production in the automobile industry for the differential gear arrangement thereof. Bevel gear 27 shown mounted rigidly on the front tip of shaft 5 in detail FIG. 8 as well as in FIG. 5 is an exact duplicate of bevel gear 29 mounted on the upper tip of shaft 30, and the teeth of both said gears are continually in mesh with the teeth of ring gear 28 with virtually no movement of the said two smaller gears permissible by their respective shaft bearings with respect to the ring gear 28 except around their respective substantially fixed axes, thereby insuring continued workability and long life of the several gears requiring tolerances of only a very few thousandths of an inch.

In the vertical plane of FIG. 4, perpendicular to the longitudinal axis of generally cylindrical fuselage 1, diagonally disposed truss members 69 and their aligned component counterparts 69' above the horizontal tubular shaft housings 19 are attached rigidly, and alternatively by easily detachable means not shown, to the respective right and left parallel longitudinally disposed somewhat horizontal landing frame members 11' at their midpoints directly below the outer limits of the sidewalls of fuselage 1 and between the vertically disposed four legs of the inverted U-shaped tubular fuselage frames 11, while the upper tips of respectively aligned components 69' above those housings 19 are attached rigidly to vertically bisected cylindrical mounting sleeves 72, each of which respectively may have its inner and outer flanged segments joined together by multiple bolts as indicated by broken lines in detail FIG. 16, which also indicates that the upper tips of cylindrical bracing frames 69' are welded to the inner segments of the respective cylindrical mounting sleeves 72 shown in FIG. 4. Mounting sleeves 72 are rigidly attached to the upper halves of tubular housings 13 by suitable means, and FIG. 36 indicates that stud bolts 72' may be screwed into the outer segments of sleeves 72 to protrude into corresponding small holes in said housings 13 as setscrews to hold said mounting sleeves 72 up against the expanded upper tips of housings 13, in which bearings 14 of shafts 12 are mounted, respectively. Since tubular housings 13 of shafts 12 and the rigidly attached truss members 69', 69 are the primary means by which side-by-side mounted main sustaining rotors S and S' lift the landing frame members 11' and thereby the fuselage 1 mounted thereon, it is essential that truss segments 69 and 69' in substantial alignment on each side of the fuselage 1 be joined somewhat rigidly to each other and to the horizontal laterally disposed tubular housings 19. And, since it is desirable that these outrigger framework elements 19, 69, and 19 not be welded together in order to permit easy demantling of said frameworks for shipment and storage at times, there is shown in FIG. 37 a suitable means of joining those elements somewhat rigidly but demountably. In FIG. 17 the joining member 19—69—69' is composed of two segments bolted together by horizontally disposed multiple bolts, each of the two segments being provided with vertical flanges having suitable holes for accommodation of those bolts and having cylindrical tubular half segments fitting around the tubular housing 19 and around the tips of the respective diagonally disposed tubular bracing truss members 69 and 69'. In order to make the installation of the trusses more rigid even though removable from the tubular housing 19, the respective tips of tubular truss members 69 and 69' are welded to one of the segments of linking member 19—69—69', to which the other half thereof is bolted around the horizontal tubular housing 19. Two of stud bolts are shown as means keeping the linking union member 19—69—69' from moving with respect to the tubular housing 19, which is quite stiff and is the primary element of the outrigger framework on each side of the fuselage 1. The linking union member 19—69—69' shown in FIG. 17 may have its respective cylindrical tubular sections extended along each of the enclosed three tubular members for any suitable distance to add rigidity to the framework; but, even if the tips of aligned truss members 69 and 69' are welded directly to the tubular housing 19, the novel framework shown in FIGS. 1 and 6 will give maximum rigidity for minimum weight in mounting tubular housings 13 of rotor mounting shafts 12, for suspension of the craft by means of truss members 69, 69' attached to stiff tubular housings 19 intermediate the tips thereof gives greater rigidity to the inner and outer segments of those housings on each side of those attachments of the truss members than would be the case if truss frames 69 simply were attached to the lower sides of gear boxes 15 far removed from the fuselage. Moreover, attachment of truss members 69, 69' to the respective tubular housings 19 intermediate the tips thereof makes it possible to remove those gear boxes 15, bolted to the annular flanges of the respective expanded tips of tubular housings 19 and 13, from the outrigger frameworks for repairs such as installation of new bearings without complete demounting of those frameworks, although it will be appreciated that the gear boxes 15 may have large inspection plates bolted to the diagonal faces of those gear boxes respectively for easy installation of the bevel gears on the tips of shafts 18 and 12 that protrude into said gear boxes 15. And the rigidity of tubular housings 19 in their segments outward from the places at which the truss members 69 and 69' are joined rigidly to the respective tubular housings 19 intermediate the tips thereof also tends to some extent to keep tubular housings 13, which are rigidly bolted to the upper faces of gear boxes 15, from tilting longitudinally with respect to the tubular mounting sleeves 72 rigidly attached to the upper tips of said upright housings 13 of rotor shafts 12 of the side-by-side rotors.

While no specific means for rigid attachment, other than one such as welding, of truss frame members 69 to the midsections of parallel longitudinally disposed tubular landing frame members 11' have been shown in small scale FIGS. 3 and 4, it is to be understood that a most desirable kind of fixed attachment of the lower tips of truss frames 69 to the respective landing frame members 11' would be by means of a U-shaped strap clamped tightly around the tubular landing frame member 11' and bolted to the truss frame tip by nuts on at least two tip-threaded bolts inserted through corresponding holes in the tips of said truss members 69 and the said U-shaped straps attaching them rigidly to the landing frame members 11', so that the outrigger frameworks may be detached quickly from the sides of the fuselage 1 and the landing framework beneath it, when and if desired for compact storage of the aircraft or otherwise. Note again that the inner axially splined tips of drive shafts 18 are rather loosely fitted in the ring gear retainer 33, which supports them in bearings 34, so shafts 18 easily can be removed therefrom on loosening exterior nuts from bolts, not shown, attaching annular flanges of the outer segments of housings 19 to the sidewalls of the fuselage 1 and the segments of those respective housings 19 within the fuselage, to which suitable protective circular plates provided with corresponding holes for bolts then can be attached during storage. There is no serious problem in keeping truss segments 69 and 69' aligned with each other under tensional lift of rotors S and S' lifting up on tubular housings 13; but there will be considerable shock compression on stiff tubular truss members 69, when the weight of those rotors S and S' may come down quite abruptly, under some circumstances, on gear boxes 15 on landing, and it therefore is desirable to rigidly attach a small curved strap to each of the tubular housings 19 immediately outside the respective linking clamped coupling members 19—69—69' such as indicated in FIG. 17.

Thus aligned and rigidly joined truss segments 69, 69' respectively rigidly attached to exterior sections of housings 19 intermediate their tips as shown on each side of the fuselage 1 as well as 51 serve with minimum weight to keep axes of shafts 12 of the paired main sustaining rotors substantially parallel to each other and to a vertical plane including the longitudinal axis of the fuselage. Note in this connection in FIG. 4 that aligned truss members 69, 69' on each side of the fuselage 1 are disposed at almost 45° angles with respect to the vertical plane including the longitudinal axis of the fuselage, because, instead of attaching diagonally disposed frame members 69 at their lower tips to the interior framework of fuselage 1, the lower tips of truss frames 69 are attached rigidly to the parallel landing frame members 11' kept widely and rigidly spaced from each other by multiple horizontal cross landing frame members, only one of which can be seen in that figure below and supporting the compartmental space reserved for an engine E. It also can be seen in FIG. 4 that rearward of the engine E are upright but not exactly vertical legs of another inverted U-shaped tubular interior fuselage frame member 11, which is slightly different from a similar frame member 11 adjacent the hemispherical rear end wall-tip of fuselage 1, as specified in connection with FIGS. 3 and 18 showing a suitable mounting of tubular bracket 8, but which in FIG. 6 conforms also to the laterally arched roof and the slightly restricted sidewalls of the otherwise generally cylindrical fuselage 1. Note in FIG. 1 in this connection that this slight restriction of the midsection of the fuselage 1 increases gradually from the areas immediately adjacent the hemispherical end wall-tips of the fuselage toward the midsection of that fuselage 1 shown in FIG. 4, which shows that the restriction of the sidewalls at that midsection is greater at the top, adjacent the arched roof, than at the floor adjacent the bottom of the fuselage 1. The above noted midsectional restriction of the sidewalls 1' of the fuselage 1 is for the purpose of decreasing resistance of the fuselage to the downdraft of air from blades 50 except adjacent the outer tips of those blades for purposes to be explained later herein.

While, as explained previously, truss frame members 69' and the lower truss frame members 69, rigidly attached to the pair of parallel landing frame members 11' as well as to tubular housings 19 and the respective frames 69' above them, also tend with their minimum weight to keep upright rotor shaft housings 13, and their respective gear boxes 15 and horizontal lateral tubular housings 19 attached thereto as rigidly as possible by means of multiple bolts joining the respective tubular housings 13 and 19 to said gear boxes 15 from rotating around the axes of tubular housings 19 to a very considerable extent, it is very necessary to have additional means directly preventing such rotation with respect to the fuselage, vibrationally and otherwise. In FIGS. 1, 3, and 4 it can be seen that I have provided inverse symmetrically and diagonally disposed right and left rear tubular outrigger framework bracing members 10', whose upper and outer and forward tips respectively are joined securely to the two-part cylindrical mounting sleeves 72 attached securely to the upper halves of tubular housings 13 of the outrigger frameworks adjacent their upper expanded tips 73 mounting shaft bearings 14, and whose inner and lower and rear tips respectively are joined somewhat rigidly to the fuselage 1 at approximately the same level as the lateral horizontal tubular housings 19 emerging from said fuselage sidewalls adjacent the outer tips of the laterally arched roof of said generally cylindrical fuselage 1 having a somewhat horizontally disposed longitudinal axis, but at corresponding points considerably rearward of said lateral housings 19, where the flanged rear tips of said outrigger framework bracing members 10' are secured not only to the respective cylindrical walls of the fuselage 1 but, by means such as the U-bolts 22 illustrated in detail FIG. 30, to the inverted U-shaped tubular interior fuselage framework 11 installed in the rear cylindrical section of said fuselage 1 adjacent the vertical plane marking the juncture of said cylindrical fuselage section with its substantially hemispherical rear end wall tip, as indicated in FIGS. 1 and 3.

FIG. 16, which shows a vertical lateral cross section of one of the two inversely paired right and left cylindrical mounting sleeves 72, to which the upper tips of the diagonally disposed angle bracing members 69' respectively are attached rigidly, as also indicated in FIG. 4, also indicates that a vertically and longitudinally disposed strap flange may be attached to the upper and outer tip of each of the tubular bracing frame members 10' as a means of easily detachably but rigidly attaching the tips of said outrigger framework braces 10' to the respective mounting sleeves 72. Such a vertical flange integrally attached to the tip of the tubular bracing member 10' shown in FIG. 16 indicates that the said flange of brace 10' is clamped rigidly, by means of multiple bolts and nuts shown in broken lines, between the corresponding inner and outer four vertically disposed flanges of the segmented sleeve 72, whose four pierced and spaced flanges are joined rigidly to each other and to the intermediate pierced flanges of the tubular angle-bracing outrigger bracing members by said multiple bolts indicated by broken lines also. Note in FIG. 16 that a threaded round hole is provided in the outer segment of cylindrical upright sleeve 72; and into such threaded holes provided in each of the sleeves 72 are screwed small stud bolts that likewise penetrate into corresponding holes in the enclosed upper portions of tubular housings 13 and thereby keep sleeves 72 fixed with respect to those housings 13 respectively.

FIGS. 1 and 3 also indicate that other corresponding outrigger framework bracing members 10 disposed forwardly of the axis of lateral housings 19 are quite similarly symmetrically and diagonally disposed with respect to the vertical plane containing the longitudinal axis of generally cylindrical fuselage 1 and with respect to a horizontal plane including the axis of aligned lateral housings 19, the upper and outer and rear tips of said bracing members 10 being attached securely by suitable means at approximately the same level as the rear such members 10' to the sidewalls of the generally cylindrical fuselage 1 quite considerably forward of the respective points of emergence of housings 19 from the sidewalls thereof, where the somewhat vertically flanged forward tips of said bracing members 10 also are joined securely to the respective right and left segments of the interior fuselage frame member 11 installed adjacent the front hemispherical end wall-tip by suitable means such as U-bolts 22 shown in FIG. 30 as extending around the vertical midpoint of the opposing rear interior fuselage frame member 11. The front outrigger framework braces 10, which are diagonally and symmetrically disposed with respect to the vertical plane including the longitudinal axis of the fuselage and with respect to the horizontal plane including the axis of aligned lateral tubular housings 19 as well as the vertical plane including the axis of said housings 19 between the front and and rear bracing frames 10 and 10' respectively, operate in tensional conjunction with rearwardly disposed and diagonally disposed bracing frames 10' to keep upright housings 13, to which mounting sleeves 72 are rigidly attached in the upper halves thereof respectively as specified, from rotating at all around the stiff stubs of lateral tubular housings 19, braced otherwise in the lateral vertical plane including their aligned axis by truss members 69, 69' respectively aligned and attached somewhat rigidly to respective housings 19 intermediate their tips, as specified previously, which keep the respective mounting sleeves 72 pressed outward from the fuselage by means of diagonally disposed angle frames 69', whose upper tips are securely attached to the respective said cylindrical mounting sleeves 72, shown in FIG. 4 as mounted on respective right and left tubular rotor shaft housings 13 adjacent the upper tips thereof and at considerable distances from the stiff tubular drive shaft housings 19 forming the primary segments of the respective right and left outrigger frameworks.

Note from the broken lines in FIG. 3 that the diagonally disposed outrigger bracing frame members 10 shown in FIG. 1, which are attached rigidly to the respective right and left sidewalls of fuselage 1 adjacent the plane of juncture of the cylindrical section thereof with the forward hemispherical end wall-tip, and which are quite fixedly attached to the tubular inverted U-shaped interior fuselage framework member 11 at those same planes adjacent the outer edges of the laterally arched somewhat horizontal roof of the generally cylindrical fuselage shown in FIG. 6, actually are small but rather long fixed wings having suitable dihedral angle with respect to the vertical plane including the longitudinal axis of the fuselage, with respect to which the longitudinal axis of said small fixed wings 10 are swept back at radical angles, shown as about 30° from the vertical lateral plane, so that, in event of substantial diminution of power of the engine during forward travel of the craft at the high speeds of which it is capable for several reasons, these small fixed wings 10 serve as stabilizing airfoils having appreciable lift at their chords adjacent the fuselage to which they are attached. The pair of almost parallel broken lines in the wings 10 of FIG. 3 indicate that within each of said fixed stabilizing wings 10, whose forward edges are higher than their trailing edges at points of attachment to the fuselage to give lift to the front tip of the fuselage in event of substantial engine power diminution, that would alter flow of air between the blades 50, and whose angles of attack are designed to increase gradually toward their outer and upper tips of said wings 10 primarily to streamline the outer sections of the wings in the downwash of air by the said blades 50 rotating above them, is a tubular tensional spar of gradually decreasing diameter toward its outer tip, which is attached somewhat rigidly to the respective cylindrical mounting sleeve 72 at the upper tip of upright tubular housing 13 of shaft 12, just as it is indicated in FIG. 116 that the rearwardly disposed bracing frames 10' may be attached by suitable nuts and bolts, indicated by broken lines, inserted through respective holes in the vertical flanges forming the outer tips of said tubular outrigger bracing frames 10 and 10' and being bolted between the vertical flanges by which the two segments of the cylindrical mounting sleeves 72 are joined to each other and to the flange tips of said bracing frame members of the outrigger frameworks, one segment of the mounting sleeve being rigidly welded to its respective diagonally disposed bracing frame member 69', which thus is clamped to the upper half of the upright tubular housing 13 at a considerable distance from the gear box 15 bolted rigidly to the outer tip of normally horizontal tubular housing 19.

While the chords of the two fixed stabilizing airfoil wings 10 are substantially streamlined with the rotary and somewhat rearward downflow of air from blades 50 of the side-by-side mounted main sustaining rotors S and S' in powered flight at ordinary forward translational speeds of my aircraft up to about 200 miles per hour, the chords of said stabilizing wings 10, which are greatest at planes of juncture with the fuselage 1, are not disposed at such great angles with respect to the horizontal plane including the longitudinal axis of the fuselage that those fixed wings 10 will tend to stall at moderate forward speed, when flow of air between blades 50 is reversed, to flow upward with respect to said blades on loss of altitude by the aircraft, immediately and automatically by change of pitch of said blades 50 in response to decreased torque of the engine on rotor-mounting shafts 12 without the pilot's even being aware of said changes of pitch of those blades. And, while vertical lift of stub wings 10, under tension between fuselage interior frame 11 and cylindrical sleeves 72 rigidly attached to the upper halves of upright outrigger tubular frames 13, is not very great under ordinary engine powered flight, when flow of air between rotating blades 50 is downward with respect to said blades 50 and the aircraft sustained thereby, the instantaneous lift of the front tip of the aircraft by stabilizing fixed wings 10 is quite necessary as a supplement to the longitudinal tilt-stabilizing tendency of tail rotor P, whose rather short blades 6, made of limited length and weight for easy oscillatory pivoting by the pilot through bracket 8, are not powerful enough to maintain proper posture of the fuselage 1 with respect to the horizon immediately in case of engine power diminution of torque on main rotor mounting shafts 12, when the craft is traveling forward at high translational speed, even though the pitch of blades 6 will be reversed instantaneously by means to be described later herein without necessity of any adjustment by the pilot for that purpose.

But at the same time it will be noted that, because of the great dihedral angle of fixed stabilizing wings 10 with respect to the vertical plane including the longitudinal axis of the fuselage, and because of the great amount of backsweep of said wings 10 from front fuselage interior frame member 11 adjacent the hemispherical front end wall of the fuselage to the rear tips of those spars attached under tension to the mounting sleeves 72 at the vertical lateral plane including the axes of rotor-mounting shafts 12, it is possible to give those small stabilizing wings 10, having little weight because they are under tension, sufficient angles of attack adjacent the fuselage 1 that they will give an adequate amount of lift in that area, even when the craft is being sustained by the power of the engine rotating blades 50, because the downdraft from blades 50 will be swept inwardly toward the front half of the fuselage 1 at that quadrant of the orbits of blades 50. Any such lift of stabilizing wings 10 in ordinary powered flight is of rather small significance, however, in comparison with the necessary instantaneous increased lift of those wings 10 in case of engine power diminution to such extent that the aircraft begins to lose altitude, during which time the pilot otherwise has complete control of the craft for steering from side-to-side, by pivotal oscillation of rotor assembly P on housing 7 mounted through tubular bracket 8, and even for reversing the forward motion of the aircraft by means of lever 79 of hydraulic valve assembly mechanism 76 to be described later herein.

In FIGS. 1 and 3 the four symmetrically and diagonally disposed outrigger bracing frame members 10 and 10' of the upright tubular housings 13 mounted in paired right and left upright sleeves 72 are shown as being of substantially the same length, so that in FIG. 3 the tubular housings 13 of rotor shafts 12 are exactly perpendicular to a horizontal plane including the longitudinal axis of the generally cylindrical fuselage 1, although those housings 13 obviously might be mounted alternatively at slight angles from the perpendicular posture so shown, both laterally with some increased cost of gears in boxes 15 and longitudinally of the fuselage. But in forward translational flight it is contemplated that, in order for the rotor shafts 12 mounting hubs S and S', substantially perpendicular thereto in rotation, to derive necessary horizontal forward component thrust, the fuselage 1 of somewhat limited length will be tilted forward slightly with respect to the horizon, in which position of the fuselage the passengers as well as the pilot can look forward through the largely transparent front doors 1'' to view the objects in front of and below the craft, which thus does not need to have the floor and seats mounted on an incline with respect to the cylindrical fuselage to permit such forward downward viewing by the passengers.

Contemplated transparent curved panes of doors 1'', mounted on vertical axis hinges at the outer edges thereof respectively, have not been shown in the drawings, and neither have there been shown obviously possible alternative transparent side windows and doors of fuselage 1; but it is contemplated that a large transparent plastic curved pane mounted in the rear hemispherical tip of said fuselage 1, whether the transparent pane be mounted in a window or in doors corresponding inversely to the doors 1'' shown at the front of the fuselage in FIGS. 1 and 3, would permit rearward viewing by the pilot, particularly on landing of the craft, when he might wish to tilt the craft downward toward its rear end by means of adjustment of collective pitch of blades 6 of rotor assembly P to check forward movement of the craft, or to better utilize the final rotary momentum of main sustaining rotors S and S' under aerodynamic autorotation thereof in sustaining the craft at the last moment on landing in case of engine failure, or to use some downward pull of rotor blades 6 of rotor P momentarily to bring the rear tips of longitudinally disposed landing frames 11', somewhat rearward of fuselage 1, to the leading pad gradually and without landing shock, thereafter permitting the craft to rock forward on said landing frames 11', having their tips slightly upturned from their generally horizontal posture as shown in FIG. 3, with minimum landing shock to the passengers in the fuselage. It must be noted, however, that downwash of air from blades 50 of rotors S and S' would react somewhat differently on doors similarly mounted at the rear tip of fuselage 1 from the tendency of downwash from blades 50 to close paired doors 1'' at the front of the fuselage 1, even in addition to the closing tendency on those doors 1'' at the front of the fuselage in rapid forward translational movement of the craft. Whereas the front doors 1'' can be propped open, in spite of the downwash of air from contrarotating blades 50, as indicated in FIG. 1 by curved arrows with the blade tips retreating over the top of the fuselage, during hovering by a horizontally suspended lateral pole or similar instrument until the doors could be otherwise secured in open positions by suitable means, such inversely corresponding rear doors similarly attached on vertical pivots of hinges mounted in the inversely corresponding opening in the rear hemispherical tip of the fuselage 1, unless secured by suitable means such as a horizontal bar latch secured to the midsectional edges of said doors and extending across said alternative rear opening in the fuselage 1, would tend to fly open as a result of suction of the rearward rotary downwash of air from blades 50, the tips of which tend almost to meet those of the opposing rotor in orbit above the center plane of fuselage 1 as shown in FIG. 1, but which alternatively may have the respective orbits overlapping slightly over the longitudinal midsection of the fuselage, since rotor hubs S and S' are rotationally interconnected by suitable shafts and gears and turn in unison.

In connection with FIGS. 1 and 3 it also may be noted here that blades 50 of the paired rotors S and S' rotating in opposite directions and having their blade tips retreating over the respective halves of the laterally arched roof, FIG. 4, having its center line crest substantially parallel to the longitudinal axis of generally cylindrical fuselage 1, will tend to build up slight pressure over the roof of the front half of the fuselage forward of lateral shaft housings 19, to the rear of which the rearward downdraft of air from retreating blades 50 will tend to be parted by the arc of the roof of the rear half of the fuselage 1, which thus also tends to protect blades 6 of the auxiliary tail rotor P from such downdraft of the main sustaining rotors, if blades 6 be disposed slightly below the rearward orbits of blades 50 as indicated in FIG. 3. It will be noted therefore that the tips of blades 50 retreating over the fuselage 1 will tend even more in forward translational flight to build up more air pressure over the front half of the roof of the fuselage than over the rear half thereof, thereby tending to cause the aircraft to rotate around its horizontal lateral axis even more than might be caused by the lift of blades 6 of relatively small tail rotor P, whose vertical lift may be only about enough to sustain its pivotally mounting members 8, 8', 8'', 7, 4, 3, 2, etc. But in addition to the foregoing desirable tendency of air pressure derived from downwash of air from blades 50 on the front half of the roof of fuselage 1 to tilt said fuselage forward, to induce forward flight derived from the horizontal component vector force of the downthrust of rotors S and S' having blades 50, the longitudinally disposed and somewhat horizontal laterally arched roof of the generally cylindrical fuselage 1 tends to deflect upward the flow of downwardly rotating air from blades 50 during the forward quadrants of the retreating and adjacent phases of the orbits of the blades 50 of the respective paired rotors S and S' toward the longitudinal center plane of the fuselage. And that upward deflected air derived from rotation of blades 50 of one side-by-side mounted rotor, particularly during the first half of the retreating phase of the orbit of blades 50 of that rotor toward the front half of the longitudinal vertical center plane of fuselage 1 having laterally arched roof somewhat horizontally disposed, tends to travel upward across said laterally arched roof, disposed longitudinally and substantially parallel to the longitudinal axis of the cylindrical fuselage, where the formerly downwardly rotating air driven by blades 50 tends to rise up and support the tips of blades 50 of the respectively opposite paired side-by-side main sustaining rotor. But the upwardly deflected air traveling across the laterally arched roof of the fuselage from the tips of blades 50 tends to be deflected upward most by cumulation at the longitudinal center line of the laterally arched roof of the fuselage and at the line directly between the two paired said rotors during the phase of their blade orbits in which, during rapid forward translational flight, the relative air speed and resultant lift of said blades 50 would be minimum. And thus, by virtue of the well known law of physics termed "precession" by which a force applied to a rotating body tends to manifest itself 90° around the axis from the point at which the force is operative, the lift of the air upwardly deflected by the arched roof of the generally cylindrical fuselage 1 against the tips of blades 50 on the opposite side thereof will tend to lift the tips of blades 50 most at the rear phases of their orbits, which is the location at which lift is most necessary in order to equalize lift throughout the orbits of said blades 50 and thereby relieve stresses on and vibrations of those blades resulting from orbital variations in lift as well as overall increase in lift of rotors S and S', because the discloading remains somewhat the same throughout the orbits of the blades 50 of each rotor instead of having the respective main sustaining rotors S and S' subject to a retreating phase far removed from the fuselage (as in a helicopter having much longer blades of a single main sustaining rotor, or as in a craft having side-by-side mounted rotors on shafts closely spaced above a fuselage and turning in opposite directions with the two blades of each intermeshing with those of the paired rotor turning in unison in which the lift of its blades is substantially reduced in rapid forward translational flight during half of their orbits even with a single blade pivotally mounted on an axis perpendicular to the axis of the rotor mounting shaft, as is the case with the retreating phases of the blades of helicopters having a single main sustaining rotor and also with aircraft having main sustaining rotors mounted in tandem as in previous "autocopters" as well as with some previously contemplated "tail-heavy" helicopters that combine the characteristics of such "autocopters" with those of a "helicpoter" requiring a "tail rotor" that in addition to some vertical lift can exert some "countertorque" on the driving by its engine of its much larger main sustaining rotor mounted forward of said "tail rotor" on the longitudinally disposed fuselage by virtue of the diagonal disposition with respect to the horizon of the mounting shaft of the "tail rotor" rising upward somewhat from the tail boom rear integral section of the fuselage framework of said hybrid aircraft. And, by virtue of the lift of air deflected upward by my fuselage 1 by blades 50 of one of my side-by-side mounted main sustaining rotors against the blades 50 of the side-by-side rotor on the opposite side of the fuselage during the retreating phases of the orbits of blades 50 of paired rotors S and S' on each side of said generally cylindrical fuselage 1, it is possible for my aircraft to travel up to 100 miles per hour faster than previous aircraft sustained by rotating blades on upright shafts, not to mention that the more uniform lift throughout the orbits of blades 50 of my rotors S and S', mounted side-by-side on outrigger frameworks at each side of the fuselage 1, will enable my rotary wing aircraft in engine powered translational flight to carry more people farther on the same amount of fuel with thus greater range and with much greater safety and less cost of manufacture, maintenance, and operation.

In connection with the foregoing specifications as to the upward deflections of air traveling across the longitudinally disposed crest of the laterally arched roof of fuselage 1 as a result of the inward sweeps of blades 50 of the paired rotors S and S' turning in opposite directions toward the front part of said arched roof immediately below the tips of said blades 50 in their orbital paths, it will be noted that only the tips of blades 50 of those side-by-side mounted rotors ever force the air downward onto said laterally arched roof for deflection upward against the blades 50 of the rotor on the opposite side of the fuselage, although the air deflected upward by those blade tips can and does react in lifting the blades 50 on the opposite side respectively of the fuselage 1 most effectively adjacent the tips thereof, at which outer segments of the several long blades 50 the leverage of those blades is most effective in sustaining those blades in their orbital paths during the retreating phases of the orbits of their tips over circular segments of the laterally arched roof having a crest somewhat parallel to the longitudinal axis of the fuselage. Since the lift of the upwardly deflected air is most effective only adjacent the tips of blades 50 for sustaining them in their orbital paths during the retreating phases thereof, it will be noted from FIG. 1 that fuselage 1 is gradually restricted inwardly to some extent toward the midsection thereof and is more restricted toward the laterally arched roof than at the floor of that fuselage as shown in FIG. 4, so that most of the downwashed air from blades 50 will be unobstructed in its travel downward to give lift directly to those blades 50 by their acceleration of said air downward, and rearward adjacent the fuselage. And, after the air is deflected upward in traveling across the fuselage 1 to a limited extent by its laterally arched roof only a short distance below the retreating rotating tips of blades 50 of the two side-by-side mounted paired rotors turning in opposite directions, that same upwardly deflected air then is deflected downward by the blades 50 on the opposite side of said generally cylindrical fuselage having its sidewalls 1'' drawn closer together adjacent the roof and at the midsection of the fuselage than adjacent the generally hemispherical end wall tips thereof.

The foregoing means of sustaining the tips of the blades 50 during the retreating phases of their orbital paths of course is in addition to the fact that lift of blades 50 is equalized somewhat throughout their orbits by the fact that rotor hubs S and S' as indicated in FIGS. 22, 23, and 24 are universally oscillatable within gradually restricted limits with respect to the axes of their mounting shafts 12 respectively by virtue of the resilient flexibility of their annular connecting hub members 128 and 129, which are explained in the accompanying separate application in response to the "Restriction Requirement" of Aug. 1, 1958. And, while the roof of my fuselage 1 has been described as the "laterally arched" upper segment of my generally cylindrical fuselage 1, the central cross section of which is shown in FIG. 6 as being a slight departure from the more circular inverted U-shaped frames 11 conforming to the more cylindrical sections of the fuselage adjacent the generally hemispherical end walls thereof, it will be appreciated that alternatively the "laterally arched" rather long and generally horizontal roof of the fuselage 1, which deflects upward the air driven across it by the outer tips of blades 50, when they approach gradually the vertical plane including the longitudinal axis of the fuselage 1 at the front half thereof, that "laterally arched" roof of the fuselage alternatively may be in the form of a long rather flat gable of about 160°, whose crest would be in that vertical plane containing the longitudinal axis of the fuselage 1. The essential feature is that the tips of blades 50 in approaching that plane would gradually build up the air pressure against the "arched" roof, which then would deflect said air upward against the blades 50 of the other one of the paired side-by-side main sustaining rotors S and S'. Although FIG. 1 shows the blades 50 of each of those rotors as being exactly opposed to the corresponding blades of the other corresponding paired rotor, it will be appreciated that this arrangement was primarily for ease of drafting the same arrangement in the restricted space available in small scale FIG. 4; and blades 50 of one rotor actually will be staggered midway of the space between corresponding blades 50 of the other such paired rotor on the opposite side of the fuselage 1.

While my outrigger frameworks mounting paired side-by-side shafts 12 of rotors S and S' on the two sides of the fuselage are made most simple with a minimum number of relatively light parts in addition to the primary lateral horizontal tubular housings 19, which are only rather short and therefore stiff stubs at their respective places of juncture with the diagonally disposed truss frame members 69,69' at the sections of each intermediate its tips, it will be noted that those outrigger frameworks are substantially quite rigid in their mounting of upright tubular housings 13 of shafts 12 mounting those contrarotating blades 50. By looking at FIGS. 1 and 3 it can be seen that braces 10 and 10', which are diagonally disposed with respect to the vertical and somewhat horizontal planes including the longitudinal axis of the fuselage at right angles to each other and with respect to the vertical plane including the axes of upright tubular housings 13, keep the cylindrical mounting sleeves 72 rigidly attached to the upper halves of said housings 13, having their axes in a somewhat vertical plane halfway between the two interior fuselage frames 11 adjacent the hemispherical front and rear end walls of the generally cylindrical fuselage, from which their four legs project downward to points of rigid attachment to the landing framework beneath, at fixed equal distances from the fuselage. And the horizontal lateral housings 19, to which the gear boxes 15 are rigidly attached at their outer tips as well as to the lower expanded tips of the upright tubular housings 13, keep the lower tips of those housings 13 and their enclosed shafts 12 similarly spaced with respect to the fuselage and with minimum resistance to downdraft of air from blades 50 above in orbit. The attachment of those diagonally disposed braces 10 and 10' to mounting sleeves 72, somewhat rigidly attached to the upper halves of upright tubular shaft housings 13 at considerable distances respectively from the gear boxes 15 on each side of the fuselage at the outer tips of tubular housings 19, is highly important for my aircraft, which is subject to quick tilting of the fuselage longitudinally around its horizontal lateral axis, because the resiliency of my hubs S and S' of my side-by-side paired main sustaining rotors, regardless of whether each has two, three, or more blades oscillatable within gradually restricting limits on axes of hubs perpendicular to the axis of the respective mounting shaft 12, tends to cause those rotors mounted on said shafts 12 in suitable bearings in tubular housings 13 to act as gyroscopes tending to preserve the lateral as well as longitudinal stability of the aircraft, although blades 50 of rotors S and S' having cantilever and somewhat tangential mountings in their outer hub segments, as indicated by FIGS. 10, 11, 12, can oscillate longitudinally somewhat in spite of the hub resiliency of annular members 128, 129 as those hubs may oscillate universally on multiple axes perpendicular to the axes of respective shafts 12 as required for equalizing lift throughout orbits of blades 50, thereby minimizing vibration and strains on the blades, etc. Such vibration of the blades 50 would be greater in rotors mounting two blades each than in the three-blade rotor hubs S and S' shown in FIG. 1; and this is particularly significant in the cross currents of air on the sustaining rotor blades 50, when the aircraft is traveling forward at high translational speeds.

When tail rotor P, mounted far to the rear of fuselage 1 and the somewhat vertical plane including the axes of shafts 12 of rotors S and S' and thus having great leverage on the outrigger frameworks at the sides of the fuselage, forces the gear box 4 mounting blades 6 up or down in spite of the stabilizing tendencies of rotors S and S' acting as gyros at rather high rotational speeds because of the comparatively short length of blades 50, whose outer tips need not exceed the speed of sound even on the advancing sides of their orbits in very rapid forward translational movement of the aircraft, each of the rotor mounting shafts 12 tends to try to tilt laterally, in the opposite direction from that of the shaft 12 mounted on the opposite side of the fuselage, as a result of the well known law of physics called "precession" that a force acting on a rotating body, such as rotors S and S', having resiliently flexible hubs, tends to manifest itself 90° from the point of application of said force, in this case the longitudinal tilting of fuselage 1 and its outrigger frameworks around the lateral horizontal axis of the aircraft. But, in addition to the fact that torque of the engine on one shaft 12 automatically cancels its torque, regardless of the amount and variation thereof of torque by the engine or even complete absence thereof, on the paired shaft 12 on the opposite side of the fuselage with no resultant tendency of the fuselage to rotate horizontally around its vertical axis, the lateral precession of rotor S and its counterpart rotor S' as a result of the resiliency of those hubs is exactly balanced laterally by virtue of the substantially rigid mounting in said outrigger frameworks, rigidly attached to fuselage 1 and its frame members 11, of tubular housings 13 rotatably mounting shafts 12, so that lateral stability of the aircraft if preserved by rotors S and S', having somewhat cantilever mountings of their blades 50, in spite of longitudinal tilting of fuselage 1 by rotor P at the election of the pilot, as will be explained later herein. But note again that diagonally disposed bracing frames 69 and 69', substantially aligned in the same upright plane including the axes of tubular housings 13, tend with minimum weight and air resistance to the downdrafts of blades 50 or rotors S and S' to keep said axes of tubular housings 13 substantially parallel in that upright plane. In this connection it also should be noted that, while it is not practical to mount the large side-by-side rotors S and S' in exactly the same way that tail control rotor assembly is pivotally mounted in the present application because of differences in size of the rotors, the outrigger framework bracing arrangements shown in the present drawings for the side-by-side rotor, having their tubular housings 13 rigidly attached to the fuselage 1, are well adapted to pivotal mounting of tubular housings 19 of the laterally and horizontally disposed drive shafts 18 so that rotors S and S' can be tilted forward on a craft such as that shown in FIGS. 2 and 8 to make the front pair of smaller rotors pull horizontally a fuselage, of much greater length than shown in FIG. 1, sustained primarily in translational flight by the rear pair of rotors S.1 and S.1' having much longer blades 50 than the blades 50 of the front pair of rotors S and S', as will be explained in detail in another application in response to "Restriction Requirement" of Aug. 1, 1958.

It may be noted in passing also that, in lieu of one of the side-by-side main sustaining rotors having three blades 50 mounted to rotate in the same orbital path somewhat perpendicular to its mounting shaft 12 by virtue of the resiliency of the cantilever mounting hubs S and S' as indicated in FIGS. 10, 11, 12, I alternatively could employ a rotor having two blades 50 describing a similar orbital path and pivoting on a central axis perpendicular to a shaft 12 just as the hub 42 of blades 6 of rotor P at the tail end of the present craft pivot through yoke 39 on a pin 41, whose axis is perpendicular to rotor mounting shaft 2 shown in my copending application Ser. No. 688,318, for such pivotally mounted two-blade rotors have a tendency to keep their blades 6 perpendicular to the mounting shaft particularly at high speeds of rotation, because the yoke 39 mounting the pivot pin 41 in its slot 40 tends to reverse the pitch of its blades at each revolution in addition to the other features of the small rotor P having a pivotal mounting of the entire tail rotor assembly in that application. But, unless such a two-blade rotor with longer blades corresponding to blades 50 shown in FIG. 1 had all the other features of my rotor P for keeping the blades of such a much larger main sustaining rotor suspended perpendicular to the shaft 12 in addition to the resilient means accomplishing such purpose, there would be very great vibrational strain and other stresses on the rotor blades, thereby limiting their life, as well as on the outrigger frameworks attached to the sides of the fuselage, no matter how those outrigger frameworks might be designed as in the present application. Regardless of the means employed to minimize vibration of the shaft 12 of such a rotor, as one of a pair, having only two blades, with resultant vibrational strain on the bearings mounting said shaft 12 in upright housing 13, as well as on blades 50 thereof and the outrigger framework mounting its upright housing 13, there will be much more vibration and stresses of the two blades than will be found in blades 50 mounted in the manner of the three blades shown in FIGS. 10, 11, 12, since each of the three or more blades 50 mounted in such a rotor hub tends to control any "twist" of the mounting hub by the other two blades 50 having a somewhat cantilever mounting in the outer annular segment of respective hubs S and S', as will be explained in detail in the other application filed herewith in response to "Restriction Requirement" of Aug. 1, 1958.

Of course a two-blade rotor has to turn much faster during aerodynamic autorotation than does a rotor having three or more blades in order to bring its two blades into contact with all the air in the orbital path of its blades in order to sustain the craft with blades 50 of corresponding length, although two blades obviously might weigh less than three or more blades of the same structure except for the fact that my resiliently flexible hubs S and S' remove some of the stresses of cross currents of air and vibrations that otherwise would shorten the lives of blades 50, regardless of their number in each hub, and thereby make possible the use of three or more blades of lighter and also more flexible construction individually. But the most essential feature for emphasis at this point is that even a vibrating two-blade rotor as one of a pair could be sustained in the opposed pair of tapered roller bearings 14 mounted in the expanded upper and lower tips of each upright tubular housing 13, which as indicated diagrammatically in FIG. 6 as well as in FIGS. 1 and 3 are mounted most rigidly above lateral horizontal tubular housings 19 of shafts 18 and have their upper tips held in place with respect to the fuselage by diagonally and symmetrically disposed braces 10 and 10' rigidly attached to upright cylindrical sleeves 72 attached to said housings 13 at quite considerable distance above the rigid attachments of the lower expanded tips of those housings 13 to gear boxes 15 rigidly attached, by similar suitable means such as multiple stud bolts having their threaded tips inserted through holes in the terminal annular flanges of the respective tubular housings, to the expanded outer tips of housings 19 held rigid by diagonally disposed bracing truss members 69, 69' attached to said housings 19 intermediate their respective inner and outer tips so that the segments of housings 19 out beyond the said points of attachment of truss members 69, 69' are made quite stiff just as the inversely corresponding segments of housings 19 are quite stiff between their respective places of attachment to fuselage 1 and their places of rather rigid attachment to truss members 69 and 69' in the same upright lateral plane, the intention being to mount upright housings 13 in outrigger frameworks of the fuselage that afford maximum rigidity of mounting of said housings 13 but that have minimum weight of the outrigger framework, and simultaneously minimum resistance of the parts of the outrigger frameworks simultaneously to downdraft of blades 50 of rotors S and S' mounted rotatably therein adjacent the outer tips thereof. Note in FIG. 4 that the primary means whereby rotors S and S' sustain the craft in flight consists of truss members 69,69', diagonally disposed at almost 45° from vertical, whose upper tips are rigidly attached to mounting sleeves 72 of housings 13 of rotor mounting shafts 12 immediately below those rotors, and whose lower tips are similarly attached directly to the landing frame members 11', which in turn support fuselage 1 by means of inverted U-shaped frame members 11.

It may be noted from detail FIGS. 18 and 19 of my copending application Ser. No. 688,318 that, contrary to the arrangements of previous such rotors of others, my pitch of blades 6, collectively as well as individually and cyclically, of my tail rotor P, also indicated in FIG. 5 of the present application in much smaller scale as well as in FIG. 3 in still smaller scale, by means of pivotal, and substantially universal, attachment to the inner faces of said blades 6 of equally spaced linkages 49 rigidly attached to a cylinder 67 rotatably mounted on a second axially reciprocable nonrotating cylinder 58 will work equally well with two, three, or more blades of a rotor whose blades 6, equally spaced circumferentially from each other, can oscillate within narrow limits on axes perpendicular to the mounting shaft 2. But regardless of the number of blades 6 of a fuselage tilt control tail rotor or whether a similar hydraulic blade pitch adjusting mechanism might be employed on a much larger rotor turned upside down and mounted as a main sustaining rotor on one of the shafts 12 in lieu of the rotor hubs S and S' shown in FIGS. 10, 11, and 12 of that copending application, the pitch of the blades can be controlled by the tilt-sensitive hydraulic mechanism 76 shown in FIGS. 21, 22, and 23, which is actuated by pressure fluid derived from a pump driven continually in flight by one of the shafts rotationally interconnected with shafts 12 mounting the side-by-side rotors S and S', which turn at almost the same speed at all times in flight, whether they are rotated by the Engine E or are turning by aerodynamic autorotation immediately on substantial diminution of torque of the engine E, whether the pilot be aware of such diminution of torque or not.

Pressure fluid control mechanism 76 consists primarily of two parts, which alternatively might be constructed as separate units, but which in FIGS. 21, 22, and 23 for convenience of construction and illustration are shown as mounted in the same body member, which in turn has several body segments that simultaneously mount the two parts just mentioned. This control mechanism 76 is rigidly mounted on one of the housings 19 of its telescoped drive shaft 18 rotationally interconnected with the several rotor mounting shafts 12 and 2. The first of the two said components of control mechanism 76 consists of a somewhat conventional rotary displacement hydraulic pump such as are well known to the art of hydraulics in several different kinds and may be seen illustrated and described in any good handbook of mechanical engineering. There are a number of types of such rotary hydraulic displacement pumps, but in FIG. 22 is illustrated diagrammatically one type of such a pump having two gears 98 and 98' having intermeshing teeth mounted snugly but rotatably in a cavity 99 in a central body segment 76.1 of said mechanism 76 having two joined side-by-side cylindrical compartmental cavities 97 conforming to the said gears 98 and 98' having meshing teeth at the vertical plane of juncture of said cylindrical compartmental cavities 97 to form said cavity 99. Each of the two hydraulic displacement gears 98 and 98' has a smaller diameter pivot knob at each of its ends on which said gear rotates in corresponding bearings in paired vertical plates 76.2 and 76.3 shown in FIG. 21 closing the ends of cavity 99, although hydraulic displacement gears 98 and 98' also are rotatably mounted in the joined cylindrical compartments 97, whose axes are parallel to the axis of shaft 18 mounted in tubular housing 19, to which the several body members 76.1, 76.2, and 76.3 may be rigidly attached by means of tip-threaded stud bolts 105 inserted through holes in a clamping component member 104 and screwed into corresponding thread tapped holes in the said several body members as shown in FIGS. 9 and 10. But one of the integrally attached pivot knobs is much longer than the other three to extend through said vertical sidewall plate 76.2 and into a space for spur gears within a parallel body section 76.4 shown in FIGS. 21 and 9 attached by bolts 77 to the vertical annular flange at the interior tip of tubular housing 19 as well as to the vertical side face of the bearing mounting compartment of gear box 25. But it is not intended to specify that the hydraulic pump and valve combination assembly mechanism 76, having parallel vertical body segments 76.1, 76.2, 76.3, and 76.4, must be attached to a gear box 25 as the only suitable location; and FIGS. 21 and 22 indicate only that assembly mechanism 76 is clamped rigidly to tubular cylindrical housing 19 of shaft 18, which rotates continually in flight at something like the same speed by virtue of rotational interconnection of such shaft 18 within the fuselage with rotor mounting shafts 12 mounting suitable bevel gears as previously described in connection with gear boxes 15. FIGS. 21 and 22 indicate that the foregoing body segments 76.1, 76.2, 76.3, and 76.4, all of which are held together rigidly by multiple bolts 77 to form a single compact body segment 76′ of hydraulic valve control mechanism 76 having one side milled out cylindrically to fit cylindrical tubular housing 19, are clamped rigidly to said tubular cylindrical housing 19 by means of at least four stud bolts 105 inserted laterally and horizontally through corresponding holes in a suitably shaped clamping member 104, having one side conforming to cylindrical housing 19, and screwed tightly into corresponding thread tapped bolt cavities in the members 76.1 and 76.2 at right angles to a vertical plane including the axis of cylindrical tubular housing 19 and its enclosed shaft 18. Bolts 77′ disposed parallel to tubular housing 19 and extending through corresponding lateral holes through clamping member 104 attach it rigidly to the pierced vertical annular integral flange at the inner tip of said housing 19 and to the adjacent gear box 25 having corresponding thread tapped holes for four bolts 77′, 77 spaced around said housing 19, which is provided with a suitable annular seal between its annular flange and the gear box 25 to prevent leakage of lubricant at the juncture.

Any suitable means may be employed to rotate pump gears 98 and 98′, which may have herring bone or straight meshing teeth alternatively, as is well known to the art, just as are other kinds of rotary displacement pumps by shaft 18 continually rotating in flight at somewhat constant speed. But FIG. 22 indicates that the most simple means of rotating pump gears 98 and 98′ by such a shaft 18 rotationally interconnected with rotor mounting shafts 12 is to dispose the axes of gears 98 and 98′ parallel to the axis of shaft 18. And likewise the most simple means of employing shaft 18 to rotate gears 98 and 98′ is illustrated in FIG. 7, in which a spur gear 106 having axially disposed grooves therein is mounted on shaft 18, having corresponding splines, and rotates therewith to turn a corresponding spur gear 107 mounted and keyed rigidly on a small short shaft 98″ integrally attached to adjacent pump gear 98, having the same axis, and extending through the hole serving as a bearing through vertical end plate member 76.2 and into the space provided for said gear within body member 76.4. Obviously, if it had been desired to rotate small shaft 98″ of gear 98 in the opposite direction in order alternatively to employ some different kind of rotary pump requiring that direction of rotation, this might have been accomplished alternatively simply by inserting a small idling spur gear 102 as shown in FIG. 21 in the corresponding gear space 100 of body member 76.4 as indicated in FIG. 27, which shows a small spur gear 101 keyed rigidly on small shaft 98″ of pump gear 98 at the vertical plane indicated by line 27—27′ of FIG. 21. And it also would be possible alternatively to mount a chain sprocket on shaft 18 in lieu of spur gear 106 shown in FIG. 7 to rotate by means of a suitable small chain the small shaft 98″ mounting rigidly a similar chain sprocket, not to mention that the pump gears could be turned in the opposite direction alternatively by making the small drive shaft 98″ an extension alternatively of pump gear 98′ through sidewall 76.2 instead of making small shaft 98″ an integral extension of pump gear 98 disposed immediately adjacent to housing 19 as indicated in FIG. 22. Obviously it even would be possible alternatively to drive the rotary hydraulic pump by means of bevel gears and by a gear mounted on the retainer 33 of ring gear 28 inside gear box 25 slightly modified. But it is intended by FIG. 22 to indicate only that any suitable means may be employed to rotate the pump inside the fuselage 1 continually at somewhat the same speed by means of the continually rotating shaft 18 rotationally interconnected with rotor mounting shafts 12.

While the most simple means of rotating gear 98 by shaft 18 inside tubular housing 19, on which control mechanism 76 is rigidly mounted, may be that indicated in FIG. 7, it is obvious in connection therewith that, because of the size of spur gear 106 relative to cylindrical tubular housing 19, unless that said spur gear 106 be mounted on splined shaft 18 alternatively inside gear box 25, housing 19 would have to be terminated short of body section 76.4 in which spur gear 106 is shown as rotating in FIG. 7. But an annular vertical flange, such as that indicated at the inner tip of housing 19 in FIG. 9, where the said flange is shown as bolted to gear box 25, alternatively may be mounted on housing 19 at the outer edge of body member 76.3 shown in FIG. 21; and that flange with all the body segments 76.3, 76.1, 76.2, and 76.4 then can be bolted alternatively to gear box 25, although this construction may not be as strong for mounting that gear box 25 as is the construction employing the idling gear 102 in FIGS. 21 and 16, for which it is necessary only to mill a small slot in housing 19 for accommodation of the teeth of idling gear 102 meshing with the spline teeth of shaft 18. In FIG. 7 the clamping member 104, which also holds body members 76.4, 76.2, 76.1, and 76.3 together rigidly, after they are bolted together by bolts 77,77′, still is shown as a separate part from body member 76.4, in order that the mechanism 76 may be installed without removal of axially disposed splines of shaft 18 from the corresponding grooves of its supporting rotatable retainer 33 of ring gear 28 inside gear box 25. In this connection it also may be noted that alternatively additional stud bolts 105 through additional holes in clamping member 104 may be inserted in corresponding additional thread tapped holes in body segments 76.4 and 76.3 to make that clamping member 104 serve as a rigid splicing member to hole the other body members rigidly in the positions in which they are mounted by bolts 77 and 77′, at right angles to bolts 105, all of which draw the several body member sections of hydraulic control assembly 76 tightly together against thin fluidtight seals between those body sections and between them and the vertical annular flange of tubular housing 19 and gear box 25. Of course the strongest mounting arrangement might be to mount a spur gear 106 of suitable size on the splined tip of shaft 18 inside the gear box 25, to which the annular integral vertical flange of tubular housing then could be bolted as indicated previously; but, by means of the slot that has been shown milled in the rear wall of tubular housing 19 in FIG. 27 for accommodation of idling gear 102, it is intended to indicate that hydraulic control mechanism 76 may be mounted anywhere in the fuselage 1 on one of the tubular housings of shafts rotationally interconnected with rotor mounting shafts 12 that in flight rotate continually at somewhat constant speed, whether the engine is running or not and at whatever rate of speed. It is not necessary to attach such a pump to the gear box 25, and it does not have to be mounted in the same body member 76′ that contains the control valves presently to be described. The hydraulic pump section of control mechanism 76 may be located at any suitable place inside the fuselage; but the axis of the control valves has to be suitably mounted with respect to the fuselage, according to whether it is to control blade pitch of a tail rotor or a side-by-side mounted rotor, as will be explained later herein, and the mounting shown in FIGS. 9 and 10 is suitable for both the pump and the valves 74 and 75 shown beneath the pump, although these valves alternatively might just as well have been mounted above the pump or elsewhere.

It is not intended to specify as suitable only one of the foregoing alternative means of employing a continually rotating shaft within the fuselage 1, such as shaft 18 rotationally interconnected with shafts 12, free to turn under aerodynamic autorotation instantaneously by virtue of the overrunning clutch mounted on the tip of drive shaft 30, to rotate such a hydraulic pump continually, regardless of decreased engine torque on shaft 30, to the exclusion of other such means whereby such a shaft 18 within the fuselage may rotate such a displacement gear pump or another somewhat similar rotary displacement pump known to the art of hydraulics in lieu thereof. Indeed a cam actuated cylindrical piston pump driven by shaft 18 can be employed alternatively to furnish fluid under pressure continually in flight for controlling pitch of blades 6 of the tail rotor shown in FIGS. 4 and 5 of my copending application Ser. No. 688,318. And moreover another pressure fluid such as air alternatively can be employed in lieu of a hydraulic fluid such as a suitable oil, although a diaphragm pump actuated by a cam would be appropriate for such alternative use of air as the pressure fluid. But the arrangements shown in the diagrams submitted herewith are the most desirable in connection with the hydraulic fluid, which also is considered most desirable now. Employment of an expansible gas such as air for actuating cylinder 58 to vary pitch of blades 6 of the tail rotor P might cause some flutter of those blades, not to mention that the weight of the hydraulic fluid in that cylinder adjacent the lower tip of tubular housing 3 is advantageous in maintaining lateral stability of the craft by means of the pivotally mounted rotor assembly P beneath the axis of tubular housing 7 in its fuselage mounted bracket 8 protruding rearward from the wall of that fuselage.

As indicated in FIG. 22, hydraulic fluid from a suitable sump, such as is well known in the art of hydraulics and such as is indicated by the cylindrical cavity 69' shown in FIG. 25, to be explained later, flows downward through cylindrical conduit 96 having a small threaded pipe nipple screwed therein at the top of primary central body member 76.1 to enter cavity 99 within said body member having paired cylindrical compartments marginally joined for installation therein of pump gears 98 and 98', around which the hydraulic fluid flows, when it is displaced by meshing of the teeth of said gears on their synchronized rotation by shaft 18 by any suitable means as explained previously. FIG. 22 indicates that the pump gears 98,98' may be incorporated in the same body member as the tilt-sensitive cylindrical valve members presently to be described; but such incorporation in a single body, while most simple for illustration, is not absolutely necessary. In any event during flight hydraulic fluid of suitable nature such as oil, not subject to freezing readily, flows continually in circulation from pump cavity 99 through a conduit 85 in body member 76.1 to a cylindrical horizontal cavity therein in which said pair of cylindrical valves are enclosed on the same axis. But, since shaft 18 turns at somewhat constant speed, while amounts of hydraulic fluid necessary for adjustment of collective pitch of blades 6 of the tail rotor may vary considerably, there is provided an overflow conduit 103 in connection with pressure conduit 85 and leading back to said sump 69'.

Such overflow conduits in a circulating pump system are well known in the art of hydraulics and are not claimed by me as my invention per se. Such overflow conduits, in which a coiled compression spring is employed to actuate a valve regulating flow of liquid through the overflow conduit, usually are located in the walls of the body of the pump mechanisms now on the market for many uses, sometimes in connection with a reservoir containing some air that serves as a cushion to afford more fluid under pressure for a short time than the pump may be circulating. FIG. 25 illustrates by arrows that pressure fluid such as oil may flow through a pipe nipple conduit 103 into an enlarged compartment 103' in a cylindrical receptacle R1 having a joining wall 103-96 diagonally disposed that joins vertically disposed receptacle R1 integrally to a second horizontally disposed cylindrical reservoir R2 forming the sump 96' connected fluidtight by pipe nipple conduit 96 to the pump cavity 99 previously mentioned. Through a hole in the diagonally disposed joining wall 103-96, at the center thereof, and through the upper wall of reservoir receptacle R2 is disposed and welded fluidtight therein a vertically disposed cylindrical tubular overflow valve container VC, which is internally threaded at both its tips and may be simply a pipe coupling of suitable diameter. Into the lower tip of valve container VC is screwed the externally threaded tip of a pipe VC' thus forming a downward extension of the valve container VC and having a valve seat VS in its upper tip that fits a conical overflow valve OV, which has a knob at the center of its upper face against which presses a coiled compression spring CS, whose pressure is regulated by an externally threaded adjusting plug AP screwed down into the upper internally threaded tip of valve container coupling VC by means of a polygon cross section recess in said plug AP accessible for adjustment from the exterior of cylindrical receptacle R2. Circulating fluid from the pump's pressure conduit 85 under ordinary circumstances can flow through overflow conduit 103 into the enlarged lower compartment 103' of pressure reservoir R1 and thence upward through pipe VC' and around pressure relief overflow valve OV into the midsection of tubular valve container VC, from which it may escape, with pressure relieved around coiled compression spring CS, through a midsectional outlet orifice VCO in the wall of valve container VC leading into the sump compartment 96' of the second reservoir receptacle R2 having an internally threaded outlet into which the aforesaid pipe nipple 96 leading back to the pump body 76' is screwed for fluidtight connection therewith without pressure. But note that the vertically disposed pipe VC' screwed into the lower tip of valve container coupling VC reaches down almost to the floor of the enlarged pressure compartment 103', which thus has an air cushion under pressure above the lower tip of pipe VC' mounted therein; and the arrow leading from overflow conduit 103 into pressure compartment 103' through the orifice in the wall of cylindrical reservoir R1 indicates that fluid may flow both ways through that orifice according to the amount of fluid that is flowing under the desired pressure through conduit 85 relative to the amount of fluid that is flowing through cavity 99 around gears 98 and 98' of the pump. Such a pressure reservoir R1 having an air cushion to supply momentarily any unusual requirements for fluid under pressure from conduit 85 of course is useful in case hydraulic fluid is utilized for operation of cylinders to guide the craft, in lieu of hand operated lever 21 to be explained later in connection with the larger craft shown in FIGS. 2 and 20, or to raise a hingeably mounted landing truck shown in FIG. 1, etc.

It appears sufficient to say here only that a shaft 18, rotationally interconnected with rotor mounting shafts 12, continually turns at somewhat constant speed by suitable means a rotary displacement pump provided with a suitable spring-actuated overflow valve in an overflow conduit leading back to the source of supply for the pump of the hydraulic fluid to said circulating pump, which thus provides constant pressure of the circulating hydraulic fluid in a conduit leading from said pump to the tilt-sensitive control valve system regulating collective pitch of the blades 6 of rotor P. Perhaps the most essential point is that the rotation of the pump gears within the fuselage is provided by one of the shafts rotationally interconnected with the rotor-mounting shafts 12, which turn continually in flight at somewhat constant speed, rather than by the engine within the fuselage, which is subject to diminution and even complete failure of power, since no pressure regulating overflow valve and not even an air cushion in a reservoir connected with the pressure conduit leading from the pump cavity can compensate long for a failure of the pump to rotate and circulate the fluid under pressure. But note in FIG. 4 that the entire pump and valve control mechanism 76 is mounted inside the fuselage 1 within easy reach of the pilot for his continual observation and adjustment, although the shaft 18 continually rotating the conventional hydraulic displacement pump well known to the art of hydraulics is rotationally interconnected by suitable gears with rotor mounting shafts 12 at the outer tips of the outrigger frameworks far from the pilot's seat in the fuselage.

Since the tilt-sensitive valve mechanism shown in FIGS. 21, 22, and 23 is intended to regulate flow of fluid under pressure from the pump cavity 99 through conduit 85 to cylinder 58 of the tail rotor P regulating longitudinal tilt of fuselage 1 relative to the horizon, it is necessary that the cylindrical valve cavity through the central body member 76.1 be so disposed that its rotational axis for the cylindrical valves mounted therein is substantially perpendicular to the vertical plans containing the longitudinal axis of the fuselage. And in FIGS. 21, 22, and 23 it is to be assumed that these most simple diagrams illustrate that cylindrical valve members 74 and 75, snugly but rotatably mounted in said cylindrical cavity, as well as their respective smaller cylindrical stem shanks, extending through the corresponding snugly fitting cylindrical holes through the side closing vertically disposed plates 76.2 and 76.3 of that cylindrical valve cavity extending through central main body member 76.1, are all on the same axis parallel to the respective axes of shaft 18, housing 19, and pump gears 98 and 98'.

Hydraulic fluid under substantially constant pressure in flight of the aircraft flows through conduit 85 in central body member 76.1 to the aforesaid valve cavity therein and thence downward as illustrated in FIG. 22, although of course alternatively the cylindrical valves 74 and 75 might be located above or elsewhere with respect to the pump gears 98, 98', through an upper fluid supply conduit 86 through the upper wall of the larger tubular cylindrical valve member 75, whose said conduit 86 of considerable diameter remains in continual connection with supply conduit 85, having an outlet of considerable width, regardless of any pivotal oscillation of said valve member 75 in its cavity in body member 76.1. The lower outlet of conduit 86 likewise remains in continual connection to some extent with a corresponding vertically disposed conduit 87 in the smaller cylindrical valve member 74, whose cylindrical exterior in turn snugly but rotatably fits the interior cavity of the larger cylindrical valve member 75, one end of which is closed by a vertical wall, as indicated by broken lines in FIG. 21, to which is integrally attached a regulating or adjusting cylindrical stem shank of smaller diameter, which extends through the snugly fitting cylindrical cavity through main cavity closing body plate 76.3, beyond which there is rigidly attached to the tip, having a polygon vertical cross section, of said shank an adjusting lever 79 held in place on the outer tip of said shank by a suitable annular washer and stud bolt 78 therethrough, whose threads are screwed into the thread tapped central cavity of said shank around the same common axis previously referred to.

Conduit 87 extends downward only through the upper half of cylindrical valve member 74 before diverging as a pair of conduits 88 and 88' in the lower half of said valve member 74, shown in FIG. 10 as being disposed at angles of 120° from each other and from the vertical axis of conduit 87 in the upper half thereof, although it will be appreciated later that some variation of the 120° angles may be made without preventing satisfactory working of the mechanisms. Prior to provision of the several conduits therethrough, smaller internal valve member 74 is a cylindrical shaft rather snugly but rotatably fitting the interior cylindrical surface of tubular outer valve member 75, in which the smaller internal valve member 74 can oscillate pivotally quite freely without excessive friction; and it has attached integrally to one end of said cylindrical shaft component a shank stem of smaller diameter around the same axis extending through a snugly but rotatably fitting cylindrical hole in the vertically disposed sidewall plate 76.2 otherwise closing the cylindrical cavity having the same axis through body member 76.1, in which both of the valve members thus are mounted to oscillate pivotally with respect thereto. On the exterior tip, having a polygon vertical cross section, of the cylindrical shank stem of smaller valve member 74 is rigidly mounted a vertically disposed lever 83, which is held in place on said exterior tip of said shank stem by a stud bolt 82 provided with a suitable annular washer and having its threads screwed into a thread tapped cylindrical hole having the same common axis as the valves 74 and 75 and the respective cylindrical cavities in body members 76.1, 76.2, and 76.3.

Since smaller internal valve member 74 is free to oscillate pivotally in larger tubular outer valve member 75 without excessive friction therein, and since the cylindrical stem of valve 74 only snugly fits without excessive friction the cylindrical hole through body member 76.2, through which it extends for rigid attachment of lever 83 to the polygon shaped exterior tip thereof, internal valve member 74 of rather small diameter is rotationally stabilized with respect to the horizon by lever 83 of considerable length hanging downward vertically shown in FIG. 4 from the common axis of the valves and cavities in the several body members 76.1, 76.2, 76.3, there being rigidly attached to the lower tip of said rather long lever 83 means 84 of considerable weight keeping the axis of said lever 83 perpendicular to the horizon. But the outer tubular cylindrical valve member 75 may be oscillated pivotally with respect to its rotationally stabilized inclosed smaller valve member 74 and with respect to the enclosing body member 76.1 by means of the pilot's moving forward or rearward his pivotally mounted adjusting lever 79, rigidly attached to the stem shank of said larger valve member 75, which has at its lower tip a spring actuated hand grip 80, such as is well known to the art, whereby he can squeeze the handgrip 80 to release it for movement of the lever 79 with respect to a quadrant 81 attached rigidly to the lower face of adjacent body member 76.3, and whereby on his ceasing to squeeze the handgrip 80 the lever 79 will be held immovable with respect to the quadrant 81, which may be provided with small radially disposed corrugations, not shown diagrammatically in the drawings, to correspond with similar corrugations of the handgrip mechanism for the usual purpose of keeping a lever adjustably fixed with respect to a fixed quadrant, as is well known to the art.

With the dispositions of valve members 74 and 75 with respect to each other and to body member 76.1 as shown in FIG. 22, which is intended to illustrate posture of the parts of valve assembly 76 for approximately vertical movement and hovering of the aircraft, the exits of diverging conduits 88 and 88' would be blocked by the wall of the lower half of inclosing tubular outer valve member 75, which, however, is movable with respect to the inner rotationally stabilized valve member 74 either by the pilot's moving of lever 79 with respect to quadrant 81 or by longitudinal tilting relative to the horizon of the fuselage 1 in which the valve assembly mechanism 76 is rigidly mounted. While flow of the pressure fluid is blocked by valve 75 in the position shown in FIG. 22, it will be noted that there are two diametrically opposed horizontal slots 89 and 89' through the tubular front and rear walls of valve member 75 at positions immediately above the outlets of diverging conduits 88 and 88', so that any rotational oscillation of outer valve member 75 with respect to inner rotationally stabilized valve member 74, either by the pilot's movement of lever 79 with respect to quadrant 81 or by longitudinal tilting of the fuselage 1, in which body member 76.1 is rigidly mounted, will bring one of the outlets of conduits 88, 88' into connection with the corresponding one of the two diametrically opposed horizontal slots 89, 89' thereby permitting pressure fluid to flow out through that particular slot, whether the one designated 89 or the other designated 89', according to direction of movement of lever 79 or according to direction of tilting of the fuselage, into the respective conduit 90 or 90', both of which are formed in body member 76.1 on opposite front and rear sides of its laterally disposed cylindrical valve cavity and are wide enough to remain in continual connection with their respective slots 89, 89' through the walls of valve member 75. Also in continual connection with respective conduits 90 and 90' are small threaded nipples 91 and 91', which are screwed into suitably tapped holes in body member 76.1 in alignment with conduits 90 and 90', and around which are installed fluidtight the respective forward tips of flexible hose conduits, whose rear tips are installed fluidtight around the respective nipples 63 of axially reciprocable nonrotating cylinder 58 of the tail rotor P, as described in detail in my copending application Ser. No. 688,318.

If air were used alternatively as the pressure fluid for adjustment of collective pitch of blades 6 of the tail rotor, it would not be necessary to provide for return of the air from the opposing compartment 61 of cylinder 58 through a connected conduit 62, nipple 63, and the second respective flexible hose connected fluidtight with the body member 76.1 by means of one of the respective nipples 91, 91' of valve control mechanism 76, for the rubber seals 57 could be removed from the annular grooves 56 adjacent the tips of cylinder 58 to permit leakage leakage outward of the undesired air in the opposing compartment 61 not in connection at the moment with the pressure fluid pump, of whatever nature required and desired for the particular kind of pressure fluid such as air, as is well known in the art. But in FIG. 23 it is indicated that a hydraulic pressure fluid such as oil may be returned from the opposing compartment 61 within cylinder 58 of the tail rotor P through the opposing conduits 62 and 63 and the flexible hose connected fluidtight to the respective nipple 91, 91' and thence through the respective conduit 90 or 90', both of which are in continual connection with the respective diametrically opposed horizontal slots 89 and 89' through the walls of outside tubular valve member 75 as indicated by broken lines indicating such a horizontally disposed slot 89 in FIG. 21, where it is indicated that such diametrically opposed slots 89 and 89' are cut by the planes of cross-sectional FIGS. 22 and 23 at the lines 10-10' and 11-11' perpendicular to the common identical axis of valves 74 and 75 in the cylindrical cavity of central body member 76.1 of the combined body 76' of valve control mechanism 76. And any time one of the horizontal slots 89 or 89' is brought into connection with one of the respective diverging conduits 88 or 88' to permit flow of fluid under pressure from conduit 85 through valve 74 and thence through the respective conduit 90, nipple 91, and the flexible hose connected fluidtight thereto or through the respective conduit 90', nipple 91', and the other flexible hose connected fluidtight thereto, there will be a simultaneous connection for return flow of the pressure fluid from the opposing compartment 61 of the axially reciprocable tail rotor P through the opposing flexible connecting hose and through the opposing conduits in body member 76.1 in continual connection with the slots 89 and 89' of outer body member through one of the other of the respective converging conduits 92, 92', which are connected halfway through the cylindrical shaft section of valve 74 to the vertical conduit 93 emerging from the lower half of that inner valve into a continually connected conduit 94 through the lower wall of valve 75 and thence through conduit 95 through the bottom wall of body member 76.1 in an arrangement of conduits in FIG. 23 for return flow of the pressure fluid to the pump that is exactly inverse to the one shown in FIG. 22 for the flow of fluid from the pump to cylinder 58 of the tail rotor through one of the flexible hoses connected fluidtight to the pipe nipples at the front and rear tips of those hoses. Since conduit 95, leading to a sump of whatever nature well known to the art but illustrated diagrammatically in FIG. 25, is fixed with respect to the conduit 96 leading from thence to the pump cavity 99, threads for insertion of a threaded pipe nipple in the bottom wall of body member 76.1 are shown with a vertical axis in alignment with conduit 95 therein for connection with conduit 96 at the top of body member 76.1 shown in FIG. 22.

While diverging conduits 88 and 88' in FIG. 22 as well as inversely converging conduits 92 and 92' in FIG. 23 are shown disposed at angles of 120° from each other, it will be appreciated that smaller angles of disposition may be employed, in which event there would be room in the diametrically opposed front and rear walls of outer tubular cylindrical valve member 75 for somewhat larger, taller, slots 89 and 89'. Such conduits 88 and 88' shown disposed alternatively at an angle of 90° from each other are illustrated diagrammatically in FIG. 24 in which the alternative diametrically opposed slots 89 and 89' through the front and rear walls respectively of tubular outer valve member 75 have much greater vertical dimension than the corresponding slots 89 and 89' shown in FIG. 22. FIG. 24 also illustrates that the valve mounting body 76' of hydraulic control mechanism 76 may be made entirely separate, as indicated previously, from the pump mechanism, with which it is connected by pipe conduits 85 and 96, the pipe nipples 91 and 91' for connection with the two flexible pressure hoses being disposed in alignment with each other horizontally. But the arrangement shown in FIG. 24 is more expensive and difficult to manufacture, because the slots 89 and 89', while larger vertically for flow of fluid from internal valve member 74, do not have sufficient capacity to carry the fluid laterally for transfer to the converging conduits 92, 92' leading by way of conduits 93, 94, and 95 to pipe nipple 96 at the bottom of the body member 76.1 and thence back to the sump and pump cavity 99 shown in FIG. 22. It therefore is necessary to use a shaper to carve out of the walls of the cylindrical cavity enclosing valve 75 two long slots 90 and 90' corresponding somewhat to the two diametrically opposed horizontal slots 89 and 89' milled in the front and rear walls of that larger tubular valve 75. It would be much cheaper to manufacture the valve shown in FIG. 22, which will work just as well.

FIG. 26 also illustrates a tubular valve 75 having thick walls; but in this instance, which probably is the cheapest to manufacture, it is not necessary to convey the fluid in a horizontal slot, in either valve 75 or the surrounding cavity walls, and the figure therefore is a combination of FIGS. 22 and 23. In FIG. 26 the rotationally stabilized generally cylindrical valve member 74 is mounted in the same general arrangement shown in FIG. 22 with the inclosing tubular valve member 75 being subject to adjustment by hand lever 79 in the pivotally mounting cavity in the central body member 76.1. But note that in the alternative arrangement shown in FIG. 26 fluid cannot enter the inner valve 74 at all in the neutral position of the valves corresponding to that shown in FIG. 22. In FIG. 26 the rotationally stabilized generally cylindrical and solid valve member 74 has two inversely corresponding deeply notched gaps 88 and 88' milled in its front and rear cylinder face walls at the horizontal midsection thereof leaving that formerly round midsection with an almost rectangular vertical cross section about one-third as thick as the diameter of the original cylindrical shaft and with inversely corresponding upper and lower segments of the original cylindrical face of that valve member 74 having a width exactly equal to the width of a pair of diametrically opposed vertically disposed conduits 86 and 94 through upper and lower walls respectively of the larger manually oscillatable tubular valve member 75. Conduit 86 remains in continual connection with a conduit 85 leading from the pump and extending downward through the upper wall of the body member 76.1 to the cylindrical valve cavity in which cylindrical valve 75 is rotatable within limits; and the lower conduit 94 likewise remains in continual connection to some extent with a diametrically opposed conduit 95 through the bottom wall of body member 76.1, in which is screwed the tip of a pipe 96 leading back to cavity 99 of the hydraulic pump. The notched gaps 88 and 88' in the front and rear cylindrical faces of inner rotationally stabilized valve 74 constitute conduits through segments of that cylindrical shaft remaining in continual connection respectively with a pair of diametrically opposed horizontally disposed conduits 89 and 89' extending through the front and rear walls of inclosing tubular valve member 75 and remaining in continual contact respectively with conduits 90 and 90' through the front and rear walls of body member 76.1, in which are mounted respectively pipe nipples 91 and 91' to which respectively are connected fluidtight the tips of two flexible hoses leading back to respective pipe nipples 63 connected with respective compartments 61 of cylinder 58 adjusting collective pitch of blades 6 of tail rotor P. And at any time outer valve member 75 is oscillated with respect to the inner rotationally stabilized inner valve member 74 shown in FIG. 26 fluid under pressure in flight will flow from conduit 85 connected with pump cavity 99 through conduit 86 into the one of the notched gaps 88,88' that is thereby brought into connection with conduit 86 and thence will flow into the respective conduits 89, 90, 91 or into the respective opposed conduits 89', 90', 91' to move cylinder 58 with respect to its mounting tubular housing 3 of the tail rotor P for variation of collective mean pitch of blades 6. But simultaneously fluid will flow back from the opposite compartment 61 of said cylinder 58 through its various connected conduits into the other one of the said gaps 88,88′, which by the same pivotal oscillation of valve 75 relative to valve 74 is brought into connection with the lower conduits 94, 95, 96 leading back to the circulating pump cavity 99. While the paired valve assembly shown in FIG. 10—11 is quite simple, it is notable that in the neutral position shown in that figure the pressure of the hydraulic circulating pump through conduit 86 is directly downward on the obstructing central segment of valve 74, which thereby will be forced downward on the lower enclosing cylindrical wall of outer tubular valve member 75 with some resultant friction between the two valves, although it is desirable that the rotationally stabilized valve 74 be relieved of oscillatory friction in so far as possible with a fit just snug enough in valve 75 to bring about proper flow of the hydraulic fluid under pressure into the respective hoses connected with cylinder 58. On the contrary it may be noted from FIG. 10 that the conduit 86 through the upper wall of that outer tubular valve 75 in the neutral position causing no movement of cylinder 58 with respect to tubular housing 3 of rotor mounting shaft 2 is in free connection with the vertical conduit 87 in rotationally stabilized valve 74, whose diverging conduits 88 and 88′ under pressure have their pressure outlets closed by the lower wall of oscillatable tubular enclosing valve 75, which can be operated manually by the pilot without friction being of any consequence. Numerous other modifications of the paired valves 74 and 75 may be devised in the conduits and otherwise. For instance alternatively those cylindrical valve members might be made very slightly conical as a means of securing proper fit with respect to each other and with respect to the cavity in body member 76.1 enclosing the two valve members. But all the alternatives will employ those valve members 74 and 75 having an identical oscillatory axis with the enclosing cavity in body member 76.1 of the assembled body 76′ of control mechanism 76. Of course conduits 88 and 88′ in FIG. 22 might be disposed horizontally and diametrically from each other in valve 74, and all of the conduits through both valves might be made larger to carry more pressure fluid simply by increasing diameters of valves 74 and 75. Of course anyone skilled in the art of hydraulic valves would recognize from FIGS. 21 and 22 that, in addition to the fact that the cylindrical valve 74, rotationally stabilized with respect to the horizon by pendulum lever 83 having some considerable weight 84 rigidly attached to the lower tip thereof, alternatively might be made as the larger outer tubular valve member into which the other smaller paired relatively solid cylindrical valve 75, oscillatable pivotally by manually operable lever 79, would project, if the designer were to disregard the need to minimize rotational friction around the larger such valve 74 rotationally stabilized by lever 83, it also alternatively would be possible, by disposing the conduits through the paired valves diagonally to the axes of the round valve members 74,75, to make valves 74 and 75 both of the same diameter snugly but rotatably fitting in the cylindrical cavity through central body member 76.1, in which they would be pivotally oscillatable with the vertical tips of said alternatively designed cylindrical valve members 74 and 75 pressing rather snugly against each other at the center of said cylindrical cavity. So it thus can be said that the only essential requirements for the paired valves 74 and 75 containing the suitable conduits for regulating flow of the fluid under pressure are that they come in contact with each other and be pivotally oscillatable with respect to the cylindrical cavity in fixed body member 76′ in which they both are mounted rotatably on the identical axis line thereof, in this case substantially perpendicular to the vertical plane including the longitudinal axis of the fuselage, as indicated in FIG. 22. In this connection it may be noted that friction of pivotal oscillation of both valves 74 and 75 is minimized by the fact that thin vertically disposed seals, such as are well known in the art of hydraulics for preventing leakage of pressure fluid, between the respective vertically disposed cavity closing plates 76.2, 76.3 and the central body member 76.1, as shown in FIG. 21 containing the mounting cavities of the pump gears 98,98′ as well as cylindrical valves 74,75 extend all the way from top to bottom of those vertical closing plates, so that they annular shoulders of the cylindrical valves 74 and 75 respectively around their cylindrical shank stems of smaller diameter protruding snugly through suitable holes in those thin seals and the plates 76.2, 76.3 can press outward against said paperlike seals within the cavity closing members not only to prevent undue leakage of the pressure fluid but to minimize friction of the pivotally oscillatable shoulders of said valves.

But none of the foregoing alternative variations of construction of paired valves 74 and 75 having a common axis with the axis of the cylindrical cavities in body members 76.1, 76.2, and 76.3 would change the operation of the valve assembly mechanism having one valve 74 rotationally stabilized with respect to the horizon, by lever 83 attached rigidly to the outer tip thereof and kept vertical by means 84 having considerable weight attached rigidly to the lower tip of said lever 83, and a second larger telescoping valve member 75 pivotally oscillatable relative to the fuselage by means of the pilot's adjusting lever 79 at his election by use of the quadrant 81 in conjunction with the hand grip 80 of his hand lever 79. It is intended that the flexible hose connections between nipples 91 and 91′ and the respective nipples 63 of cylinder 58 of tail rotor P will be so mounted at the tips of said hoses that the pilot will push lever 79 forward to increase the blade pitch and therefore lift of tail rotor P and thereby tilt the craft forwardly to tilt rotor shafts 12 forward at the same time and thereby cause a forward horizontal force to be derived from the lifting thrust of main sustaining rotors S and S′. And it would follow that the pilot's pulling back on the lower tip of lever 79 would tend to brake the forward movement of the craft and thereafter would cause the craft to move rearward in response to the opposite horizontal vector force of the lifting thrust of said main sustaining rotors S and S′. Of course, in addition to the aforementioned horizontal vector component forces of said main sustaining rotors, it may be noted that the tail rotor in FIG. 3 has a slight forward vector component force in the position shown, in which tubular housing 7 of drive shaft 5 has its axis tilted upward slightly toward the rear tip on which gear box 4 is mounted, so that the axis of tubular housing 3, telescoping shaft 2 mounting blades 6 perpendicular thereto on its lower tip, is tilted forward slightly toward the top, thereby exerting a slight forward force on fuselage 1 during normal flight with the tail rotor exerting some small lift from which a forward vector force is derived. But, anytime the pilot changes the position of lever 79 with respect to its quadrant 81, he immediately changes the determined longitudinal tilt of fuselage 1 with respect to the horizon at which the tilt-sensitive valve 74 thereafter will keep the longitudinal axis of the fuselage disposed.

In FIG. 3 tubular cylindrical fixed bracket 8 is shown disposed rearwardly through the upper segment of the rear hemispherical endwall of fuselage 1, as explained previously; and its forward tip is attached substantially rigidly to the upper horizontally disposed midsection of vertically and laterally disposed inverted U-shaped tubular interior fuselage frame member 11 in the arrangement indicated by detail FIG. 30, which shows a mounting attachment member 23 inserted between tubular bracket 8 and the tubular fuselage frame member 11. FIG. 33 indicates that the attachment member 23 shown in FIG. 30 in this instance is a rectangular plate having eight somewhat vertical holes therein, which accommodate the threaded tips of four U-bolts 22 and 22′ by which member 23 is attached to both tubular bracket 8 and tubular fuselage frame member 11, beneath which bracket 8 is rigidly suspended with the hole in the hemispherical endwall of fuselage 1, through which it protrudes rearward, fitting the bracket 8 closely and being attached thereto as indicated in FIGS. 1 and 3 by suitable means, the rear tip of tubular bracket 8 being held substantially rigid with respect to fuselage 1 by means of symmetrically and diagonally disposed right and left bracing frame members 8" and 8', whose forward and lower tips respectively are somewhat rigidly attached to said rear fuselage interior frame members 11, about halfway up the sidewalls of the generally cylindrical fuselage 1, and to the rear tips of the longitudinally disposed landing frame members 11' rearward of said fuselage, the upper tips of said upright bracing frames 8' being respectively attached rigidly to the frame members 8" intermediate their points of emergence from the rear hemispherical wall of the fuselage and the respective rear tips of said frames 8" attached rigidly to the said tubular bracket 8 adjacent its rear tip considerably rearward of the almost hemispherical fuselage wall.

By FIGS. 3 and 4 as well as in detail FIGS. 8, 9, 29, 30, 31, 32 it is indicated that interior gear box 25 of considerable vertical diameter is located immediately adjacent to the midsectional roof of horizontally disposed generally cylindrical fuselage 1, so that passengers may have room to pass beneath lateral horizontal housings 19 attached to the sides of gear box 25 as indicated in FIG. 4, and that the longitudinally disposed pivotal axis in tubular bracket 8 of tubular housing 7 enclosing drive shaft 5 of tail rotor P is at a vertical angle only a few degrees above a horizontal plane including the longitudinal axis of generally cylindrical fuselage 1 and in FIG. 3 perpendicular to the axes of shafts 12 in side-by-side tubular housings 13, although it is not always necessary that shafts 12 be disposed perpendicular to that horizontal plane, as will be obvious later herein.

It will be noted from FIG. 5, which is a fragmentary vertical longitudinal cross section, at twice the scale of FIG. 3 and with sections of drive shaft 5 and its enclosing tubular housing 7 cut away, of the similarly constructed drive shaft 5 mounted in suitable radial and axial thrust antifriction bearings 26,26', and 26", indicated diagrammatically by diagonally disposed axis lines in the rather small scale FIG. 5 and shown in detail FIGS. 8, 29, 30, and 32, through telescoping tubular housings 24 and 7, pivotally oscillatable through approximately 180° on an axis through tubular bracket 8 of fuselage 1, that without any appreciable increase in weight of the aircraft, which employs as a simple and effective means of mounting rigidly tubular bracket 8 the inverted U-shaped tubular interior fuselage frame 11 that supports the fuselage 1 on the parallel longitudinally disposed landing frame members 11' in FIG. 3, longitudinally disposed with respect to fuselage 1, the bracket 8 may be mounted on top of the rear tubular frame 11 to protrude rearwardly also through the arched and substantially horizontally disposed roof of that generally cylindrical fuselage 1 adjacent the vertical plane at which the substantially hemispherical rear tip of the same diameter joins the cylindrical section of the fuselage, thereby balancing to some very appreciable degree with respect to rear frame 11 the forward and rearward segments of rather long drive shaft 5, its tubular housings 24 and 7, and enclosing tubular bracket 8, although the posture of that long tubular bracket 8 with respect to the fuselage is maintained by diagonally and symmetrically disposed right and left rear exterior bracing frames 8" and 8' just as shown in FIGS. 3 and 1 and previously described.

Disposing the pivotally oscillatable rotational axis of tubular housing 7 through tubular bracket 8 in FIG. 5 at a 30° angle with respect to the midsectional roof line and longitudinal axis of generally cylindrical fuselage 1 makes it convenient to draw with a 30—60—90° plastic triangle in the space provided on Bristol board sheets for a patent office drawing, although it was necessary at that 30° angle of said axis to show the central gear box 25 in the fuselage 1 spaced somewhat below the roof thereof with the lateral horizontal tubular housings 19 being mounted in slightly modified diagonally disposed interior fuselage frame members 11.1 adjacent the sidewall.

Of course the mounting angle of 30° of tubular housing 7 in tubular bracket 8 with respect to the longitudinal axis of the fuselage 1 may be increased or decreased by modification of the mounting frame member 23 between bracket 8 and the horizontal tubular fuselage frame 11 at the roof of the fuselage 1 as well as by modification of the interior frame members 11.1 and the level at which lateral tubular housings 19 are attached to the sidewalls of the fuselage. But one intention of FIG. 5 is to indicate that a tubular housing 7 of very considerable but not excessive length may be projected rearward and upward from the rear fuselage frame 11, located considerably rearward of the upright lateral plane including the axes of parallel shafts 12 in tubular housings 13 of the outrigger frameworks to secure the axis of oscillation of housing 7 through bracket 8 with respect to the mounting fuselage 1 between the orbits of main sustaining blades 50 around the axes of those shafts 12 to such extent that in rapid forward translational flight of the craft the downdraft of air from those blades 50 of the two paired side-by-side mounted rotor hubs S and S' during the retreating phases of the orbits of the blade tips over the respective sides of the laterally arched somewhat horizontally disposed roof of the fuselage will not adversely affect the lift of blades 6 of the pivotal assembly of the tail rotor P, which in FIG. 5 has been designated PATR to emphasize that the entire assembly of that tail rotor rigidly mounted on the rear tip of tubular drive shaft housing 7 is pivotally oscillatable around the axis of tubular housing 7 in bracket 8, which need not necessarily coincide with the axis of drive shaft 5 in its cylindrical housing 7, as will be explained later herein.

Since the orbital path of blades 6 of tail rotor P tends to remain substantially perpendicular to the axis of their mounting shaft 2 in tubular mounting housing 3, through which it projects, as indicated in my copending application Ser. No. 688,318, and since the axis of drive shaft housing 7 in tubular bracket 8 is disposed at an angle to the horizontal plane including the longitudinal axis of fuselage 1 in both FIG. 3 and FIG. 5, it follows that blades 6 in normal powered horizontal translational flight in a straight line will have some forward thrust in addition to their slight lift with the lift being decreased slightly and their forward vector component force being increased somewhat, as the tail rotor P tilts the craft forward to derive a forward horizontal vector component force from the downward thrust and resultant lift of the blades 50 of side-by-side mounted rotors S and S', which by virtue of being the same size and turning in opposite directions have their respective shaft torques and lateral precessional tendencies canceled by each other. In any event (except as hereinafter mentioned for countering the slight horizontal rotational effect on the fuselage of the torque of shaft 2 mounting rather small blades 6 of the auxiliary rotor P) in normal straight forward flight horizontally the axis of shaft 2 will be disposed substantially in a vertical plane including the axis of housing 7 in bracket 8 disposed longitudinally of the generally cylindrical fuselage 1, although that vertical plane including said oscillatory pivotal axis need not necessarily coincide exactly with the vertical plane including the longitudinal axis of generally cylindrical fuselage 1. And, regardless of whether the angle of disposition of the axis of tubular housing 7 through fixed tubular bracket 8 be more or less than the 30° shown in FIG. 5, so long as rotor shaft housing 3 is disposed at right angles to housing 7 by rigid attachment of those tubular shaft housings to gear box 4 at the upper tips of each, as has been shown in order to employ bevel gears already in mass production for the automobile industry, the rotation of blades 6 in an orbital path substantially in a plane perpendicular to the axis of shaft 2 in housing 3 will make the orbital path of said blades 6 during straight line forward powered translational flight of the aircraft lie substantially in a plane intersecting the longitudinal axis of the fuselage at an angle and lying between an upright plane at said point of intersection perpendicular to said longitudinal axis of the fuselage and a second plane including that longitudinal axis and intersecting the first upright said plane perpendicular thereto along a line substantially horizontal in said straight line forward flight of the aircraft, although the plane in which blades 6 orbit around their mounting shaft 2 will vary somewhat from that horizontally disposed line of intersection of said planes, when the pilot oscillates his housing 7 pivotally through tubular bracket 8 to steer the craft, as will be explained in more detail later herein.

In FIG. 6, which shows in some detail bevel gears 27' and 2' having intermeshing teeth and being mounted rigidly on the respective upper tips of shafts 5 and 2 in gear box 4 of the pivotally mounted tail rotor assembly indicated by letters P and PATR in FIGS. 3 and 5 respectively, the axes of those shafts are shown perpendicular to each other just as indicated in FIGS. 3 and 5, in part because that is the easiest and cheapest way to secure such meshing bevel gears already in mass production for other uses. But it will be appreciated that with somewhat modified gears 27' and 2' the axis of shaft 2 need not be disposed exactly perpendicular to shaft 5, which may be made tubular intermediate its solid tips indicated in detail FIGS. 15 and 20 as well as in FIG. 6. It is contemplated, however, that shaft 2 will be somewhat perpendicular to shaft 5 in order that the downward thrust of blades 6 of rotor P on the surrounding air in ordinary flight, with the normal cargo disposition in the fuselage 1, will have some forward vector component force for inducing forward flight in addition to the function of blades 6 in tilting mounting shafts 12 of main sustaining rotors S and S' longitudinally with respect to the fuselage 1 and the horizon, substantially by oscillation of the fuselage around the axis of lateral horizontal housings 19, to induce the desired longitudinal movement of the craft horizontally by virtue of adjustment of lever 79 by the pilot. Between FIGS. 5 and 6 are shown two lines intersecting at an angle, of 30°, 6—12 representing respectively the orbital plane of blades 6, parallel to the axis of tubular housing 7 through tubular bracket 8, and the horizontal plane perpendicular to the axes of shafts 12, which would be tilted forward, with respect to the horizon toward their upper tips mounting rotors S and S', during forward translational flight. But under any circumstances the forward tilting of shaft 2 of pivotally mounted tail rotor assembly P with respect to the horizontal plane including the longitudinal axis of fuselage 1 is an advantage in designing a "foolproof" aircraft, for, in case of overloading or just maximum safe loading of the craft, an inexperienced pilot simply can adjust the throttle of his engine and wait until the rotors S and S' lift the front portion of the landing gear off the ground with the rear tips of that landing framework remaining on the ground as a result of the pilot's keeping his lever 79 so adjusted that blades 6 exert a downward thrust on their mounting shaft 2, until the pilot would reverse the collective pitch of blades 6 to give the craft sufficient lift to cause the craft, having its main sustaining rotor shafts 12 tilted rearward very slightly at the moment with respect to the horizon, to rise vertically with optimum disc-loading of the several rotors, until such time as blades 50 would have more effective lift by virtue of forward flight over much greater volume and mass of air in forward translational flight, in which blades 6 in or above the rear gap between the orbits of blades 50 would be relieved of the adverse effect of downdraft of blades 50 without having shaft 2 mounted far to the rear of the axes of shafts 12 of the main sustaining rotors S and S', as would be the case with an auxiliary rotor mounted directly behind a front main sustaining rotor of a tail-heavy helicopter, which never would have its tail rotor shaft disposed in a vertical plane containing the longitudinal axis of the fuselage, because that auxiliary rotor would have to serve as a countertorque rotor.

In spite of the fact that shafts 12 of the side-by-side rotors S and S' are so disposed laterally with respect to fuselage 1 that their blades 50 achieve most effective lift, comparing favorably with fixed wing aircraft of considerable span of their wings, in passing over a wide swath of air in forward translational flight for effecting great fuel economy and resultant great range of my aircraft, weight of the framework of such an aircraft with respect to number of passengers and amount of cargo is of great importance. FIG. 5 shows tubular housing 7 and drive shaft 5 cut away between gear box 4 of tail rotor P and the fixed mounting tubular bracket 8 protruding rearward somewhat from the fuselage 1 to indicate that the pivotally mounted tail rotor assembly PATR may be lengthened somewhat as desired; but FIG. 1 indicates that no excessive length and resultant weight of braced bracket 8 and pivotally mounted tubular housing 7 of drive shaft 5, projecting rearward still farther therethrough, are required to place blades 6 of tail rotor P sufficiently rearward in the gap between the orbits of rearward retreating blades 50 of the main sustaining rotors to avoid direct effects of the downdraft of those blades 50 in forward translational flight, when the fuselage 1 and its attached side-by-side rotors are tilted forward sufficiently.

For ease of drafting, it is indicated by crosshatching in FIG. 5 that drive shaft 5 may be made solid throughout its entire length from gear box 25 within the fuselage to gear box 4 of the tail rotor P; but it will be appreciated from detail FIGS. 6, 8, 29, 30 and 32 that shaft 5 may be made tubular intermediate its solid tips, on which the bevel gears 27 and 27' are rigidly keyed immediately forward and rearward of tapered roller bearings 26 and 26' mounted thereon in the respective front and rear tips of telescoping tubular housings 24 and 7. Other than the torque on shaft 5 required for turning bevel gear 26' to rotate bevel gear 2', mounted rigidly on the upper tip of shaft 2 mounting on its lower tip relatively small blades 6 of the pivotally mounted tail rotor assembly P, there is no strain whatever on small shaft 5, whose bevel gears spaced far apart are mounted almost immediately adjacent the combination radial and axial thrust bearings 26 and 26' mounted in the said respective front and rear tips of tubular housings 24 and 7, so that, even with some wear of those bearings 26 and 26' as well as similar bearings 35 and 35' mounting shaft 2 in tubular housing 3 of the tail rotor assembly, there never can be any intolerable displacement of any of the bevel gears with respect to the respective bevel gears with which their teeth mesh, the respective rotatable shafts 2 and 5 as well as gear retainer 33 being otherwise fixed with respect to each other, except for rotation around their respective axes, in spite of the fact that tubular housing 7 of drive shaft 5 is rotatable with respect to telescoped tubular housing 24, rigidly bolted to the rear face of gear box 25 as indicated in FIGS. 8, 9 and 29, and with respect to partially telescoping tubular bracket 8, rigidly mounted in fuselage 1 as indicated in FIGS. 1, 3, 5 and 30.

Tapered roller bearings 26" are mounted in the rear tip of tubular housing 24, in which the front portion of drive shaft 5 rotates, in order to keep shaft 5 and the bevel gear 27, rigidly mounted on the front tip thereof, from moving longitudinally with respect to ring gear 28 rigidly mounted on retainer 33 rotatable in tapered roller bearings 34 of central gear box 25. But shaft 5 cannot move longitudinally with respect to its housing 24 anyway, because the front tip of telescoping tubular housing 7 is drawn snugly against the expanded front tip of housing 24, in which tapered roller bearing 26 is mounted as shown in FIG. 29, and because the rear tip of tubular housing 7, rigidly bolted to gear box 4, as indicated in FIG. 35, has formed therein a slight annular shoulder against which the outer race of bearing 26', as shown in FIGS. 32 and 6 is drawn, when the nut is screwed and keyed on the rear tip of shaft 5 against bevel gear 27' to hold it against a shoulder on the tip of shaft 5 and against suitable annular spacing washers between bevel gear 27' and the inner race of bearing 26'. FIG. 31 indicates that multiple stud bolts alternatively may be screwed into corresponding holes in tubular housing 7 immediately rearward as well as forward of tubular cylindrical bracket 8 to prevent tubular housing 7 from moving longitudinally with respect to bracket 8, but shaft 5 with its tapered roller bearings 26 and 26' would prevent such longitudinal movement anyway. Of course stud bolts such as indicated in FIG. 19 alternatively can be inserted through corresponding holes in short cylindrical rings telescoping cylindrical housing 7 snugly both forward and rearward of cylindrical bracket 8 for the same purpose, as is indicated by rings 20.1 in FIGS. 1, 3, and 5.

FIG. 5 indicates that other ball bearings, undesignated, may be mounted around drive shaft 5 within cylindrical tubular housing 7 at other places between the rear tip of tubular housing 24 and the tapered roller bearing 26' mounted on shaft 5 adjacent the rear tip of tubular housing 7. Note in FIG. 6 that around the spacing washers 5.1 between the inner race of tapered roller bearing 26' and the bevel pinion gear 27' mounted rigidly on the rear tip of drive shaft 5 are inserted suitable annular seals 4.5, such as a felt washer, whose cross section is indicated by dots, inserted within the cylindrical aperture in the front wall of gear box 4, for installation of bevel gear 27', and between two annular leather washers of varying outer diameters indicated by "x's" in cross section, which tend to keep lubricant in the gear box 4, although it is desirable that there may be some leakage from that gear box past said seals 4.5 for lubrication of bearing 26' and other bearings in which shaft 5 is mounted in tubular housings 7 and 24. Somewhat similar annular seals, made of felt and leather, are shown in detail FIG. 7.1 around the spacing washer between bevel gear 2' and the inner race of upper tapered roller bearing 35' inversely corresponding to the tapered roller bearing shown as mounting the lower tip of rotor shaft 2 in the expanded lower tip of tubular housing 3 in FIG. 18. In FIG. 6 a suitable annular seal 7' to prevent exterior leakage of lubricant is inserted between the rear tip face of tubular housing 7 and the forward face of gear box 4 rigidly bolted to said housing 7 of shaft 5 by four bolts as indicated in FIG. 35. A similar seal may be indicated between the face of the expanded upper tip of tubular housing 3 and the lower face of gear box 4; but any leakage of lubricant from gear box 4 into the expanded tip of tubular housing 3 would drain down through bearing 35' to the bearing 35 below quite readily, and it is to be contemplated that lubricant for all the bearings may be installed in gear box 4 by means of removing round and threaded upper face plate 4', which is screwed by means of square wrench plug 4'' into the corresponding threaded top opening of gear box 4, in which the said upper opening is large enough to facilitate installation of the bearings and bevel gears on removal of circular plate 4', which may be kept from working loose by a small stud bolt screwed into the gear box 4 through a gap in the circumferential margin of said circular plate as indicated in FIG. 6.

Wall thicknesses of tubular housings 24, 7, and 8 in FIG. 5 of course have had to be exaggerated to permit crosshatching thereof. FIGS. 5, 8, and 29 show that the front tip of tubular housing 7 of drive shaft 5 is threaded for receiving an internally threaded enclosing cylindrical reinforcing sleeve ring 20, which may be screwed on the tip of tubular housing 7 just enough to make an annular shoulder within that ring 20 serve as a means of adjusting the longitudinal position of housing 7 with respect to the expanded forward tip of telescoping tubular housing 24, in which tapered roller bearings 26 are mounted, thereby securing proper axial spacing of bearing 26 mounted in the expanded front tip of said tubular housing 24 with respect to rear bearing 26' mounted against the previously mentioned annular shoulder in the rear tip of tubular housing 7 telescoping housing 24. But a primary function of reinforcing sleeve ring coupling 20 is that it serves as a conveniently assembled means entirely within the fuselage 1, of attaching rigidly to the front tip of tubular cylindrical housing 7, projecting rearward through longitudinally disposed tubular bracket 8 mounted through the wall of fuselage 1, a somewhat vertically disposed lever 21 of considerably length whereby the pilot quite quickly at his election may oscillate tubular housing 7 pivotally, by as much as 180° for short intervals of time, through rather snugly fitting tubular bracket 8 and thereby swing rotor blades 6 and their pitch adjusting pressure fluid mechanism 58, 67, 49, etc. of considerable weight mounted on the lower tip of housing 3, attached rigidly to the bottom of the gear box 4 and thereby rigidly to the rear tip of housing 7 at somewhat right angles thereto, by equal distances of up to several feet laterally with respect to a vertical plane including the axis of housing 7 in bracket 8, but not necessarily the axis of fuselage 1 or the axis of drive shaft 5, at a considerable distance below said axis through bracket 8 of tubular housing 7, from which the weight of the tail rotor assembly P as well as lever 21 hangs downward somewhat vertically in straight forward flight of the aircraft under power of the engine rotating several several sustaining rotors. Note that detail FIG. 29 shows two of four diametrically opposed holes through the threaded forward tip of tubular housing 7 and that there are corresponding larger diametrically opposed holes through coupling ring 20. Three of the holes through the coupling ring 20 are threaded for receiving corresponding setscrew bolts (only one of which can be seen in FIG. 29), whose interior tips project into respective diametrically opposed holes in the forward threaded tip of tubular housing 7 and thereby keep ring 20 from turning with respect to tubular housing 7, to which sleeve ring 20 the upper tip of steering lever 21 is welded as shown. In FIG. 29 steering lever 21 is shown as tubular with a threaded plug screwed into the lower internally threaded tip thereof; and the tubular lever 21 thus serves as a temporary collective container for any excessive lubricant that may drain forward around housing 24 inside housing 7 and thence through the lower somewhat vertically disposed one of the four holes through the threaded forward tip of housing 7 and its rigidly attached ring 20, to which lever 21 is welded directly below said pair of aligned holes through the ring 20 and the tip of housing 7 on which it is screwed. FIG. 5 indicates in very small scale that an annular axial thrust ball bearing assembly alternatively may be installed around tubular housing 24 between the expaned forward tip thereof, bolted rigidly by its annular flange to the rear face of gear box 25, and the front tip of tubular housing 7, on which cylindrical sleeve ring 20 is screwed and secured by setscrew bolts 20', in order to minimize friction between housings 24 and 7; but pivotal friction should not be excessive anyway, and steering lever 21, by which tubular housing 7 is oscillated pivotally through tubular bracket 8, may be made several feet long with complete freedom of movement inside the fuselage 1.

In FIG. 20, which is a fragmentary vertical longitudinal cross section of a craft having two pairs of side-by-side mounted rotors S, S' and S.1, S.1' on a generally cylindrical long fuselage with a somewhat conical rear tip as indicated in FIG. 2, the axis of tubular housing 7, pivotally mounted through a tubular bracket 8 extending rearward only to the conical end of fuselage 51, is disposed at the convenient angle of 30° from the horizon and from the longitudinally disposed landing frame members 11'. But, since wind resistance to forward movement of such a long fuselage 51 would be considerable, if the axis of the generally cylindrical fuselage were tilted up appreciably from a horizontal posture, it will be noted in FIG. 20 that the longitudinal axis L–L' of the long cylindrical fuselage 51, shown in smaller scale than fuselage 1 in other figures, is tilted downward at the rear with respect to the landing frame members 11', so that, when in horizontal flight the rear tip of the craft is raised by fuselage tilt control tail rotor P until longitudinal axis line L–L' is about horizontal or even tilted downward a little toward the front tip of the fuselage 51, the axis of tubular housing 7 in bracket 8 will be tilted up more than 30° with respect to the horizon, thereby giving considerable forward thrust to the craft from axial thrust of blades 6 of the tail rotor in addition to the forward thrust of blades 50 of the four side-by-side mounted rotors S,S' and S.1,S.1'. Under such circumstances the orbital paths of blades 50 of the rear pair of main sustaining rotors S.1 and S.1' will be somewhat higher than those of the front pair of side-by-side mounted rotors S and S', while the tail rotor P would have the orbits of its blades 6 reaching even higher, even though the tubular housing 7 shown in FIG. 8 does not extend far from the tip of tubular bracket 8 mounted in the tail end of fuselage 51.

Note in FIG. 20 that tubular housing 24, not shown in cross section, of drive shaft 5 of tail rotor assembly P extends all the way through not only tubular bracket 8, rigidly mounted in and protruding rearward through the rear conical end wall segment of fuselage 51, but through tubular housing 7 with the exception of the annular flange at the rear tip thereof, to which gear box 4 is rigidly bolted just as in FIGS. 5 and 6. Tubular housing 7 of tubular housing 24 of drive shaft 5 in FIG. 20 extends only a short distance rearward of tubular bracket 8, in which it is pivotally oscillatable, and with respect to which tubular housing 7 cannot move longitudinally because of the reinforcing coupling ring 20 rigidly mounted on the front tip of tubular housing 7, as indicated in FIG. 29, and a corresponding unthreaded annular cylindrical ring 20.1 mounted around housing 7 adjacent the rear tip of tubular bracket 8 and held secure on housing 7 by multiple stud bolt setscrews, such as that indicated in FIG. 31. But, if it were not necessary to economize space in FIG. 20 to show such a large aircraft on the sheet of a size designated by the patent office, it is obvious that tubular housing 7 and its enclosed drive shaft 5 in that figure could be extended upward and rearward a considerable distance from the rear tip of tubular bracket 8 (protruding rearward through the conical end wall of fuselage 51) just as do the tubular brackets 7 shown in FIGS. 1, 3, and 5. Alternatively, blades 6 for the much larger craft shown in FIG. 20 could be made somewhat longer without coming in conflict with the conical rear tip of fuselage 51 and could be made even longer than that, if the tubular housing 3 of rotor mounting shaft 2 were made somewhat longer, not to mention that blades 6 could be made still longer if housing 7 and drive shaft 5 and tubular bracket 8 were lengthened. Rearward lengthening of drive shaft 5 and its enclosing tubular housing 7 from the dimensions indicated in FIG. 20 of course would require that an encircling protective tubular hoop such as indicated in my application Ser. No. 688,318, which later became U.S. Pat. No. 3,273,653, by tubular hoop 11.3 and its longitudinally disposed bracing frame member 11.2, also attached at the front tips to the interior fuselage frame members, FIGS. 2 and 20, for protecting persons standing on the ground from rotating blades 6 of tail rotor P would have to be extended rearward at suitable levels, although such protective means are not needed above about 8 feet from the ground.

Blades 6 of the pivotally oscillatable tail rotor assembly P, however, would not conflict with the blades 50 of the rear pair of side-by-side rotors S.1 and S.1', even when mounted as closely as shown in FIG. 20 to the rear tip of the fuselage 51, for it will be noted that blades 6 of the tail rotor are disposed rearward of the somewhat V-shaped gap between said orbits of blades 50, which are indicated by curved arrows in FIG. 2 as advancing with respect to fuselage 51 in that phase of their orbits adjacent the vertical center plane of that fuselage, over at least the edges of the arched roof of which their tips in their forward rotation alternatively may pass. It will be noted in FIG. 2 that the rotor hubs S.1 and S.1' of the rear pair of main sustaining rotors are mounted on corresponding right and left somewhat similar outrigger frameworks at greater distances from the vertical center plane of fuselage 51 than are the respective hubs S and S' of the front pair of main sustaining rotors. If the curved rotational arrows of FIG. 2 be considered as indicative of the paths of the tips of blades 50 of the four main sustaining rotors in FIGS. 2 and 20, it may be noted that the blades 50 of the rear pair of rotors S.1 and S.1' need not extend over the roof of the fuselage 51 at all, while blades 50 of the front pair of rotors S and S' would pass over only the edges of the roof of fuselage 51. It is indicated thereby that the front pair of rotors S and S' would have blades 50 at least short enough that, with tip speeds below that of sound, those two front rotors would turn in opposite directions in order to equalize precessional tendencies as well as mounting shaft torque of the two hubs having rather stiff resiliently flexible annular members 128 and 129, as shown in FIGS. 10, 11, and 12 and described in detail in the accompanying application, which was later designated Ser. No. 562,935 filed June 29, 1966, in response to "Restriction Requirement" of Aug. 1, 1958, and would turn at such rotational speeds that those two rotors S and S' would act as gyros on their mounting shafts 12 respectively to such extent that they would maintain lateral stability of the craft.

But the front pair of rotors S and S' having such mounting of their blades 50 will cause a downdraft of air rearwardly below the advancing blades 50 of the rear pair of rotors having hubs S.1 and S.1', which alternatively may be much larger and may have the tips of their respective blades 50 extending inwardly even beyond the vertical center plane of the fuselage 51, over which they will be advancing in rapid horizontal translational forward flight. The downdraft of the front pair of rotors S and S' therefore will detract in such forward flight from the increased lift of advancing blades 50 of the rear pair of rotors S.1 and S.1' adjacent the fuselage 51 and thereby will tend to equalize the lift of blades 50 of those rear rotors throughout their orbits without adversely effecting the lift of blades 6 of the tail rotor assembly P midway between the advancing inner orbital phases of long blades 50 of the very large rear main sustaining rotors S.1 and S.1'. And, as indicated previously, tubular housings 7 and their enclosed drive shafts 5 of the pivotally mounted tail rotor assembly P may be extended upwardly and rearwardly from the tubular bracket 8 shown in FIG. 20 to remove blades 6 from any adverse effects of blades 50 of rotors S.1 and S.1' during rapid horizontal flight of fuselage 51.

It has been contemplated previously herein in connection with FIG. 2 that all four of the main sustaining rotor hubs S, S' and S.1, S.1' would be resiliently flexible and would have the pitch of their respective blades 50 regulated entirely by torque of their rotationally interconnected mounting shafts 12 both collectively and cylindrically individually as required, in accordance with hubs indicated in FIGS. 10, 11, and 12, in which three blades are mounted to rotate in the same orbital path. But, since the hydraulic blade pitch adjusting mechanism shown in FIGS. 18 and 19 (unlike previous mechanisms of others for adjusting blade pitch) will operate just the same with two, three, four, or even more blades equally spaced around the rotor hub, the reader will appreciate that one of the rotor hubs S.1, S.1' alternatively, instead of having pitch of its blades 50 adjustable by torque on its mounting shaft 12, may have its blades 50 hydraulically adjustable by a mechanism such as that shown in FIGS. 18 and 19 and described for the downswinging tail rotor P in my copending application Ser. No. 688,318, so that the pilot thereby alternatively could determine any desired lateral tilt of the big aircraft. The most essential difference for such a hydraulically actuated pitch adjusting mechanism of long blades 50 of such an alternative one of the two paired rear main sustaining rotors S.1, S.1' would be that the axis of its corresponding cylindrical valves 74 and 75, mounted in the corresponding cylindrical cavity of body member 76.1 of hydraulic pressure control mechanism 76, fixed within the fuselage 51, would be parallel to the longitudinal axis of fuselage 51 instead of being disposed perpendicular to the vertical plane including that longitudinal axis as indicated in connection with FIGS. 21, 22, 23 for regulating collective pitch of blades 6 of tail rotor assembly P. And in this connection note in FIG. 20 that mechanism 76 for hydraulic control of pitch of blades 6 of the tail rotor P to control longitudinal tilt of fuselage 51 with respect to the horizon alternatively may be mounted rigidly with respect to fuselage 51 at any point therein at which tilt-sensitive lever 83 having a vertically stabilizing means 84 attached to the lower tip thereof is free to swing longitudinally beneath the axis of paired valves 74 and 75 in said mechanism 76. In FIG. 20 the axis of lever 83 rotationally stabilizing inner valve 74 with respect to the horizon is located above a rotary displacement hydraulic pump (such as that indicated in FIGS. 21 and 22 but above the axis of valves 74 and 75 shown in those figures) mounted around a tubular housing 24.1 enclosing a longitudinally and somewhat horizontally disposed drive shaft rotationally interconnected with the mounting shafts 12 of the four main sustaining rotors and with the freely rotatable segment of the overrunning clutch, whose inverse segment is rigidly attached to the drive shaft of the engine E shown as directly below a gear box 25 having gears mounted therein as shown in FIGS. 4, 8, and 9.

As stated previously in connection with FIGS. 21, 22, 23, and 7, it is only convenient and not essential that the pressure fluid pump be inclosed in the same mechanism body 76 in which valves 74 and 75 are oscillatable pivotally on the same axis. Neither is any particular means of driving the pump essential over all others except that the drive shaft 98″ within the fuselage of whatever kind of pressure fluid pump is used, whether it be a rotary displacement pump or alternatively one driven by a cam on a shaft to actuate a diaphragm or piston in a cylinder, must be rotationally interconnected with the mounting shafts 12 of the side-by-side mounted main sustaining rotors, which respond immediately and automatically to substantial variations of torque on mounting shafts 12 by the engine E and go into aerodynamic autorotation instantly on such diminution of power not just on complete engine failure, without the pilot's ever being aware of such diminution or need to take corrective action by him.

In FIG. 20 one of the two flexible hose conduits 91–63, providing fluidtight connection by means of nipple 91 between conduit 90 of hydraulic control valve mechanism 76 and axially reciprocable but nonrotating cylinder 58 by means of nipples 63 at the other tip of said hoses, is shown as entering the conical rear tip 51′ of fuselage 51 only a short distance below tubular mounting bracket 8 of the tail rotor assembly P, so that no exterior means of support of said pair of parallel hoses is required between nipples 63 and the fuselage tip 51′, although it is necessary that there be sufficient slack in those hoses to permit lateral swinging of cylinder 58 with respect to the axis of housing 7 in bracket 8, beneath which the tail rotor assembly P hangs downward vertically by gravity except when the pilot is exerting pressure on his steering lever 21 to divert that assembly P from its natural gravitational posture. But, as indicated in FIGS. 5 and 32, at least one suitable flexible loop, such as a leather strap, may be installed around the hoses 91–63 and around the rear gearbox 4, as well as alternatively around tubular housing 7 and tubular bracket 8, to keep the two flexible pressure hoses 91–63 from coming in conflict with rotating blades 6 of the tail rotor P. Obviously in either FIG. 5 or FIG. 20 the two parallel hoses 91–63 alternatively might be connected with somewhat parallel nipples 63 screwed in the rear midsection of cylinder 58, from which the two parallel hoses then could pass over the top of gear box 4, housing 7, and tubular bracket 8 before entering a hole in the fuselage adjacent its rear tip to proceed forward for connection with control valve mechanism 76. And, if the circular hoop 11.3 alternatively be mounted around the orbit of blades 6, its central bracing frame member 11.2, whose front tip is shown attached to the interior framework of conical fuselage tip 51′, but which obviously might be attached alternatively to gear box 4 with even hoop 11.3 suspended therefrom by suitable such spokes 11.2, may be employed for suspending the pressure fluid hoses beneath such a bracing frame member 11.2 forward from gear box 4 to a suitable hole in that fuselage tip 51′.

In FIG. 20 gear boxes 25 at the vertical longitudinal midplane of fuselage 51 are attached rigidly to the roof thereof by suitable paired frames 25.1, which need not be disposed at the exact center of that fuselage; and frames 11.1 adjacent the sidewalls of the fuselage rigidly mount the horizontally disposed lateral tubular housings 19 of drive shafts 18 just as do similar frames 11.1 in FIGS. 5 and 8. Likewise in FIGS. 2 and 8 the outrigger frameworks rotatably mounting shafts 12 of hubs S.1 and S.1′ in tubular housings in upright tubular housings 13 are rigidly attached to fuselage 51 by means of frame members 15, 19.1, 69.1′, 10.1, and 10.1′ similar to such outrigger frame members explained in connection with FIGS. 1, 3, and 4 showing the much shorter fuselage 1 having only two main sustaining rotors mounted side-by-side, although FIG. 2 indicates that diagonally disposed bracing frame members 10.1 and 10.1′ generally corresponding to shorter such braces 10 and 10′ attached to the shorter fuselage 1 alternatively may be attached to the center line of the roof of the longer fuselage 51, since its rear pair of rotors S.1 and S.1′ are higher above the rear portion of the longer fuselage 51, shown in smaller scale, and have their mounting shafts 12 in longer upright housings 13 disposed farther from the vertical fuselage center plane. And in FIGS. 2 and 20 the outrigger frameworks having members 19, 69′, 10 and 10′ are rigidly attached to the sides of longer fuselage 51 for rotatably mounting in upright tubular housings 13 the shafts 12 on whose upper tips are keyed hubs S and S′ similar to those shown in FIGS. 10, 11, and 12, just as are the hubs S and S′ having three blades each in the same orbital path in FIGS. 1, 3, and 6. The bracing members 10 adjacent the front tip of fuselage 51 constitute backswept and dihedrally disposed fixed stabilizing airfoils just as explained in connection with those previous FIGS. 1, 3, and 4. But, since the pitch of blades 50 of those side-by-side mounted main sustaining rotors S and S′ is determined automatically, both collectively and individually around their respective orbits, by torque on mounting shafts 12, it is possible and practical to mount my horizontally and laterally disposed shaft housings 19 pivotally, generally in the manner of tubular housings 7 of drive shafts 5 through tubular brackets 8 and around tubular housings 24 as indicated in FIGS. 5, 6, and 20; but, as will be shown and explained in detail in the accompanying application in response to "Restriction Requirement" of Aug. 1, 1958, some modifications of the auxiliary rotor mounting have to be made to accommodate the larger main sustaining rotors mounted side-by-side, so that orbital paths of blades 50 of rotors S and S′ mounted on shafts 12 rotating through tubular housings 13 can be tilted forward, after the craft has risen from the ground, to serve as tractor propellers with the rear pair of larger rotors S.1 and S.1′ thereafter acting as gyrodynes under aerodynamic autorotation to sustain the rear part of the aircraft in conjunction with the lift of tail rotor P having blades 6 of suitable length for steering the craft relative to the points of the compass and determining suitable longitudinal tilt of fuselage 51. Suffice to say here that a craft having its horizontally and laterally disposed tubular housings 19 pivotally mounted through annular brackets in the sidewalls of the fuselage 51 would have the blades 50 of its front pair of rotors S and S′ short enough not to come in contact with the fuselage 51 on tilting forward to positions with tubular housings 13 almost horizontal, and that stabilizing fixed wings 10 alternatively would be mounted around pivotally oscillatable housings 19 to serve as stabilizing vanes, as well as diagonal bracing means for housings 19 and 13 rigidly attached to gear boxes 15, in case of serious diminution of power of engine E during rapid forward translational flight of the craft, which may be made to transport more than 50 passengers at speeds up to more than 200 miles per hour without excessive vibration of rotor blades 50 and the outrigger frameworks, if suitable engines are installed in fuselage 51. Since the stiff resiliently flexible hubs S and S′ as indicated in FIGS. 10, 11, and 12 adapt themselves immediately with minimum vibration to any rapid cross currents of air because of the stiffness of resilient annular members 128 and 129 therein, regardless of the number of blades 50 mounted at equal intervals around the respective upper tips of mounting shafts 12 through tubular housings 13; and because those hubs S and S′ can oscillate slightly on axes perpendicular to the axes of their respective mounting shafts 12 to equalize any differences of lift between advancing and retreating phases of the orbits of their blades 50 that may not have been equalized by resilience of blade pitch adjusting springs 143, the two shafts 12 in housings 13 of the front pair of rotors S and S′ may be tilted forward at any desired angle with respect to the horizon, in which event fuselage 51 may be kept disposed with its nose tilted up slightly, at a suitable angle such as indicated in FIG. 20, if the rear pair of side-by-side mounted main sustaining rotors are to turn by aerodynamic autorotation in rapid forward flight of the aircraft. But, whether the fuselage 51 is to be disposed in that manner for a craft at times alternatively having its front pair of side-by-side mounted rotors S and S′ tilted forward with respect to the fuselage in rapid forward translational flight, or whether the long fuselage 51 may have its longitudinal axis L–L′ perfectly level with the four side-by-side main sustaining rotors all tilted forward slightly with respect to the horizon to induce forward flight of the craft shown in FIG. 8, the longitudinally pivotally mounted tail rotor P will have blades 6 of adequate length to determine whatever longitudinal tilt of fuselage 51 is desired. Shorter blades 6 of course are required for that purpose, if tubular oscillatory drive shaft housing 7 is lengthened to give more leverage, around the horizontal lateral axis of the craft, to rotor P mounted on the rear tip of a longer housing 7 than would be the case with the rotor P mounted only a very short distance rearward from rearward protruding tubular bracket 8 as shown in FIG. 20, in which that bracket ends at the rear end of conical rear tip 51' of fuselage 51. Note in this connection that such an alternative rearward extension of tubular housing 7, with its inclosed tubular drive shaft 5 beyond the rear end of tubular fixed bracket 8, as illustrated in FIGS. 1, 3 and 5, imposes no strain whatever on small and light drive shaft 5, on which gear box 4 is not mounted, for all of the lift of blades 6 in ordinary flight is absorbed by tubular housing 7 projecting rearward through and being counterbalanced somewhat through tubular bracket 8 substantially rigidly mounted in the fuselage and protruding therefrom as desired, whether the fuselage be short and mounting only two side-by-side main sustaining rotors S and S' as indicated in FIGS. 1, 3, and 5 or much longer as indicated in FIGS. 2 and 20 showing two additional paired rear side-by-side mounted rotors S.1 and S.1'.

If hydraulic means collectively adjusting blades 50 of one of the rear rotors S.1, S.1' be not employed alternatively to control lateral tilt and stability of fuselage 51 by means of an alternative control mechanism 76 having the pivotal axis of its valves 74 and 75 mounted parallel to the longitudinal axis of fuselage, as previously explained, a major factor in the maintenance of lateral stability of the aircraft shown in FIG. 8, at least while hovering or in vertical ascent and descent of the aircraft, is the gyroscopic effect of blades 50 of the front pair of rotors S and S', whose stiff resiliently flexible hubs, such as indicated in FIGS. 10, 11, and 12, keyed on the upper respective tips of upright shafts 12 tend to keep the blades 50 of each said rotor, regardless of the number of blades in each having substantially cantilever mounting in the same plane of the axes of their pivotally oscillatable pitch adjusting roots, at least almost perpendicular to the axis of the mounting shaft, regardless of any alternative forward tiltability of housings 13 of shafts 12 and regardless of any gradually limited universal oscillation, by means of stiff but flexible annular plates 128, 129, of the outer annular segments 113 of the rotor hubs with respect to the mounting shaft 12 on axes, or axis, if only one pivot is employed to mount two blades, perpendicular to the axis of said shaft. To provide such lateral stabilization of fuselage 51, as well as in fuselage 1 shown in FIGS. 1 and 3 showing a family-size aircraft, in which cost of another stabilizing unit 76 would be an important factor, it of course is necessary that rotors S and S' have sufficient rotational speed, inverse to length of blades 50, to develop adequate centrifugal force on blades 50 thereof without tip speeds exceeding that of sound. The length of blades 50 of rotors S and S' of FIGS. 2 and 20 as well as FIGS. 1 and 3 therefore must be limited to provide such rotational speeds without excessive tip speeds of the blades 50.

But at any rotational speed it is not permissive to have vertically flapping blades 50 mounted in hubs, corresponding to hubs S and S', having each blade mounted on its respective pivot substantially perpendicular to the longitudinal axis of the blade and substantially in a plane perpendicular to the axis of the rotor mounting shaft, whether such pivot by a cylindrical pivot pin or a spherical pivot providing for pitch adjustment of the airfoil as well as drag angle and vertical flapping, since such vertical flapping of the blades individually tends to divorce any cantilever tendency from the blade mounting and thereby to remove the gyroscopic stabilizing tendency from the mounting shaft that otherwise is imparted by centrifugal force on my rapidly rotating blades 50, when means is provided, as by resiliently flexible annular hub members 128 and 129 of FIGS. 10, 11, 12, having sufficient stiffness to keep the orbital paths of said blades 50 substantially perpendicular to their respective mounting shafts 12 and thus to impart the stabilizing tendency of the centrifugal force on blades 50 to shafts 12. In connection with the foregoing statement as to gyroscopic stabilizing tendencies of my main sustaining rotors S and S' mounting blades 50 of the aircraft, it is to be noted that, if I were to mount on side-by-side shafts 12 of those rotors alternative hubs having only two blades 50 mounted pivotally in a yoke in the manner of blades 6 of the inversely disposed auxiliary control rotor P, such as indicated in FIGS. 18 and 19, at the tail of the craft, the yoke 39 would tend to keep the two diametrically opposed blades 50 rotating in a plane perpendicular to the mounting shaft 12 even without resiliently flexible means gradually limiting pivotal oscillation of the central hub 42 on pivot pin 41 mounted in yoke 39. But no such gyroscopic stabilizing tendency is required or even desired for the tail rotor P, whose entire assembly is pivotally mounted in tubular fuselage bracket 8; and any such gyroscopic tendency is substantially eliminated from tail rotor P by the pivotal cantilever mounting of blades 6 on pitch adjusting pivot pins 42' of hub 42 coinciding with the longitudinal axes of those blades 6, which are kept in a plane perpendicular to the axis of rotor mounting shaft 2 by means of their pitch adjusting linkages 49 attached rigidly to rotating cylinder 67, which adjusts pitch of the blades 6 cyclically as well as collectively, by axial movement of cylinder 58 with respect to cylindrical housing 3 of shaft 2, to keep them in that plane perpendicular to mounting shaft 2 in spite of any cross currents of air that would cause differences of lift of the blades between advancing and retreating phases of their orbits in rapid translational flight—even without any means, corresponding to resiliently flexible annular members 128,129 of FIGS. 10, 11, 12, of gradually limiting oscillation of the hub 42 on pivot pin 41 in yoke 39 rigidly attached to the tip of shaft 2.

But my tail rotor assembly P mounted pivotally to hang downward from the axis of tubular housing 7 in bracket 8, protruding rearward longitudinally from the generally cylindrical and horizontally disposed fuselage, as indicated in FIGS. 2 and 20 as well as FIGS. 1, 3, and 5, with the axis of its mounting shaft 2 of blades 6 substantially in a vertical plane including that axis of drive shaft housing 7 in bracket 8 in straight forward translational flight of the craft under power of the engine turning the rotationally interconnected sustaining rotors, also tends to impart lateral stability to the fuselage by any effort of the pilot in steering the craft relative to the points of the compass to shift by swinging said axis of shaft 2, hanging downward from the axis of housing 7 in rearward protruding bracket 8, from said vertical plane including the axis of housing 7 in bracket 8, which at least almost coincides with the vertical plane including the longitudinal axis of the generally cylindrical fuselage somewhat horizontally disposed. In ordinary flight it is contemplated that the passengers and cargo in the fuselage, whether long or short, will be so disposed that blades 6 of tail rotor P will exert some lift on gear box 4, tubular housing 7, and fuselage bracket 8 at the rear tip thereof by virtue of downthrust of the surrounding air somewhat axially of tubular housing 3. Therefore any pivotal oscillation by the pilot of tubular housing 7 through tubular bracket 8 that causes the axis of shaft 2 mounting blades 6 to swing laterally, either right or left, from the vertical plane including the pivotal axis of housing 7 through bracket 8 will tend to dispose the axis of shaft 2 at an angle with respect to said vertical plane at least almost including the longitudinal axis of the fuselage as well as the axis of housing 7 in bracket 8. And any disposition of the axis of shaft 2 at an angle with respect to said vertical plane including the axis of tubular housing 7 in its bracket 8 will tend to cause blades 6 mounted on the lower tip of shaft 2 to develop a horizontal vector force in the opposite direction from that in which the pilot is trying to direct the nose of the craft as in the opposite direction from that in which the axis of blades 6 is swung away from said plane including said axis of housing 7 in bracket 8, thereby causing tubular housing 3, gear box 4, tubular housing 7, and tubular bracket 8 to rotate the fuselage around its vertical axis with respect to the compass and steer the nose of the craft in the opposite direction from said vector force derived from lifting blades 6 and in the same direction as that to which shaft 2 mounting blades 6 is shifted from the vertical plane including the axis through bracket 8 of tubular housing 7 of drive shaft 5 above shaft 2. On cessation of the force whereby the pilot oscillates tubular housing 7 through bracket 8 and thereby causes the axis of shaft 2 mounting blades 6 to swing laterally, in either direction at his election and up to equal amounts of at least almost 90°, from the vertical plane including the axis of housing 7 in bracket 8, the force of gravity on gear box 4, rigidly attached to the rear tip of tubular housing 7, and on its rigidly attached tubular housing 3 disposed somewhat perpendicularly to tubular housing 7, of rotor shaft 2 and the appurtenances attached thereto for adjusting and reversing pitch of blades 6 of rotor assembly P, will tend to cause rotor assembly P to return to such position that axis of shaft 2 will again be in the vertical plane including the axis of housing 7 in bracket 8. But in the meantime, while the pilot is causing oscillating force to be exerted on tubular housing 7 by means of steering lever 21 shown in FIG. 5, or otherwise as will be explained later herein, force of gravity acting on rotor assembly P around the axis of housing 7 in bracket 8 will tend to exert a torque on the fuselage around its longitudinal axis by means of housing 7 in bracket 8; and this torque on the fuselage around its longitudinal axis will tend to impart lateral stability to the aircraft in addition to the gyroscopic stabilizing tendency of blades 50 of side-by-side mounted main sustaining rotors S and S' having their mounting shafts 12 extending through housings 13, which cannot rotate around the longitudinal axis of the fuselage mounting them, even though said housings 13 mounting said side-by-side rotors S and S' shown in FIG. 20 alternatively may be tilted forward with respect to their mounting lateral normally horizontally disposed tubular housings 19 as indicated previously.

It being presumed that the center of gravity of the craft will be disposed in the vertical plane including the longitudinal axis of the fuselage and midway between the main sustaining rotors mounted side-by-side on each side of said fuselage, it is intended that the passengers and cargo will be equally balanced with respect to said vertical plane. And any departure from said equal distribution of the passengers and cargo with respect to said vertical plane would cause one side of the craft to tend to descend with respect to the other side, thereby causing the craft to slip or move toward the descended side of the craft for reasons and principles of physics and aeronautics well known in the art. But, since the pilot will wish to steer the craft back onto his desired course, whether the craft be moving forward or rearward or not moving longitudinally at all, in spite of the slippage tendency due to laterally unbalanced cargo or passengers, he quite naturally would oscillate tubular housing 7 by means of his lever 21 in the direction with respect to the compass that he wished the nose of his fuselage to move, by virtue of the fact that the tail rotor would move in the opposite direction around the vertical axis of the craft, thereby causing rotor blades 6 of tail rotor assembly P to be swung laterally beneath the axis of housing 7 in bracket 8 in the opposite direction with respect to the vertical plane including the longitudinal axis of the fuselage from the direction toward which the craft was slipping by virtue of the laterally unbalanced cargo or passengers.

In FIG. 5 showing a fragment of the rather short fuselage 1, in which up to five or six passengers may be carried, the steering lever 21 is attached beneath the front tip of tubular housing 7, which a pilot, seated in a suitable seat not shown, slightly rearward of vertical tubular housing 31 of drive shaft 30 below gear box 25 in the middle of the fuselage may oscillate through tubular bracket 8 by lateral movement of the lower tip of said downward hanging lever 21, whose weight augments the weight of downward hanging tubular housing 3 rigidly attached to gear box 4 in substantially the same vertical plane to bring rotor mounting shaft 2 of blades 6 into position for straight forward movement of the aircraft as well as to exert a lateral stabilizing torque around the longitudinal axis of fuselage 1, whenever lever 21 and housing 3 are swung laterally from that normally substantially vertical posture plane of straight line flight. But in the longer fuselage 51 of FIG. 20 it is contemplated that the pilot's seat, not shown, would be in the space adjacent the front gear box 25, which is far removed from the tubular housing 7 mounted in corresponding bracket 8 in the rear conical tip 51' of that longer fuselage 51; and therefore in FIG. 20 in lieu of attaching a steering lever 21 to the lower wall of a cylindrical reinforcing coupling sleeve ring 20 rigidly attached to the front tip of tubular housing 7, as indicated in FIGS. 5 and 29, it is indicated that alternatively as a corresponding means of oscillating housing 7 through bracket 8 the pilot may utilize a double pronged lever 21 attached, as indicated in larger scale FIG. 28 showing a lateral cross section through drive shaft 5 and its enclosing tubular housing 24 along line 14–14' of FIG. 20, in the same manner to the top wall of sleeve ring 20 similarly attached to the front tip of tubular housing 7 as in FIG. 29. In FIG. 28, showing a lateral upright cross section of the somewhat conical rear wall tip 51' of fuselage 51 with a cross section of the drive shaft 5 and its enclosing housing 24 immediately rearward of rear interior gear box 25, it can be seen that stud bolt screws 20' keep cylindrical coupling ring 20 from rotating with respect to the front tip of tubular housing 7 mounted pivotally through tubular bracket 8 rigidly mounted in fuselage conical tip 51', which incidentally may be a convenient place for installation of a fuel tank to supply engine E in order to counterbalance the weight of passengers and cargo carried forward of engine E and the rear large sustaining rotors S.1 and S.1', although that engine alternatively of course could be located farther forward in the fuselage 51 to drive the longitudinally disposed shaft in tubular housing 24.1 by suitable means, because it now is presumed that all of those drive shafts of the several rotors are rotationally interconnected. Since blades 6 and tail rotor assembly P of the very small scale long fuselage 51 in FIGS. 2 and 20 are much longer, larger, and heavier than corresponding blades 6 of the tail rotor assembly P mounted in the fuselage 1 shown in FIGS. 1, 3, and 5, it may be noted that in FIG. 20 there are shown small annular spaces between coupling ring 20, mounted rigidly on the front tip of tubular housing 7, and its adjacent faces of gear box 25 and enclosing tubular bracket 8. In these respective small annular spaces, too small to show clearly in FIG. 20, it is intended that there alternatively may be installed one of two respective annular axial thrust ball bearing assemblies to facilitate oscillation by the pilot through bracket 8 of tubular housing 7 having the larger tail rotor assembly P rigidly attached to the rear tip thereof, whatever the length of housing 7 may be determined as most suitable for disposition of blades 6 relative to the two rear rotors S.1 and S.1', whose blades 50 will have some downdraft ahead of blades 6, regardless of what height above line L–L' is chosen for their disposition, as mentioned previously.

It must be remembered that the pilot may find it necessary in steering and balancing the craft to oscillate housing 7 pivotally through tubular bracket 8 very quickly at times and through more than 45° on each side equally from the normal position for straight line flight with the axis of shaft 2 substantially in the vertical plane containing the axis of housing 7 in rearward protruding tubular bracket 8. In FIG. 28, in which tubular bracket 8 is hidden by annular coupling ring 20 as well as double-pronged steering lever means 21 attached rigidly thereto, there is suitably attached to the upper tip of each of the two prongs of housing oscillating means 21 the tip of a small cable 21'; and these somewhat parallel small cables 21' extend downward, as shown in FIG. 20, to the floor of fuselage 51, on each side of the engine E, at which there are mounted pulleys around which the respective cables 21' pass before being extended forward beneath said floor 1' toward the pilot's compartment in the front tip of fuselage 51. As is well known in the art, a rudder bar pivotally mounted at its center may have the front tip of each of the cables 21' suitably attached to the tips of the laterally disposed rudder bar, which the pilot may operate with his feet alternately to pull down on one and the other of the two cables 21' shown in FIG. 28 to pull down on the respective prongs of steering lever mechanism 21 and thereby oscillate tubular housing 7 around its axis through bracket 8 to steer the craft, as previously explained, and simultaneously to give lateral stability to the craft.

But, since it is contemplated that my pilot may wish to control speed of his engine E by means of one foot, either directly by the fuel throttle or indirectly by adjustment of a speed-control governor well known to the art and in no way a part of the present invention, it is indicated in FIG. 41 that there alternatively may be employed, in lieu of steering lever 21 shown in FIG. 5, a hand operable means whereby the pilot in his compartment in the front tip of fuselage 51 may pull on cables 21' of FIGS. 28 and 20 to oscillate his steering control shaft housing 7 pivotally in bracket 8. In FIG. 41 the forwardly extending cables 21', as shown in FIG. 20, beneath fuselage floor 1' pass around pulleys 21" mounted on vertical pivot pins attached to the lower side of said floor at points suitably spaced from each other, so that cables 21' after passing around the respective pulleys 21" are disposed somewhat laterally of the fuselage with their front tips being attached under suitable tension to a small plate mounted on the lower tip of a normally vertically disposed steering lever 21, which is disposed through a hole in floor 1' around which is rigidly mounted a plate 1.1 having two aligned bearing brackets in which are pivotally mounted trunnions attached to the steering lever 21 slightly above the floor 1' and in alignment with the longitudinal axis of the fuselage, so that the pilot may move the upper tip of the pivotally mounted lever from side to side between his legs and thereby move the lower tip of said lever 21 from side to side in the opposite directions to pull on one or the other of cables 21' alternately and thereby oscillate tubular housing 7 by means of the two-pronged lever 21 rigidly attached to ring 20 on the top side thereof as indicated in FIG. 28 showing the posture of that lever for straight line forward flight of the craft under power of the engine rotating the mounting shafts of all the rotors. And it will be noted that a pilot operating his lever 21 shown in FIG. 41 will move the upper tip thereof in the direction toward which he wishes the front tip of fuselage 51 to move as a result of his pivotal oscillation of tubular housing 7 through tubular bracket 8.

Thus it can be seen that, whether a simple steering lever 21 is suspended somewhat vertically beneath coupling ring 20, attached rigidly to the front tip of tubular housing 7, as indicated for the family-size craft shown in FIGS. 5 and 29, or whether, in a much longer fuselage for transporting freight or troops or intercity passengers, a two-pronged lever 21 is attached to the top of ring 20, similarly attached to the front tip of tubular housing 7 of drive shaft 5 within smaller tubular housing 24, as indicated in FIGS. 20 and 28 for connection of the tips of the two-pronged lever 21 by means of cables 21' with the lower tip of a steering lever 21 pivotally mounted at the floor of the pilot's compartment, the craft will be steered quickly, by means of tubular housing 7 pivotally mounting tail rotor P, laterally in the direction toward which the pilot forces the free end of his lever 21 in his compartment. And, on cessation of the pilot's lateral forcing of his hand steering lever 21, the axis of shaft 2 mounting blades 6 of the steering rotor P will return by force of gravity and pivotally mounted rotor assembly substantially to the vertical plane including the pivotal axis of housing 7 in bracket 8 so that the aircraft, presumed to have its center of gravity in the vertical plane including the longitudinal axis of the fuselage, will travel in a straight line in forward flight, since torque on one of the side-by-side mounted main sustaining rotor shafts 12 will exactly counteract the torque of the shaft of the other such paired rotors of the same size turning in the opposite direction.

But FIG. 41 also illustrates that other means, supplementary to the force of gravity, may be employed to force shaft 2 of rotor P into proper posture with respect to the fuselage to make the craft proceed in a straight line with respect to the compass, when the pilot relieves his force on the free tip of his manually operable steering lever 21. In FIG. 41 the bolts by which the forward tips of small connecting cables 21' are attached to the somewhat horizontal pair of plates mounted on the lower tip of the pilot's pivotally mounted lever 21, beneath the floor 1' of the fuselage, also attach to those two plates the inner and adjacent tips of two laterally aligned coiled tension springs 21.1, whose opposing outer tips are attached to the lower fuselage wall at such points that suitable tension is provided in each of the opposing springs 21.1 to bring the lower tip of lever 21 and thereby the forward and rear tips of connecting cables 21' into such position that two-pronged lever 21, to whose upper and outer tips cables 21' respectively are attached, will tend to pivotally oscillate housing 7 extending through bracket 8 to such posture that its rigidly attached gear box 4 and tubular housing 3 of shaft 2 of the steering tail rotor P will tend to cause the axis of shaft 2, mounting blades 6 to rotate with their longitudinal axes in a plane substantially perpendicular thereto, to remain substantially in the vertical plane including the axis of housing 7 through substantially rigidly mounted bracket 8 of fuselage 51.

Although in the foregoing descriptions it has been stated that, for straight line forward flight of the craft, the axis of rotor mounting shaft 2 of auxiliary fuselage-tilt and steering tail rotor P will be substantially in a vertical plane containing the axis of housing 7 in bracket 8 as well as the longitudinal axis of the fuselage in which that bracket 8 is rigidly mounted, it will be understood that, apart from any tendency of the craft to "slip" laterally as a result of the fact that asymmetrically unusual laterally unbalancing positions of passengers and cargo in the fuselage may cause the center of gravity of the craft to vary with respect to that vertical plane including the longitudinal axis of the fuselage midway between the axes of the side-by-side mounted rotors, it will be desirable for straight line forward flight under some conditions to vary the disposition of the axis of shaft 2 very slightly, perhaps at an angle of 1° or 2°, from the plane including the axis of housing 7 in its tubular bracket 8, because, although torque of one shaft 12 of a main sustaining rotor on one side of the vertical plane including the longitudinal axis of the fuselage presumably will be exactly offset by torque of shaft 12 of its paired side-by-side rotor equally spaced from said longitudinal axis on the opposite side thereof, regardless of whether engine E is operating at all or to what extent, there will be a very slight tendency of shaft 2, continually driven in flight at somewhat constant speed, regardless of torque of the engine on its drive shaft 30, mounting blades 6 of the tail rotor to rotate the craft around its vertical axis as a reaction to the driving torque on said shaft 2. Obviously the axis of shaft 2 mounting rotor blades 6 of the auxiliary tail rotor P alternatively may be inclined very slightly with respect to the vertical plane including the axis of housing 7 in longitudinally disposed tubular bracket 8 by inversely changing the otherwise equal lengths of cables 21', whereby the pilot's lever 21 of FIG. 41 oscillates housing 7 pivotally mounted through tubular bracket 8, or alternatively by changing the vertical position of the pilot's pivotally mounted and manually controlled lever 21 in FIG. 41 by bolting the outer tips of coiled tension springs 21.1, considered above as of equal length and strength, to the lower wall of fuselage 51 beneath its floor 1' at different distances from the pivot trunnions 1.2 of lever 21 mounting it in bracket 1.1 attached to said floor 1', thereby causing differences of tension in said coiled springs 21.1, although other suitable means of varying the tensions of those springs 21.1 alternatively may be employed.

It is not deemed practical to counter the torque on shaft 2 by conventional means such as mounting two rotor hubs to turn blades 6 thereof in opposing directions around the same axis on different shafts 2, because such an arrangement, in addition to requiring unnecessary double weight for such a small orbital area with resultant high rotational speed to achieve suitable tip speed of the blades 6 subject to quick lateral swinging from the pivotal axis of housing 7 in bracket 8, would bring unnecessary complications and resultant increased costs of manufacture and maintenance, not to mention problems such as conflicts between blades of the two rotors of any appreciable length, unless their orbital paths are widely separated on their common axis. Of course, if the aligned housings 19 of shafts 18 driving the side-by-side mounted rotors S and S' are not mounted exactly perpendicular to the vertical plane including the longitudinal axis of the generally cylindrical and horizontally disposed fuselage, the downward air backwash of those rotors in powered flight would tend to drag on the portion of the fuselage rearward of housings 19 and thereby could tend, particularly in high speed forward flight, to counter any tendency of the power driven small and quickly swingable tail rotor P to rotate the craft around its vertical axis. And, although there would be increased costs of manufacturing bevel gears not mounted to turn on perpendicular axes as are most of those now in mass production for other purposes, it would be possible to dispose the axis of tubular bracket 8, through which tubular housing 7 of drive shaft 5 is pivotally oscillatable, in fuselage 1 at a slight angle horizontally with respect to the aligned axis of shafts 18 mounted in tubular housings 19 mounted perpendicular to the vertical plane including the longitudinal axis of generally cylindrical fuselage 1 shown in FIG. 1, thereby shifting the weight of the tail rotor assembly P to one side of that vertical plane and thus causing the craft to tend to "slip" laterally on its main sustaining rotors in the desired direction, although the same result could be obtained much more cheaply by merely shifting the cargo of the plane with respect to that vertical plane.

It will be appreciated, however, that other means may be employed to counter the very slight tendency of driving torque around the axis of shaft 2 of the steering rotor P to rotate the craft around its vertical axis in flight, although it will be appreciated that quite fortunately there is no appreciable change in the tendency of shaft 2 of rotor P to rotate the craft in the opposite direction to said driving torque of that shaft as a result of variations in the amount of torque of the engine E on its driving shaft 30 either as a result of failure of the engine E or the pilot's adjustment of power of the engine to adjust rotor speed for determining whether the craft will hover, ascend, or descend at his election, because my novel main sustaining rotor hubs S and S' shown in FIGS. 10, 11, and 12 will reduce pitch of blades 50 thereof in response to variations in engine torque automatically and instantaneously, even though that engine may be operating at only part of its power capacity in addition to the fact that those blades 50 will go into aerodynamic autorotation immediately and instantaneously on diminution of engine power to such extent that the craft tends to descend, either at the election of the pilot or due to engine power diminution and failure. Of course, by way of contrast, a countertorque tail rotor of a helicopter, which regardless of its particular type would have a single much larger sustaining rotor beneath which the center of gravity of the craft would be suspended primarily if not completely, would have to have the thrust of said countertorque rotor variable almost continually, in order to counter the variations of torque on the mounting shaft of the main sustaining rotor according to whether the engine was ascending or descending under full or only partial power or whether the main sustaining rotor might be turning under aerodynamic autorotation in event of complete power failure, although none of the sustaining rotor hubs thereof are instantly responsive to variations of torque on their mounting shafts in the way that my rotors shown in FIGS. 10, 11, and 12 operate.

FIGS. 34, 35, 36, 37, and 38 indicate that it is possible to shift the weight of tail rotor P to one side of the axis of housing 7 through tubular bracket 8, mounted rigidly in fuselage 1 as may be desired with respect to the vertical plane including the longitudinal axis of the fuselage. In FIG. 34, which shows the rear tip of a tubular housing 7 having somewhat thinner walls and larger overall diameter than that shown in detail vertical cross section FIGS. 29, 30, 31, and 32 in order to give increased longitudinal rigidity to that tubular housing without any increase in weight thereof, the rear tips of cylindrical tubular housing 7, gear box 4 bolted to the rear tip thereof, and drive shaft 5 mounted therethrough are shown cut away to the axis 5-5' of that drive shaft, shown within the fragmentary rear tip of housing 7 by broken lines, to indicate that it alternatively may be disposed at a horizontal angle with respect to the axis 7-8—7'-8' of cylindrical tubular housing 7 through tubular bracket 8, not visible in FIG. 34. FIG. 35 as a cross section through shaft 5, along line A-A' of FIG. 34, perpendicular to its axis 5-5', looking rearward toward the four bolts by which gear box 4 is attached rigidly to the rear tip of housing 7, indicates diagrammatically that shaft 5 may be mounted in a ball bearing assembly, providing against axial as well as radial thrust in the housing 7 to insure that bevel pinion gear 27' cannot move axially with respect to the bevel gear beneath it, mounted rigidly on the upper tip of shaft 2, with whose teeth its teeth mesh as indicated in FIG. 7.1, the outer race of the bearing assembly 26' being mounted off center in a cylindrical shoulder cavity of a cylindrical bearing mounting block 73 installed against an annular shoulder in the rear tip of housing 7 as indicated in FIG. 34. FIGS. 36 and 37 likewise indicate diagrammatically that the front tip of shaft 5 alternatively may be installed laterally to one side, by a slightly smaller amount, of the center of the front tip of the slightly smaller tubular housing 24, around which tubular housing 7 is pivotally oscillatable; and it can be seen that in this alternative instance the front tip of the driven drive shaft 5 having an axis 5-5' would be mounted in a ball bearing assembly 26 mounted in the off-center shouldered cylindrical cavity of a bearing block 24B mounted against a shoulder in the front tip of cylindrical tubular housing 24. But note in FIG. 36 that the axis of shaft 5 indicated by the broken line 5-5' is diagonally disposed not only with respect to the axis of cylindrical tubular housings 7 and 24 but also with respect to the fragmentary segments of sidewalls of central gear box 25, in which the ring gear 28, driving bevel gear 27 mounted rigidly on the front tip of shaft 5, is mounted on rotatable retainer 33 having its axis perpendicular to said sidewalls of gear box 25. But FIG. 38 indicates that shaft 5 alternatively might have a ball bearing assembly 26" at the center of tubular bracket 8 and of cylindrical tubular housings 7 and 24 adjacent the rear tip of the latter beneath fuselage frame member 11 shown in FIG. 30.

On top of the rear tip of tubular housing 7 shown in FIG. 34 there is shown rigidly mounted an alternative somewhat vertically disposed vane, undesignated, which is disposed at a considerable angle with respect to the longitudinal axis of said tubular housing 7, whose rear tip has a great deal of leverage with which to control the posture of the aircraft around its vertical axis as a result of the backwash from blades 50 of rotors S and S' as shown in FIGS. 1, and 3, in which tubular housing 7 and blades 6 of the auxiliary rotor are somewhat below the level of blades 50 of the main sustaining rotors. But additionally it will be noted that such an alternative vane on top of the rear tip of tubular housing 7 would tend in such backwash of air from blades 50 of the side-by-side mounted main sustaining rotors S and S' to rotate housing 7 in its pivotal bracket 8, so that yoke 39 mounting blades 6 of rotor P on the lower tip of shaft 2 mounted in tubular housing 3 rigidly attached to gear box 4 would be swung in the opposite direction laterally beneath the axis of drive shaft housing 7 in bracket 8, thereby not only shifting laterally the weight of rotor assembly P in the opposite direction but also disposing the axis of shaft 2 at an angle with respect to the vertical plane including the axis of said housing in said tubular bracket 8, thereby causing a horizontal vector force derived from reaction to the normal downthrust of air by blades 6 to counteract the continual driving torque of shaft 2 on said blades 6, which otherwise would tend only very slightly to rotate the craft around its vertical axis.

It will be understood, however, that all the foregoing alternative means of keeping my craft from rotating around its vertical axis as a result of driving torque on shift 2 of the simple tail rotor shown in FIGS. 1, 3, and 5 are only more complicated alternatives and that perhaps the most effective means of laterally swinging tubular housing 3 with respect to the vertical plane including the axis of housing 7 in bracket 8 as well as with respect to the vertical plane including the longitudinal axis of fuselage 1, in order to counter the torque on continually driven upright shaft 2 mounting blades 6, is to mount steering lever 21 on ring coupling 20 at a suitable angle from vertical as indicated in FIG. 37 by fragmentary segment of a cylindrical steering lever rigidly attached to ring 20, which FIG. 37 also shows the heads of three of four stud bolts setscrews that hold ring 20 fixed with respect to the front tip of tubular housing 7, on which sleeve ring 20 is screwed, and in front of which an annular felt washer around tubular housing 24 is installed to prevent leakage of bearing lubricant therefrom, as indicated in FIG. 36 also and as explained in connection with FIG. 29. Such a diagonally disposed lever 21 has some weight tending to displace shaft 2 of the tail rotor P with respect to the vertical plane including the axis of housing 7 in bracket 8; and to the lower tip of said lever there would be attached a hand rest perpendicular to said lever, so that the pilot's hand weight would be sufficient to keep shaft 2 disposed at any desired small angle with respect to said vertical plane. It is contemplated, however, that the craft would be made to fly normally in a straight line without any attention from the pilot's hand and he could hang just enough weight of any kind on the hand rest to compensate for any observed deviation from the desired course of the craft, with respect to the compass, that might be due to lateral inequality of weight of the passengers or their luggage with respect to the vertical plane including the longitudinal axis of the fuselage.

Obviously in FIG. 20 alternatively there might have been shown a steering lever 21, such as that indicated in FIGS. 5 and 29, attached rigidly to the lower face of reinforcing cylindrical coupling sleeve 20 and disposed somewhat perpendicular to the axis thereof coinciding with the axis of tubular housing 7 through tubular bracket 8, whose front tip is somewhat rigidly mounted in an upright lateral wall 51' shown as dividing integrally attached conical rear extension 51" from cylindrical fuselage 51 perpendicular to the axis of fuselage tubular bracket 8. Such a downwardly disposed lever 21, normally having its longitudinal axis substantially in the plane including the axis of drive shaft housings 24 and 7 in tubular bracket 8, could have had its lower tip suitably attached to the two rear tips of cables 21' projecting up from the rear margin of floor 1' after passing around their respective pulleys widely spaced from each other thereat, so that the pilot could control the oscillation of housing 7 in bracket 8 by means of his lever 21 shown in FIG. 41 at the front tip cabin, although it would be necessary, in that alternative instance not shown diagrammatically, to cross cables 21' beneath floor 1' to attach their respective forward tips around the opposite right and left pulleys 21" shown in that FIG. 41, in order that the pilot would move the free tip of his vertically disposed lever 21 pivotally mounted at the floor of the cabin in the direction toward which he desired the aircraft nose to move as a result of his lateral swinging, by means of said lever 21 attached to the forward tips of cables 21', of tubular housing 3 and its enclosing shaft 2 mounting blades 6 of the tail rotor P. Or alternatively, as is well known in the art, it would be possible to install two opposed horizontally disposed cylinders adjacent the floor 1' and its line of juncture with conical rear extension 51' of fuselage 51, shown in FIG. 20, whose respective pistons would have their shafts suitably attached to the alternative lever 21 rigidly attached to sleeve ring 20 at the front tip of tubular housing 7, so that the pilot could operate a suitable valve in his cabin to control flow of pressure fluid from the reservoir R-1 of FIG. 10-B to actuate said opposed pistons and thereby move the lower tip of alternative lever 21 laterally to oscillate steering drive shaft housing 7 through rigidly mounted tubular bracket 8, for such pressure fluid actuated pistons would move quickly to swing tubular housing 3 of drive shaft 2 of the auxiliary tail rotor P through more than 90° just as would the pilot's manually operable lever 21 shown in FIG. 29, and would be adapted particularly to a very large craft having a rather large auxiliary rotor P.

Either of the foregoing alternative arrangements for oscillating the downwardly disposed lever 21 attached rigidly to sleeve ring 20 at the front tip of tubular housing 7 in FIG. 20 would not conflict with the engine mounted in space E beneath the rear gear box 25 inside fuselage 51, because it is presumed that said engine would be of the more conventional and versatile type having multiple cylinders in which its pistons reciprocate, such as is well known to all operators of automobiles and fixed wing aircraft, who would have no trouble in starting them and operating them intermittently at varying speeds. But such a downwardly disposed lever 21 has not been shown in FIG. 20 to indicate that a gas turbine engine provided with suitable speed reducing gears may be installed below the drive shaft enclosing tubular housing 24.1 with its tailpipes conducting its hot exhaust gases rearward through a suitable tailpipe to be installed alternatively through the walls of the lower tip of conical rear fuselage extension 51' and well below the swinging orbital paths of blades 6 of auxiliary control rotor P.

Likewise, as indicated in FIGS. 1 and 3, it is possible alternatively to attach rigidly to a cylindrical tubular ring 20.1, which snugly telescopes and is rigidly attached to tubular housing 7, by means of suitable stud bolt setscrews as indicated in FIG. 31, a pair of diametrically opposed prong levers 21.2 of suitable length, which will perform the same function of the two-pronged lever 21 shown in FIG. 28 as rigidly attached to sleeve ring 20 at the front tip of tubular housing 7 in FIGS. 20 and 29, when in FIGS. 1 and 3 there are alternatively attached to the outer tips of the two alternatively installed diametrically opposed prong levers 21.2 corresponding rear tips of small cables 21' such as shown in FIGS. 28 and 20 for alternate tension by the pilot in a suitable seat in fuselage 1, suitable coiled tension springs being inserted in the respective cables 21' to absorb variations of length required by the two horizontally disposed prong levers 21.2 in their pivotal oscillation around the axis of tubular housing 7 in tubular bracket 8. But any such alternative more complicated means of oscillating tubular housing 7, extending far to the rear of fuselage 1 through longitudinally disposed tubular bracket 8, protruding through the wall of fuselage 1 and considerably to the rear thereof in FIGS. 1 and 3, is not deemed most suitable for more than one reason. All appurtenances of such means of oscillating tubular housing 7 that have to extend through the wall of fuselage 1 outside of tubular bracket 8 necessarily cause complications as to range of oscillation that is permissible and otherwise. All such appurtenances that are installed outside of fuselage 1 are subject to damage by vandals as well as by objects such as small trees with which they may come in contact in case of a forced landing for any reason. And, secondly, cables 21' emerging from the rear hemispherical wall of fuselage 1 adjacent the floor thereof for attachment of their rear upper tips to normally horizontally disposed levers 21.2 might be grabbed by and come in conflict with any person who might be rescued by the aircraft from the surface of a body of water on a net litter such as alternatively can be mounted on the rear tips of landing frame members 11', and who might thereafter desire to enter said hemispherical rear tip of the fuselage 1 through a suitable doorway, not shown, to be installed alternatively in said rear tip wall with a a corresponding transparent door, through which the pilot might observe the person or floating object to be removed from the water surface, if the pilot were seated immediately rearward of the lever 21 shown attached to the lower wall of ring sleeve 20 inside the fuselage 1 in FIGS. 5 and 29.

It is contemplated, however, that in most instances recovery of objects from such water surface by the aircraft will be by use of an alternatively quickly installed framework beneath the hemispherical front wall-tip of fuselage 1 as indicated in FIG. 1, where it is indicated that the parallel longitudinally disposed tubular landing frame members 11', spaced somewhat below that fuselage as indicated in FIG. 3, have attached to their respective front tips the rear tips of a pair of tubular framework members that diverge outwardly from each other symmetrically at suitable angles before projecting forward parallel to each other adjacent their forward tips, in which are mounted pins attached to the lower tips of upright bracing and supporting tubular frame members 11.4, whose upper and inner tips are bolted to the hemispherical front end wall of fuselage 1 at the interior framework thereof surrounding the opening in said end wall, to which are bolted the hinges of doors 1'' extending almost from top to bottom of the generally cylindrical fuselage 1 and closing said opening of sufficient height that a man may walk therethrough even with this family-size aircraft. A normally horizontally disposed cross frame member 9 is rigidly attached to and in turn holds rigidly together the two tubular frame segments 9' diagonally diverging from the front tips of parallel tubular landing frame members 11' spaced below fuselage 1. But note in detail FIG. 40 as well as in FIG. 3 that diagonally diverging framework segments 9' have rigidly mounted in their respective rear tips short splicing rods, indicated by broken lines, whose rear halves are slidably inserted in the parallel landing framework tubular members 11', so that, when alternatively the front landing framework segment composed of members 9, 9', 9'', in whose front tips are mounted the lower tips of upright bracing members 11.4, is linked to fuselage 1 by bolting the upper tips of those bracing members 11.4 to the interior framework thereof, that forward projecting framework is rigidly mounted on the front tips of the two parallel longitudinally disposed landing framework members 11' for rescue operations such as recovering persons from the surface of a body of water by means of a suitable net litter, not shown, to be mounted alternatively on top of the forward projecting framework just described. Note in FIG. 3 that alternatively upright bracing frame members 11.4 may have their upper tips attached to the sides of fuselage 1 at the level of the hinges of doors 1'' in the hemispherical front tip wall of the fuselage but rearward thereof at the upright inverted U-shaped tubular frame members 11, whose lower tips are attached to parallel landing frame members 11', so that the detachable front framework extensions, to which the lower tips of bracing frames 11.4 are attached, serve as stiff diagonally disposed braces between fuselage 1 and the landing framework in case the craft might try to tilt forward on the parallel upturned front tips 9'' of the front landing framework segment, when the craft would land later after the rescue operation.

The doors 1'', shown in FIG. 1 as having vertical pivots in their hinges attached to the hemispherical front end wall of fuselage 1, alternatively may have their hinges, with horizontal pivot pins, attached to the upper tip of a single door, replacing the double doors shown in that figure, and to the roof of fuselage 1 adjacent the interior inverted U-shaped tubular frame 11. Likewise such a single door generally corresponding to a combination of the two paired doors 1'' shown in FIG. 1 alternatively may have its pair of hinges attached to its lower horizontal tip with the opposing strap halves of those hinges mounted in the front hemispherical tip wall of the fuselage slightly above the floor thereof, so that the single larger door, extending upward toward the roof as desired for easy admission of passengers through the doorway opening, would hinge outward and downward with its forward outward swinging margins to be checked at the approximate level of the landing frame members 11' shown in FIG. 3 by a pair of small chains, one end of each of which respectively would be attached to the door opening framework at about the level of the vertical pivot hinges shown in that figure, and the other end of which would be attached to the framework of the door, formed largely of transparent plastic material, itself at the outer edges thereof at points adjacent the forward extending upper tip, when opened outwardly. Such a single large door, hingeably mounted at its lower tip adjacent the floor of the fuselage 1 and having its front outwardly opening upper tip supported in the opened position by the small chains attached to its side margins intermediate the upper and lower tips thereof in the closed position, could have its outward swing checked on opening in flight by an attendant in the front tip of fuselage 1 holding the midpoints of those chains together in his hands; but, if no one were in the fuselage other than the pilot, he could simply make the craft descend until the front tip of the fuselage 1 was immediately adjacent to the water surface and then let the door splash down on the surface of the water by employing a small chain to release a suitable restraining latch at the upper margin of the door opening in the hemispherical end wall, in which event the outwardly opened door also can be supported by the tubular landing frame cross member 9 as well as by the aforementioned chains, each of which may have a coiled spring having suitable tips inserted therein as a resiliently flexible portion thereof intermediate its tips.

Regardless of the way in which the large door or doors in the large opening in the front end wall may be mounted, it is notable that such a large doorway affords easy access to fuselage 1 for a person rescued from the water or for wounded persons to be carried into the fuselage on stretchers, which then can be stowed longitudinally of the fuselage on each side of upright tubular housing 31, immediately rearward of which is the steering lever 21, whose upper tip in FIG. 5 is shown attached to the forward tip of tubular housing 7 completely out of the way of persons persons being brought into the fuselage of the rather small craft through its front doors 1''. The foregoing alternative construction arrangements of a suitable framework mounted beneath and in front of a doorway through the front hemispherical end wall of the generally cylindrical and horizontally disposed fuselage 1 are described in some detail in order to emphasize the advantages of my pivotally mounted tail rotor assembly P, having blades 6 of collectively variable and reversible pitch in quick response at the pilot's election to his forward and rearward movement of his adjusting valve lever 79 relative to its quadrant 81, in effecting recovery of bodies from the surface of water, because that rotor assembly P, which normally has some lift with great leverage at the rear tip of its tubular housing 7 sufficiently far to the rear of the fuselage 1, but which on reversal of the pitch of blades 6 utilizes that same adequate leverage of housing 7 and its pivotally mounting fixed tubular bracket 8 to tilt fuselage 1 on its lateral horizontal axis beneath lateral tubular housings 19 supported respectively by the paired side-by-side mounted, and gyroscopically serving, rotors S and S' as a fulcrum, whereby the pilot quite easily and gently can lift from the water surface a weight of considerable magnitude dipped from the water by a net litter and suspended on said framework below and in front of said doorway opening, until that body may be dragged or assisted through said opening in flight or alternatively transported at least partially outside the fuselage 1 to a suitable landing spot nearby. If there are more passengers in the aircraft than the pilot, presumed to be seated immediately rearward of vertical drive shaft housing 31, and his attendant in the forward half of fuselage 1 for assisting in recovery of a person from the water by way of the doorway in the front tip thereof, the other passengers, or an equivalent cargo weight, if no passengers are present, may be seated in the rear half of the fuselage in order to counterbalance on said lateral horizontal axis of the aircraft the weight of the forwardly opened doors, or alternatively one door otherwise mounted, the alternatively attached forward landing gear extension framework, and at least the weight of one body to be recovered from the water.

In order to minimize weight of the landing gear framework forward of the diagonally disposed truss members 69, shown in FIGS. 3 and 4, whereby the parallel landing gear members 11' and the fuselage 1 supported thereon by inverted U-shaped tubular frames 11 are sustained primarily by the blades 50 of the side-by-side rotor hubs S and S', there was omitted from FIG. 3 an optional easily attachable and detachable alternative, an alternative small truck illustrated in FIG. 40 and having two small wheels 11.60 with pneumatic tires 11.60', whose hingeable mounting framework is pivotally attached by easily removable means to the midsection of a tubular lateral horizontal cross frame member 9.1 rigidly attached at each end thereof to the two parallel longitudinally disposed landing framework members 11' adjacent the two points at which the lower tips of the front inverted U-shaped tubular fuselage frame 11 is joined to those landing frame members 11'. FIG. 40 indicates that around the midsection of tubular cross frame member 9.1, which is provided with suitable centering lugs, there is formed a generally U-shaped strap 11.10, whose downward and rearward projecting tips are joined by nuts screwed on at least one tip-threaded bolt 11.20, which extends through holes in a tubular hinging tongue member 11.30, in whose rear tip there is inserted and keyed, by a similar tip-threaded bolt 11.20, a cylindrical forward projecting tip of an axle mounting block 11.50, through whose forward half adjacent the rear tip of tubular tongue member 11.30 there is inserted a laterally and horizontally disposed cylindrical axle 11.40, on whose outer tips are mounted suitable antifriction bearings mounting hubs of the two wheels 11.60. Through a vertical hole in the midsection of the axle mounting block 11.50 between the hubs of the two wheels 11.60 there is loosely mounted the lower smaller diameter segment of a somewhat vertically disposed cylindrical guiding and sustaining rod 11.70, on whose lower threaded tip there are screwed two locked nuts below the hole in the axle mounting block 11.50, and whose upper integral segment of greater diameter has a head on its upper tip of sufficient size to prevent its passage downward through a hole in the lower wall of the fuselage, although the hole is large enough to permit easy slippage therethrough of the larger cylindrical section of said sustaining rod 11.70. Immediately below the lower wall of the fuselage and around said hole therein is installed the annular horizontal flange of a cylindrical tubular guiding bracket 11.90, whose inner diameter loosely fits around the larger segment of sustaining rod 11.70, and whose outer diameter loosely fits inside a coiled compression spring 11.80, whose upper tip fits against the horizontal annular flange of the cylindrical tubular guiding bracket 11.90, and whose lower tip fits around a small annular guide integrally attached to the upper surface of axle mounting block 11.50 around the vertical hole therethrough. Coiled compression spring 11.80 has sufficient resilient strength to sustain a major part of the weight of the front half of the fuselage 1 and its cargo on landing, when the lower segment of rod 11.70 will be pushed downward through its loosely fitting hole in block 11.50, until the shoulder of the larger integral segment of the rod reaches the smaller annular guide around the vertical hole in said block; and simultaneously the upper segment of larger diameter will retreat upward through the cylindrical guide 11.90 and the hole in the lower wall of the fuselage around which that guide is mounted. In spite of the considerable resilient strength of coiled compression spring 11.80 it is contemplated that on landing with a full cargo load that spring will be substantially fully compressed, so that the landing frames 11', between which the small wheeled truck is mounted, will almost reach the ground, on which scotching blocks later can be placed under landing frames 11' to sustain and keep level the parked craft in high winds.

Note in FIG. 40 that upward movement of the head of sustaining rod 11.70 is limited by the floor 1.0 of the fuselage 1, and alternatively by floor of longer fuselage 51, a short distance above the lower wall of the generally cylindrical fuselage, under which the flange of cylindrical guiding member 11.90 is mounted, so that the landing frames 11' never would quite come down to the ground, when the pneumatic tired landing wheels 11.60 of the hingeably mounted truck are pivotally mounted on the tubular cross frame member 9.1 of the landing framework as contemplated. Therefore, when the craft is loaded too heavily for the blades of the several rotors to lift the craft vertically under full engine power, it is possible for the craft to take off with such a large load of fuel, that soon will be diminished, before any contemplated. Therefore, when the craft is loaded too heavily for the blades of the several rotors to lift the craft vertically under full engine power, it is possible for the craft to take off with such a large load of fuel, that soon will be diminished, before any contemplated necessity for landing, for a long range flight by taking a running start with part of the load, particularly the front part of the aircraft, sustained by the coiled compression spring 11.8 resting on axle mounting block 11.50, thereby permitting widely spaced rotors S and S' to come in contact with a much larger mass of air to give them more effective lift by virtue of their decreased disc-loading. But, when the craft starts to land with the truck wheels 11.60 and tires 11.60' in place and hinged downward, the pilot can use his hydraulic valve control lever 79 to reverse the collective pitch of his normally lifting blades 6 to tilt mounting shafts 12 of the rotors S and S' rearward at the top and give maximum effect to the rotational momentum of those main sustaining rotors, thereby bringing gently to the landing pad the rear tips of longitudinally disposed landing frames 11', both of which are somewhat rearward of fuselage 1, which then will rock forward on the ground to bring the fuselage gently to rest on the widely spaced rear tips of those two landing frame members and on the shock absorbing pneumatic tires 11.60' of wheels 11.60 and on resiliently flexible coiled compression spring 11.80.

Obviously the small two-wheel truck indicated by vertical cross sectional FIG. 40 alternatively may be supplanted, for such purposes as in conjunction with paired longitudinally disposed somewhat cylindrical pontoons to be pivotally attached to the parallel landing frame members 11' for swinging such pontoons beneath the fuselage in flight and then swinging them outward beneath diagonally disposed truss members 69 as lateral stabilizing means on alighting of the craft on water for any purpose or reason, by a single larger wheel hingeable on tubular cross frame member 9.1 by means of two such tongue members 11.30 pivotally attached thereto at each side of the single larger wheel 11.60 with the horizontal member 11.50 joining the rear tips of said tongue members 11.30 rigidly together to form a sort of U-shaped frame, on whose rear segment 11.50 the coiled compression spring 11.80 would rest just as in FIG. 40. But the arrangement with two wheels shown in FIG. 40 is easier to show diagrammatically, and its paired wheels 11.60 also lend slight lateral stability to the craft on land. Note that the coiled compression spring 11.80 interposed between the lower wall of the fuselage 1 and the axle mounting horizontal member 11.50 will serve as a shock absorbing resilient third point of the landing framework, formed primarily by longitudinally disposed parallel tubular landing frames 11', whose rear tips will rest on the ground at the respective points of their slight upturning, when the craft comes to rest, even when the wheels 11.60 are removed from their horizontal axle 11.40, or when that axle 11.40 itself might be removed from the landing axle block 11.50.

But, regardless of whether proper location of the center of gravity of the craft in flight for special purposes is achieved by suitable disposition within fuselage 1 of the passengers and cargo with respect to the respective vertical planes including the longitudinal axis of the fuselage 1 and the axis of lateral housings 19 suspended beneath the main sustaining side-by-side mounted rotors S and S', or whether relocation of the center of gravity of the craft is achieved alternatively on special occasions by removal of the wheels 11.60 and their shaft 11.40 from the axle mounting truck member 11.50 or even by complete removal of the clamping somewhat U-shaped strap device 11.10 pivotally attaching tongue member 11.30 to tubular landing frame cross member 9.1 on special occasions, as indicated in FIG. 3, it is obvious from FIGS. 1 and 3 that my novel aircraft is adapted for safety of the pilot and passengers at all times and particularly for safety in making rescue of the bodies of persons, living or dead, from the surface of water bodies for transport either within fuselage 1 or on a suitable detachable framework below and in front of the forward hemispherical walltip thereof having a suitable largely transparent door therein. By virtue of the resiliently flexible hubs, each having three blade roots mounted therein as shown in FIGS. 10, 11, 12, of the paired main sustaining rotors S and S' mounted side-by-side on the fuselage 1, the lateral stability of the aircraft is preserved by the gyroscopic action of those rotors imparted without vibration by their resiliently flexible annular members 128 and 129 to shafts 12 turning in opposite directions, so that the torque of the engine on those mounting shafts 12 is equalized regardless of variations of the power of the engine applied to them by their rotationally interconnected shafts 18 at any time. Thus a pilot effecting rescue of a body from the surface of water on the small front segment of the landing gear framework below the front tip of the fuselage, and in the gap between the forward orbits of blades 50 of the two main sustaining rotors, which cannot come in contact with said body to be recovered, even when the craft may be tilted forward a great deal, if that were necessary, would have to pay no attention to rotation of the craft around its vertical axis by virtue of variations of engine power and speed of rotation, as would be the necessity with a helicopter, which would have a single main sustaining rotor with long blades on which the engine torque would have to be countered by a somewhat horizontally disposed small auxiliary tail rotor, or with an aircraft having rotors of different orbital diameters but mounted in tandem, regardless of the disposition with respect to the horizon of their orbital paths, one of which very easily might come in contact with the body being rescued from the water. And, since my side-by-side mounted rotors have orbital paths of exactly the same diameter, although spaced laterally considerably, it follows that any vertical force applied for movement vertically of the tail rotor assembly P, pivotally mounted on the rear tip of tubular drive shaft housing 7, to which gear box 4 is rigidly attached, in tubular bracket 8 protruding rearward longitudinally from the wall of fuselage 1 in a fixed framework 8', 8", will exert exactly equal lateral precessional tendency of the main sustaining rotors S and S' on said fuselage 1, so that the pilot still will have to pay no attention to lateral slippage of the craft in the air as a result of his variation and reversal of the collective pitch of blades 6 of the fuselage tilt-control rotor in response to his movements of his fuselage inclination adjusting lever 79 to effect lifting of a body from the water on top of the forward extension of the landing gear framework of suitable nature such as shown in FIG. 1 and described in connection with the doors 1" in the hemispherical front end wall-tip of fuselage 1. And, contrary to the applicable laws of physics and mechanics in the case of a helicopter having a large main sustaining rotor mounted over the fuselage near its center of gravity with a smaller countertorque rotor mounted on the tail of that fuselage with its shaft either horizontally disposed or at some angle between the horizon and vertical posture, neither does a pilot of my craft have to pay attention to other factors besides the required engine speed to determine whether the craft will descend, hover, or move vertically, if it becomes necessary for him to steer the craft to one side or the other from its straight forward position in moving toward the object to be recovered from the water, for he has only to move the free end of his steering lever 21, whether that lever be pivoted at the bottom or top thereof, in the direction toward which he wishes his craft to move laterally, in order to oscillate tubular drive shaft housing 7, pivotally mounted through rearward projecting tubular bracket 8, thereby swinging laterally with respect to fuselage 1 the blades 6 of rotor P mounted on the lower tip of shaft 2, whose axis normally for straight line forward flight is substantially in the vertical plane including the axis of long tubular housing 7 in tubular bracket 8 longitudinally disposed fixedly in the fuselage. Thus, when the pilot of my craft increases the torque of his engine E on shaft 30, and thereby automatically slightly increases the angle of attack of each of the blades 50 of his main sustaining rotors S and S' having means of accomplishing such collective blade adjustment in addition to the cyclical variations of pitch thereof as shown in FIGS. 10, 11, 12, the pilot simply can increase the power of his engine E in exerting torque on drive shaft 30 by any amount to lift the additional weight of the body to be recovered from the water, without having to take into account the fact that any variation in the torque of the engine on the mounting shaft of a main sustaining rotor of a helicopter having a countertorque tail rotor automatically would send such a craft spinning around its vertical axis, unless the pilot could think and act to vary the thrust horizontally of his countertorque tail rotor commensurately. In my craft any angular displacement of rotor mounting shaft 2, with respect to the vertical plane including the axis of housing 7 in its tubular bracket 8, rotating in suitable bearings 35,35' in upright tubular housing 3 rigidly attached to the lower side of gearbox 4 in turn rigidly attached to the rear tip of said tubular housing 7 will require only very slightly increased power to develop increased thrust of blades 6 to provide a horizontal vector force for rotating the craft around its vertical axis in addition to the determined amount of lift of the tail rotor P necessary to maintain the desired longitudinal disposition of the fuselage and its attached landing gear framework with respect to the horizon and the water level beneath the craft; and the pilot will not have to pay any attention to that increase of engine power, which is also infinitesimally small in comparison with the power of the engine required to sustain the craft by means of blades 50 of the side-by-side mounted rotors S and S', because the tilt-sensitive mechanism 76, having mounted therein the cylindrical valve 74 rotationally stabilized by means of long lever 83, to the lower tip of which, with considerable leverage, is rigidly attached means 84 tending to keep that lever 83 vertical under all circumstances, will so regulate circulation of fluid under pressure through the flexible hoses 91–63 and thereby adjust collective pitch of blades 6 of the auxiliary fuselage tilt and steering rotor P that any longitudinal tilt of the fuselage 1 with respect to the horizon, as elected by the pilot in adjusting his longitudinal tilt-control lever 79 relative to its quadrant 81, will be maintained, regardless of the increased load, of reasonable weight, that may be picked up from the water on the landing gear framework, whether that load be mounted on the front or rear tips of that framework. The tilt-sensitive valve 74 will so regulate circulating flow of fluid under pressure to the respective inner compartments 61 in each end of axially reciprocable cylinder 58 of tail rotor P that blades 6 will have necessary variations of pitch collectively to compensate for any diversion of axial thrust thereof from vertical to horizontal force, whether at the moment rotor P be exerting some lift or be pulling downward on gear box 4 attached to the rear tip of tubular housing 7, to keep the longitudinal axis of fuselage 1 disposed at the chosen level of the pilot at any moment with respect to the horizon, regardless of the small variations of lateral swinging of shaft 2 to steer the craft from side to side, which of course will vary the vertical force of blades 6 to some extent. The mere oscillation of tubular housing 7 through tubular bracket 8 has no effect whatever on the collective pitch adjustment of blades 6 of tail rotor P mounted thereon, but at the same time tilt-sensitive valve 74 will cause such flow of circulating pressure fluid therethrough that any variations of vertical force exerted by blades 6, turning always at almost constant speed on shaft 2 rotationally interconnected with shafts 12, will be compensated, whether that variation at any moment may be due to the pilot's oscillation of his steering housing 7 or to the weight of a body being picked up from the water. And note again, as has been explained previously, that, if the pilot moves the free tip of his lever 21 laterally in order to shift his blades 6 in that direction with respect to the normal vertical plane including the axis of long tubular housing 7 pivotally mounted through tubular bracket 8, whether or not that vertical plane may exactly coincide with the vertical plane containing the axis of drive shaft 5 in tubular housing 7 or with the vertical plane containing the longitudinal axis of generally cylindrical fuselage 1 or 51, in order that the downward thrust of air of normally lifting blades 6 may in the angularly disposed posture move the tail of the craft in the opposite direction from that toward which the pilot wishes the nose of the craft to move, he will tend, by his lateral swinging of tail rotor assembly P beneath the rearward extended axis of tubular housing 7 through its bracket 8, augment the tendency of blades 50 of rotors S and S', turning at rapid rotational speed, to preserve the lateral stability of the craft by their gyroscopic tendencies transferred to mounting shafts 12 by resiliently flexible hub members 128, 129 shown in FIGS. 10, 11, 12, for the laterally shifted weight of the tail rotor assembly P below gear box 4 rigidly attached to tubular housing 7 in positions on either side of the vertical plane including the axis of housing 7 in bracket 8 will tend to exert a laterally stabilizing torque of small but significant magnitude on the fuselage around its longitudinal axis, although said longitudinal axis of the fuselage does not coincide with the axis of tubular steering housing 7 through its bracket 8 rigidly mounted through the wall of said fuselage.

There are numerous modifications of construction of the parts shown in the drawings that would not depart significantly from those shown in the drawings that would not depart significantly from those shown diagrammatically therein; but there are other modifications within the intentions of the invention that would require significant changes therein. For instance, there might be bolted to a front face of the forward gear box 25 within fuselage 51 in FIG. 20 a tubular housing 24 inclosing a forwardly extending driven shaft 5 generally corresponding to similar members 24,5 adjacent the rear conical tip 51' of that long cylindrical fuselage 51 in that figure, which does not show the forward tip thereof because of lack of space on the page even in small scale. And around that alternative forwardly disposed tubular housing 24 might be pivotally mounted a tubular housing 7 extending forwardly through a longitudinally and somewhat horizontally disposed tubular bracket 8 protruding rigidly through the front end wall of the fuselage 51 as a means of mounting said driven shaft 5, on whose front tip inside a gear box 4, rigidly attached to said tubular housing 7 in the manner illustrated inversely at the rear tip of fuselage 51 in FIG. 20, would be a bevel gear 27' whose teeth mesh with the teeth of a bevel gear 2' rigidly mounted on the tip of an auxiliary rotor-mounting shaft 2 just as in FIGS. 5 and 6. But such an alternative forwardly projecting tubular housing 7 would have to be inclined downward slightly toward the gear box 4 attached to its front tip, if the shafts 2 and 5 were disposed at right angles to each other, as indicated in FIGS. 5 and 6, in order that the blades 6 of the front pivotally mounted alternative rotor assembly P would not pull rearward to some extent in flight. And moreover the rotor mounting shaft 2 projecting through its tubular housing 3 would have to be disposed upwardly from the gear box 4 attached to the forward tip of the proposed housing 7 in order that pivotal oscillation of said housing 7 through its corresponding tubular bracket 8 would pull the nose of the craft in the direction in which the pilot desired it to oscillate around the vertical axis of that craft in the steering process. But it is important to note that such a housing 3 mounting its shaft 2 and its blades 6 thereby would not impart lateral stability to the craft by virtue of its weight exerting a torque around the longitudinal axis of the fuselage, as does the rear tail rotor assembly P mounted below the axis of its housing 7 in tubular bracket 8, as just explained and in connection with FIGS. 5 and 6, as a supplement to the lateral stabilizing tendency of the rotors S and S' acting as gyroscopes, because the weight of the upwardly extending housing 3, shaft 2, etc. above alternative gear box 4 would be shifted in the exactly wrong direction with respect to the vertical plane including the respective tubular housing 7 of drive shaft 5 extending through its tubular bracket 8. Moreover, if a rotor mounting shaft 2 mounted through a tubular housing 3 were hung downwardly from a gear box 4 rigidly attached to a tubular housing 7 in a bracket 8 sloping downward slightly toward its forward tip, somewhat like the inversely rearward projecting corresponding parts of FIG. 3, the blades 6 might come in conflict with a person being rescued from the water on a forward projection of the landing frame members 11' of FIG. 20, as illustrated in FIG. 40, even if cables 21' were crossed to make the rotor blades 6 swing laterally in the desired direction for rotating the craft around its vertical axis in response to the pilot's movement of the free end of his steering lever 21 pivotally mounted at the floor 1' of his compartment at the front of the fuselage 51 or floor 1.0 of shorter fuselage 1 shown in FIGS. 1, 3, and 4, where incidentally he would be in the way of stretchers being brought into the fuselage front doors 1". So none of these alternatives is the equivalent of the mounting of the tail rotor assembly P as indicated in FIG. 1, 3, 5, 6, 2, 20, 28, 41.

There are numerous workable modifications that may be made in the circulating pressure fluid conduits leading through the cylindrical rotationally stabilized valve 74 and its telescoping tubular cylindrical valve member 75 mounted on an identical axis through the mounting body, fixed with respect to the fuselage in which it is mounted, of the tilt-sensitive pressure fluid control mechanism 76 for adjusting collective mean pitch of blades 6 of tail rotor P, whether it be pivotally mounted or not in bracket 8, and alternatively for adjusting pitch of blades 50 of one of the side-by-side mounted main sustaining rotors to control lateral tilt of the fuselage, without in any way altering the functions of said valves such as shown in FIGS. 21, 22, 23. Of course slots milled in cylindrical valves 74 and 75 parallel to the rotational axis of the valve will carry more fluid with less pivotal oscillation of the valve member than would be required with round holes bored in the valve 74 to form the diverging and converging conduits. But a fundamental novelty of the pressure fluid circulation valve control mechanism, apart from the fact that the pressure fluid pump inside the fuselage is driven constantly in flight at substantially the same speed by a shaft rotationally interconnected with rotor mounting shafts 12 regardless of the torque on drive shaft 30 by the engine E, is that, while the pilot may determine any desired tilt of the fuselage with respect to the horizon simply by adjusting his lever 79 with respect to its fixed quadrant 81 to rotate outer tubular valve member 75 with respect to that fuselage, the final determination of the tilt of the fuselage with respect to the horizon, according to whether the axis of valves 74 and 75 is disposed in its body 76' parallel to the longitudinal axis of the fuselage or perpendicular to a vertical plane containing that axis, is made by the inner valve 74 rotationally stabilized by means of always vertical lever 83, which is kept in that position by attachment to the lower tip thereof means 84 having considerable weight, which serves as a pendulum in the case of failure of other means keeping lever 83 perpendicular to the horizon.

It long has been known to the art that a gyroscope having a gyro turning very rapidly on its axis perpendicular to the horizon is an effective means tending to keep a shaft vertical with only limited weight of said gyroscope. Such gyroscopes have been used quite effectively to control electric switches whereby the ailerons of fixed wing aircraft are kept adjusted to preserve lateral stability of such aircraft. But, contrary to the possibilities with such fixed wing aircraft, it is not satisfactory with aircraft employing an engine to rotate its sustaining blades 50 by means of rotationally interconnected shafts, in the manner I have shown, to have such a gyro rotated by an air jet, because the air ordinarily passing downward from blades 50 in flight under power of the engine would have its direction with respect to the fuselage reversed almost immediately in case of engine failure causing the craft to descend. Therefore in FIG. 39 it is illustrated diagrammatically that such a gyro is rotated by a pair of small electric motors, rotating in opposite directions around the same vertical axis, installed in the hollow spherical member 84, which will have some considerable weight, including the gyros, to make the lever 83 serve as a pendulum to keep somewhat rotationally stabilized with respect to the horizon the cylindrical valve 74, to which the upper tip of that lever 83 is rigidly attached. The valve control mechanism 76 therefore will operate quite satisfactorily regardless of whether one or both of the small electric motors may be operating at the moment for some reason such as failure of electric current derived from a battery continually charged in flight by a generator driven by the engine, as is well known in the art. And, even if the weight of the pendulum were not adequate to keep lever 83 perpendicular to the horizon under some circumstance, the pilot immediately and even without changing the relative position of his lever 79 relative to quadrant 81, by using that lever's manually operative handgrip release 80 permitting slight pivotal movement of outer valve member 75 relative to the fuselage to which quadrant 81 is in fixed position, can seize the lower tip of pendulum lever 83 instead to rotate it pivotally on the axis of inner valve member 74 to change the position of that valve member 74 relative to fuselage 1 and thereby cause the hydraulic pressure of the fluid from the rotary pump cavity 99 through conduit 85 to alter the mean angles of attack of blades 6 of rotor P to give fuselage 1 any desired longitudinal tilt relative to the horizon immediately with a minimum of effort and forethought, although lever 83 would be moved by him in the opposite direction from that ordinarily used in controlling tilt of the craft by the other lever 79. It is notable that the remainder of the hydraulic control mechanism 76 works just the same whether a gyro may be installed alternatively in stabilizing member 84 or not, except that a simple weight without a gyro inside the hollow sphere 84 would tend to swing forward in event of rapid slowing of the forward movement of the craft in translational flight, in which event the forward swing of sphere 84 at the lower tip of lever 83 simply would emphasize pivotal oscillation of valve member 74 relative to valve member 75 with resultant decrease of the lift of blades 6 of rotor P, thereby only tilting shafts 12 of the side-by-side rotors up and backward slightly from their upright position to make them act as brakes on the forward movement of the craft, just as the pilot otherwise would accomplish by further pulling back on the lower tip of his fuselage tilt adjusting lever 79 at the other side of hydraulic control mechanism 76.

Whether a gyro be installed alternatively in sphere 84 or not, intermediate the tips of lever 83, at a place not causing conflict with body sidewall 76.2, as indicated in FIG. 21, may be installed a pivot pin joint 84', having the axis of its hinge parallel to the longitudinal axis of fuselage 1, so that, if only one motor armature of a vertical axis gyro in stabilizing member 84 be operative, and if the fuselage 1 be caused to tilt laterally around its longitudinal axis for any reason, precession of the single operating gyro due to gravity of the earth will not cause lever 83 to rotate valve member 74 around its axis and thereby alter the longitudinal tilt of the fuselage as a result of change in the flow of hydraulic fluid through the conduits of valve members 74 and 75 to the upper or lower compartments 61 of cylinder 58, whereby blades 6 of rotor P have their angles of attack adjusted in unison. Note, however, in FIG. 22 that the lower segment of hinge-jointed lever 83, which is attached rigidly at its lower tip to tilt-sensitive stabilizing means 84, fits quite snugly although rotatably into the yoke provided by the two arms of the broader upper segment of pendulum lever 83, so that valve member 74 responds directly to any forward or rearward movement of tilt-sensitive member 84 relative to the fuselage in which it is mounted.

In FIG. 39, since the parts of the electric motors EM per se are not my invention, I have designated all the parts by letters of the alphabet instead of by numerals. U is the upper half and L is the lower half of the spherical shell, shown cut away to the vertical axis of the motor shafts, of the substantially spherical member 84, which is rigidly attached to the lower tip of hinge-jointed lever 83 by suitable means. Both the upper and lower halves U and L of said shell are rigidly attached by suitable means to a heavy horizontally disposed round metal plate M, midway of the approximate sphere 84, which divides the sphere into two compartments, in each of which is mounted an electrically rotated small motor EM having a shaft 0, which has its armature A rotating on its axis in vertical alignment with the longitudinal axis of vertical pendulum shaft 83 indicated by vertical broken line 83' below its hinged joint 84'.

Shafts S, which rotate in opposite directions around their identical axis, are mounted in the inner races of ball bearings having outer races B suitably mounted rigidly in the respective upper and lower compartments of the hollow sphere 84. Means of lubricating the upper and lower bearings of the small motors are not shown, because such small sealed ball bearings now on the market require no lubrication; but a plug P in the middle of heavy dividing round metal plate M, having a pair of upper and lower annular shoulders mounting the adjacent inner margins of outer shell members U and L rigidly thereon, indicates an alternative plug in a conduit in said round plate, through which any lubricant alternatively may be inserted and forced into the two central bearings B of shafts S of armatures A, which are identical and therefore turn in opposite directions by virtue of the fact that the lower one is inverted or turned upside down. Rigidly mounted on the shaft S of each armature A adjacent the central bearings B is a gyro G, which has considerable weight or mass and maximum diameter for substantially maximum containment in the spherical shell 84. Obviously more mass and weight could be added to the gyros G simply by making the shell 84 longer from top to bottom. Vanes V are shown rigidly mounted around the periphery of each gyro G as means of forcing air out multiple orifices O in the shell to keep the rotating electric motors EM cool, although the gyros G obviously might be mounted adjacent the ordinary rotary fan of the small electric motor to be bought on the market for installation in the shell 84 as shown. It is desirable that the motors EM be rather high speed, at least 1720 r.p.m., and that they be operated by direct, rather than alternating, current connection with a battery, not shown, that may furnish power in case of failure of the aircraft's engine, although alternating current motors usually are designed to rotate faster than direct current motors. Each of the small electric motors EM shown in FIG. 39 has a commutator C for utilizing such direct current, which is connected to said commutator C of each armature by means of a pair of contact brushes C', each of which is mounted in a suitable holder bracket H and held against the cylindrical commutator connection at an angle thereto by means of a small coil compression spring, not visible, in its tubular holder bracket H, one of which in each motor is connected to one of the two insulated wires W connected to the respective terminal posts of a battery, which is kept charged by the usual generator of electricity used and driven in connection with the engine of the aircraft. For simplicity field coils F of the small electric motors EM in the spherical shell 84 are indicated as being of the ring-wound armature variety for direct current motors, of which the principal components are lead wires W, brush holders H, coiled compression springs inside the tubular cylindrical holders, brushes C', a commutator C, armature winding A, a rotatable shaft S mounting the armature and a fan, which in itself acts as something of a gyro G, and a fiber coil retainer R of the field coils. A cutaway photograph of such a motor is shown on Page 255 of SMALL COMMUTATOR MOTORS by Kennard C. Graham of the Bureau of Trade and Industry of California State Dept. of Education, published by American Technical Society, Chicago, Illinois. Direct current motors of course may have their direction of rotation reverse simply by reversing the connections of wires leading to the battery terminals, but the winding of the two armatures shown in FIG. 39 is reversed anyway by the fact that one of the electric motors EM is turned upside down with respect to the other such motor.

A significant feature of the present invention is the closeness of cooperative complementary action of the various components thereof, each of which has at least almost the minimum number of very simple parts for performance of its particular function in conjunction with the other components. For instance, in FIGS. 18 and 19 instead of employing the outer cylinder 67 rotatable around axially reciprocable but nonrotating cylinder 58, actuated by tilt-sensitive means deriving power therefor from the continually operating pump gears 98,98' at somewhat constant speed, with respect to its cylindrical tubular housing 3 mounting in its bearings 35,35' the rotor mounting shaft 2 as the means of adjusting collective pitch of blades 6 of my pivotally mounted auxiliary fuselage tilt-and-steering control rotor assembly P, I might alternatively have installed a rod through a tubular shaft 2 to adjust manually the pitch of those blades 6 by the pilot directly by means of cables, jackscrews having acme threads, or worm gears, etc. well known to the art for that purpose as means of varying mean collective blade pitch of the various auxiliary countertorque helicopter rotors disclosed by U.S. patents to Sikorsky U.S. Pat. No. 2,318,259, Brewster U.S. Pat. No. 2,491,549, Campbell U.S. Pat. No. 2,672,939. But, in addition to requiring the pilot to control manually the collective pitch of his countertorque tail rotor blades, mounted on a shaft whose axis, even if mounted to oscillate pivotally on its somewhat horizontal drive shaft having meshing bevel gears, never can lie in a vertical plane during engine rotation the the main sustaining rotor of the helicopter requiring some counterrotational force, such a means of collective adjustment of the pitch of the blades of such an auxiliary tail rotor would not simultaneously keep the longitudinal axes of those blades 6 substantially in a plane perpendicular to the axis of my shaft 2 as do my push-pull rods 49 rigidly attached to my outer adjusting cylinder 67, which incidentally will work just the same with three or more blades, by way of contrast with the adjusting means of others somewhat similar, not to mention that inserting such a blade-pitch control rod through such an alternative tubular rotor-mouting shaft 2 would bring on more complications of construction and maintenance in lieu of the very simple yoke 39,40 having a pivot pin 41 perpendicular to said rotor-mounting shaft 2 on which to mount pivotally, within limits, the simple hub 42, on whose diametrically opposed projections 42' the blades 6 are pivotally mounted in cantilever manner for variation and reversal of their pitch, cyclically and individually as well as collectively. And in connection with the foregoing characteristics of my tail rotor P, which is described in more detail and claimed in my copending application Ser. No. 688,318, it again is to be noted that my push-pull linkage rods 49 in the process of keeping their respective stud bolt pivots 46, to which they are attached by suitable loops therein adjacent the leading edges of blades 6 respectively, in the same plane by direct force also tend to adjust the pitch respectively of those blades 6 cyclically to keep them perpendicular to shaft 2 by means of adjusting aerodynamic lift thrust instead of having a cantilever mounting of the blades directly on shaft 2 that would cause those blades 6 otherwise to act as an undesirable gyroscope of considerable power at rather high rotational speed necessary to obtain much lift from short blades on a quickly oscillatable rotor for steering the craft, mounted on shaft 2 with additional adverse vibrational effects. And incidentally some of the same complications of construction, maintenance and cost with a tubular rotor-mounting shaft are to be found in each of the two upright collective blade-pitch adjusting "plungers 94" of Smith in his U.S. Pat. No. 2,023,105 showing two main sustaining rotors mounted in tandem in his "Autocopter" requiring no other "countertorque" rotor, because they turn in opposite directions and are contemplated as being of the same size, and having the four blades of each of his two rotors mounted universally, within small limits, on their respective hubs for cyclical flapping, drag oscillation, and pitch change, although Smith's small gyroscope 18 installed in his fuselage as a means of actuating levers adjusting collective pitch of those blades 110 of both of those sustaining rotors is completely unworkable for the simple reason that Smith tried to make such a gyroscope, of necessarily limited mass and weight in an aircraft, actuate directly his very complicated blade adjusting mechanisms instead of employing, as I do, the power derived from the hydraulic pump for that purpose in a very simple and very dependable mechanism shown in FIGS. 21, 22, 23, whether my engine E is operating at full capacity, only partially, or not at all.

But, only because my gear box 4, to which tubular housing 3, mounting downward hanging shaft 2, is rigidly attached, is rigidly attached also to the rear tip of tubular housing 7, instead of being mounted alternatively to oscillate on the rear tip of somewhat horizontally disposed drive shaft 5, as are the above-mentioned "rotatable" and "tiltable" gear boxes 26 of their countertorque tail rotors to oscillate very slowly within very necessarily restricted limits of a few degrees around their respective horizontal drive shafts, it would be possible alternatively for me to install a blade-adjusting plunger rod through a tubular rotor mounting shaft 2, although I would not deem manual operation by the pilot of such a rod for collective adjustment of the blades 6 of tail rotor assembly P to be practical, even though I alternatively might install a pivot on gear box 4 to mount a second push-pull rod parallel to tubular housing 7 for actuation of the first said plunger rod through the contemplated tubular rotor-mounting shaft 2, because my employment of such a long tubular housing 7, shown in FIGS. 1 and 3, pivotally mounted through the long rigidly mounted tubular bracket 8 would permit a correspondingly long alternative parallel push-pull blade pitch adjusting rod to oscillate rotationally with the tubular housing 7 at its rear tip, suitably attached to a bell crank operating the aforesaid internal bladeadjusting plunger rod, while the front portion of the somewhat horizontal push-pull rod extending through a suitable hole in the fuselage adjacent the tubular bracket 8 necessarily could not oscillate, in its fuselage wall hole of reasonable size, with the rear portion of tubular housing 7 pivotally mounted through fixed tubular bracket 8. But the foregoing alternative constructions are mentioned only to show that such an installation of complex nature would be possible only because my gear box 4 is rigidly attached to the rear tip of tubular housing 7 far to the rear of tubular bracket 8, which in turn protrudes rearward a considerable distance from its protrusion through the wall of fuselage 1 as shown in FIGS. 1, 3, 5.

But, if I were alternatively to employ such a bell crank and somewhat horizontally disposed push-pull rod to reciprocate an upright blade adjusting plunger rod through such an alternative tubular rotor running mounting shaft 2, I also could install alternatively a cylinder parallel to the tubular bracket 8, either inside or outside or alternatively through the fuselage all, or alternatively attached rigidly to tubular housing 7 rearward of that bracket 8, for installation in said cylinder of a piston, inversely corresponding to my reciprocable cylinder 58 mounted on tubular housing 3 of shaft 2, to reciprocate said push-pull rod in response to the tilt-sensitive hydraulic control system, which in lieu of that shown in my FIGS. 21, 22, 23 alternatively could consist of an electric solenoid reciprocating a cylindrical valve, such as is well known in the art of hydraulics, and such as is illustrated diagrammatically in FIG. 6 of U.S. Pat. No. 2,377,386 to Stalker showing in the fixed wings of an aircraft a proposed but unworkable means of adjusting pitch of tractor propeller blades and employing a cylinder mounted on the rotatable shaft mounting those blades, having annular grooves corresponding to respective conduits leading from the sidewalls of the cylinder in which said valve is reciprocable. And, in lieu of my very simple but very efficient and reliable pivotally mounted tilt-sensitive means whereby my inner valve 74 is rotationally stabilized with respect to the horizon as illustrated diagrammatically in FIGS. 21, 22, 23, and 39, I also alternatively might employ, to reverse the electric current from a battery through the aforesaid solenoid to control such an alternative axially reciprocable pressure fluid valve in said alternative cylinder connected to said pressure fluid conduits, an attitude gyro, such as is well known in the art, and such as is indicated diagrammatically in FIG. 1 of U.S. Pat. No. 2,479,549 to Ayres et al. to control said flow of current through said solenoid for control of said valve's reciprocation in its cylinder axially by tilt-sensitive means.

But all such exceedingly complicated alternatives in the past have been found impractical in their application and are not required for my aircraft having paired side-by-side mounted main sustaining rotors with resiliently flexible hubs as shown in FIGS. 10, 11, and 12. The "attitude gyro " shown in FIG. 1 of the Ayres patent controls flow of electric current from a "a suitable source 181 of alternating current potential" to an electric motor, whose horizontally disposed drive shaft adjacent the mounting shaft of the sustaining rotor of the helicopter, has mounted on the tip thereof a bevel gear having teeth meshing with those of a bevel gear mounted on a vertical shaft, parallel to the main rotor-mounting shaft, whereby is operated a mechanism controlling tilt on one horizontal axis of a "wobble plate" whereby the blades 22 of that sustaining rotor are supposed to have their pitch cyclically and individually adjusted to cause their variation of their orbital lift to tilt said rotor blades relative to the fuselage and its vertical mounting shaft to cause forward and rearward movement of the helicopter having its center of gravity substantially below said mounting shaft and having a small auxiliary countertorque rotor in turn controlled by a "directional gyro" as to its collective blade pitch. But an impracticality, apart from other complications and unreliable features, of the Ayers helicopter having such an "attitude gyro" as a means to tilt the rotational path of individually flapping blades 22 of the sustaining rotor relative to the fuselage is that, in case of an electrical malfunction in the system for any of many varied reasons, the pilot would have no means of operating the "wobble plate" to control even the cyclical pitch of the sustaining rotor of the helicopter dependent on that rotor, because the teeth of the bevel gear mounted on the drive shaft of the "dead" electric motor would prevent his operation manually of the vertical shaft whereby the "wobble plate" is operated in a rather complicated arrangement, although such "swash plates" are well known to the art with some success. And electrical current switches, amplifiers, etc. are simply too complicated for understanding and adjustment by the general public and the arm services, even though Ayers has indicated diagrammatically that he has two knobs 17, 18 whereby he can turn respective worm gears to adjust his electrical contacts relative to "a rotor 151, mounted in a gimbal 152 for movement about two axes." As a result the patents of Ayers et al. and of Stalker are valuable only as illustrating the things that I have avoided any necessity for doing in my very simple but very reliable invention having a very long life with minimum maintenance costs after low initial cost of manufacture to carry more people on less fuel for greater distances without any need for previous training of a pilot, who need never have been off the ground previously, if he has been a sensible operator of an automobile.

As for more minor alternative constructions of my invention, although it has been specified that the vertically bisected cylindrical mounting sleeves 72 are somewhat rigidly attached to respective upper half segments of the upright tubular housings 13 of rotor-mounting shafts 12, around which the two bisected halves respectively are clamped by means of multiple nuts on horizontally disposed tip-threaded bolts inserted through holes in the vertical flanges of the cylindrical mounting sleeve segments, it alternatively is possible to insert a slit rubber-fabric hose section around each of the tubular housings 13 and within the respective clamped mounting sleeves 72 to make the somewhat rigid attachment sufficiently yielding to absorb slight vibration of the rotor-mounting shafts 12 by the rotors S and S' mounted thereon, particularly if such rotors alternative have only two blades and as a result are subject to such vibration of the rotating shafts 12 and the tubular housings 13 in which they are mounted in opposed antifriction bearing assemblies, as illustrated. Likewise, while it has been specified that the horizontal lateral tubular housings 19 of drive shafts 18 are somewhat rigidly attached to the respective perforated sidewalls of the fuselage through which those drive shafts 18 are inserted, it is to be understood that annular flexible seals, having corresponding holes, are inserted between the vertically disposed annular flanges of those interior and exterior segments of tubular housings 19 and the correspondingly perforated sidewalls of the fuselage, in order to retain lubricant inside said tubular housings 19 and simultaneously making the mountings of those tubular flanged housings 19 on the fuselage sidewalls very slightly flexible, thereby relieving those sidewalls of vibrational fatigue.

In FIG. 2 it is indicated by the curved arrows above the respective sides of the laterally arched roof of generally cylindrical fuselage 51 that the tips of blades 50 of the front pair of rotors S and S' might travel over at least a portion of that roof just as previously described in connection with blades 50 retreating rearwardly over the roof of fuselage 1 as illustrated by FIG. 1. But it will be appreciated that, if the tubular housing 13 of shafts 12 mounting the front pair of side-by-side sustaining rotors S and S' in FIG. 2 are tilted forward somewhat on tubular housings 19 to make those two forward rotors serve largely as tractor propellers, having low disc-loading ratios by virtue of the length of their blades mounted on hubs designed for cross currents of air, on the long cylindrical fuselage 51, sustained largely by the rear pair of very large main sustaining rotors S.1 and S.1', either under rotation by the engine or automatically as gyrodynes under aerodynamic autorotation in response to tilting of fuselage 51 by the tail rotor P having blades 6, whose pitch is controlled collectively by tilt-sensitive means in response to the pilot's adjustment of his lever 79 with respect to the fixed quadrant 81, the blades 50 of the front pair of rotors S and S' will have to be shortened sufficiently to keep their rotating tips from coming in contact with the fuselage 51, when tubular housings 13 of those rotors S and S' alternatively are tilted forward, as may be done with a suitable novel mounting to be illustrated in adequate detail in another application to be filed by me just as soon as possible. But, when the rotors S and S' are on upright shafts 12 in tubular housings 13 in the posture illustrated in FIGS. 2 and 20 of the present application indicating a posture of the rotors for hovering, whether the forward pair of outrigger frame works alternatively are mounted pivotally on the sides of fuselage 51 or are made rigid as illustrated in FIGS. 2 and 20, the tip speeds of blades 50 of those rotors S and S' will be substantially the same regardless of the length of said blades; and thus in either instance the rotors S and S' will tend to preserve the lateral stability of the craft by virtue of the gyroscopic tendencies of those rotors mounted on somewhat vertical shafts 12, to which those gyroscopic tendencies of blades 50 are transmitted, by the resiliently flexible connections 128, 129 of the rigid outer annular hub members 113, providing cantilever mounting of blade roots 111, with the inner hub members 130, 134, 135 rigidly attached to the upper tips of those shafts 12, without any adverse vibrational accompaniments.

What I claim and desire to secure by Letters Patent is:

1. A rotary wing aircraft employing in continued workable cooperative conjunction the following: a fuselage body member on which is mounted an engine usually turning a sustaining rotor in flight; within said fuselage a drive shaft, rotatably mounted in a tubular housing, continually rotating in flight at somewhat the same speed by virtue of the fact that the drive shaft is rotationally interconnected with a shaft mounting a suitable main sustaining rotor, which goes into aerodynamic autorotation immediately on any very substantial diminution of torque (not just complete failure thereof) by the engine on said rotor-mounting shaft; a suitable pressure fluid pump (continually driven in flight at somewhat constant speed by said drive shaft and provided with means suitably regulating pressure of the fluid delivered by said pump provided with a suitable bypass conduit, in which is installed an overflow valve actuated by a resiliently flexible spring) delivering fluid under somewhat constant pressure through a conduit to the inlet of a tilt-sensitive control valve mechanism consisting of: a body member fixed within the fuselage and having formed within said body a cylindrical cavity, whose rotational axis therein is substantially perpendicular to the vertical plane including the longitudinal axis of said fuselage, and whose two vertical sidewalls have somewhat smaller cylindrical holes on the same axis therethrough respectively serving as substantially fluidtight bearings for the respective opposite cylindrical shanks of two cylindrical valve members pivotally oscillatable on the same axis in said cylindrical cavity, at the upper midpoint of which is the inlet from the aforesaid pressure fluid conduit leading from the pump, and at the bottom of which is an outlet (spaced laterally from said inlet slightly) through the bottom of said body member connected with the intake conduit of the pump body for recirculating said fluid, when such fluid is not flowing under pressure through one of the two outlets from said cavity in its respective front and rear walls of the body member leading through suitable conduits to the respective cavities in the opposed halves of a cylinder, which is reciprocably actuated for variation of the collective pitch of the blades of an auxiliary tail control rotor, when fluid under pressure flows into one of said cylinder compartments from its respective connected conduit after having passed through the two cylindrical valve members consisting of (1) a larger tubular cylindrical valve member, whose exterior snugly fits the cavity of the enclosing body member, and whose interior cylindrical diameter snugly fits the cylindrical exterior of the smaller said cylindrical member telescoped by it, one end of which is closed and has attached thereto integrally the cylindrical shank of that valve member, on the outer tip of which is rigidly attached a lever of suitable length provided with a spring-actuated handgrip whereby the pilot can oscillate said outer tubular valve member around its axis in its enclosing cylindrical cavity in said body member and also can keep said outer valve member disposed rotationally at any suitable posture within said cavity by virtue of elective contact of the spring-actuated handgrip mechanism with a slightly corrugated quadrant rigidly attached to said body member for determining by the pilot whether fluid will flow to one or the other of the alternative compartments of said cylinder regulating collective pitch of the blades of the tail rotor and thereby determining whether the aircraft will move forward or rearward or hover (or move vertically in response to variation of the engine's torque on its drive shaft having an overrunning clutch) at any time as desired by the pilot by virtue of longitudinal tilt control of the fuselage with respect to the horizon by variations of the amount of thrust of said auxiliary tail rotor, which simultaneously is controlled by flow of the same pressure fluid through the smaller telescoped said cylindrical valve member, whose conduits therethrough work in cooperative conjunction with the conduits through the larger telescoping valve member, and whose disposition therein rotationally is determined by tilt-sensitive means employing a continually vertically disposed lever of quite considerable length, the upper tip of which is rigidly attached to the outer tip of the cylindrical shank of said smaller telescoped cylindrical valve member, and to the lower tip of which is rigidly attached a sphere of quite considerable weight containing a pair of gyros, rotatably mounted on the same axis as that of the vertically disposed lever from which the enclosing hollow sphere hangs as a pendulum, and rotated in flight in opposite directions around their common axis by electric motor armatures mounted on the respective shafts of said gyros (mounted rotatably in suitable antifriction bearings permitting high rotational speeds) in said sphere and connected by suitable insulated electric current transmitting wires with the respectively suitable pole posts of an electric battery, which is charged with electricity at intervals by a generator operating in conjunction with the engine in flight.

2. A rotary wing aircraft employing in continued workable cooperative conjunction the following: a fuselage on which is mounted (through an overrunning clutch as well as one manually operated) an engine usually turning (in powered flight) a drive shaft in rotational connection (through suitable gears) with an upright shaft mounting a main sustaining rotor; a tubular bracket somewhat rigidly mounted on said fuselage, through whose exterior wall said bracket protrudes rearward in longitudinal disposition with respect to said fuselage but at an angle with respect to the longitudinal axis thereof in flight; a tubular housing extending through said tubular bracket, in which said tubular housing is pivotally oscillatable, and having rigidly attached to its rear tip a closed gear box, to which also is rigidly attached a second shorter tubular housing disposed at somewhat right angles to the first said tubular housing disposed longitudinally with respect to the line of forward flight of said fuselage through said tubular bracket; a drive shaft extending through the first said tubular housing, in which said drive shaft, rotationally interconnected with the mounting shaft of the main sustaining rotor by suitable means, is suitably mounted rotatably in antifriction opposed bearing assemblies that prevent movement of the shaft axially with respect to its substantially enclosing tubular housing, beyond the rear tip of which and inside the said gear box there is rigidly mounted on the rear tip of said drive shaft a bevel gear, whose teeth intermesh with the teeth of a second bevel gear rigidly mounted on the upper tip of a second shaft extending through the second shorter tubular housing, provided with suitable opposed antifriction bearing assemblies therein in which said second shaft is rotatable but cannot move axially with respect to the said shorter tubular housing, beyond the lower tip of which there is rigidly mounted on the said second shaft a suitable airfoil-bladed rotor, whose hub is oscillatable within limits on an axis perpendicular to the rotational axis of the mounting shaft but has means tending to keep the orbital path of said blades substantially perpendicular to said rotational axis, which as a result of the weight of said auxiliary rotor, its mounting shaft, and the aforesaid second shorter tubular housing tends to remain (during normal flight in which the craft is sustained by the power of the engine) substantially in a vertical plane including the axis through said tubular bracket of the longitudinally disposed tubular housing of the somewhat horizontally disposed drive shaft, which tends in flight to rotate at somewhat constant speed (by virtue of rotational interconnection of said drive shaft with the mounting shaft of said main sustaining rotor) regardless of whether the engine is operating at full power capacity, at only partial capacity, or not at all; means, located entirely inside the fuselage and forward of said tubular bracket, attached to the tubular housing pivotally mounted through said tubular bracket, whereby the pilot can oscillate pivotally said tubular housing freely through almost 180° and thereby can swing the auxiliary rotor suspended from said gear box rigidly attached to said longitudinally disposed tubular housing in the appropriate direction with respect to the vertical plane including the longitudinal axis of the fuselage that the weight of the auxiliary control rotor (pivotally mounted through said tubular bracket somewhat rigidly attached to the fuselage) will exert a torque around the longitudinal axis of the fuselage tending to preserve lateral stability of the aircraft in the same steering oscillation by the pilot of that tubular housing through said tubular bracket) of the longitudinally disposed tubular housing that disposes the axis of the rotating shaft mounting the blades of the auxiliary steering rotor at a suitable angle with respect to the vertical plane including the longitudinal axis of the fuselage that the horizontal vector force derived from the thrust of the blades of that auxiliary rotor will tend to move the tail of the aircraft in the opposite direction from that toward which the pilot wishes the nose of the fuselage to move around the vertical axis of the aircraft; tilt-sensitive means whereby pitch of the blades of said auxiliary tail rotor is varied collectively and on special occasions reversed (entirely independent of pitch adjusting means of the main sustaining rotor blades) to maintain any desired longitudinal attitude of the fuselage with respect to the horizon, irrespective of lateral swinging of the auxiliary rotor (with respect to the vertical plane including the axis of said long tubular housing in said bracket) through at arc of at least 60° in the process of steering the aircraft by the pilot, who for very short periods of time can swing said auxiliary rotor through almost 180° around said bracket axis, even though vertical lift by the auxiliary tail rotor cannot be maintained in such emergencies at the equal right and left greater angles of oscillation; and means whereby the pilot at his election instantaneously can adjust said tilt-sensitive mechanism controlling collective pitch of the blades of the auxiliary tail control rotor to vary the longitudinal tilt of the fuselage with respect to the horizon (irrespective of whether a gyro in said mechanism is operating effectively or not at all) and thereby can determine at any time the vertical lift of said auxiliary tail rotor (irrespective of very substantial pivotal oscillation of the mounting tubular housing in its tubular mounting bracket through about 60° to determine whether the aircraft will move forward or rearward, or vertically in response to tilting of the longitudinal tilting of the mounting shaft of the main sustaining rotor, whose axis is otherwise fixed with respect to the fuselage.

3. A rotary wing aircraft specified in claim 2 and more specifically employing in continued workable cooperative conjunction the following: a somewhat horizontally disposed generally cylindrical fuselage having substantially hemispherical end wall-tips of somewhat the same diameter as the generally cylindrical intermediate sections of the fuselage to which said hemispherical end walls are rigidly attached; at least two inverted U-shaped tubular fuselage frame members, one of which is located adjacent the vertical lateral plane at which the hemispherical rear end wall of the fuselage is joined to the generally cylindrical intermediate segment thereof, and another one of which is correspondingly located adjacent the hemispherical front end wall of the fuselage, which is supported by said inverted U-shaped frame members, whose upright parallel lower segments extend somewhat vertically through holes in the fuselage exterior wall at points of greatest width thereof and have their lower tips attached rigidly to parallel tubular segments of a generally longitudinally disposed landing framework, suitably spaced below the fuselage, having multiple joining cross members rigidly spacing said parallel tubular segments of the landing framework, whose rear slightly upward-tilted tips are somewhat farther spaced from each other rearward of the points at which the lower tips of the inverted U-shaped tubular fuselage frame members are rigidly attached to said parallel tubular landing frame segments; mounted suitably on the fuselage an engine whose drive shaft, provided with a conventional well known to the art overrunning clutch transmitting power in only one rotational direction as well as with a conventional (well known to the art) manually operable clutch, is in rotational connection with a somewhat cylindrical retainer mounting a beveled ring gear and being rotatably mounted in tapered roller bearing opposed assemblies mounted (on an axis perpendicular to the vertical plane including the longitudinal axis of the fuselage) in a central gear box somewhat rigidly fixed in the fuselage about midway between the hemispherical tips of the fuselage and adjacent the roof thereof, said ring gear retainer having bored through it a suitable cylindrical hole (on the same rotational axis) provided with axially disposed grooves in said somewhat cylindrical retainer for receiving axially splined inner adjacent tips of a pair of horizontally and laterally disposed drive shafts, which are inserted through corresponding right and left holes of suitable diameter in the sidewalls of the fuselage (located adjacent the edges of the laterally somewhat arcuate roof of the fuselage) and through respective right and left tubular housings (having vertical perforated annular flanges rigidly attached to the tips thereof) interposed between the correspondingly perforated walls of the fuselage and the respective sidewalls of said gear box, to each of which respectively said tubular housings of said substantially aligned drive shafts are rigidly bolted by said perforated flanges thereof, thereby rigidly spacing the fuselage sidewalls from each other and also preventing rotation of the tubular housings with respect thereto while simultaneously maintaining the position of said central gear box in the fuselage; and inversely corresponding very strong and almost rigid right and left outrigger framework of minimum weight mounted on each side of the said fuselage consisting of the following: an outer normally horizontally disposed lateral tubular drive shaft housing (substantially aligned with the rotational axis of the said ring gear retainer in the central gear box and with the opposed right and left drive shafts whose adjacent tips having axially disposed splines are suitably mounted therein with sufficient looseness of fit to prevent vibrational slapping of said shafts in their multiple antifriction bearing assemblies, if said outer horizontally disposed lateral drive shaft housings cannot be kept in perfect alignment), whose inner tip (having a vertical perforated annular flange rigidly attached thereto) is somewhat rigidly attached to the sidewall of the fuselage, and whose expanded outer tip (containing a suitable radial axial thrust antifriction bearing assembly) having a perforated vertical annular flange is bolted rigidly to an outside substantially closed gear box, to whose upper face is rigidly bolted the substantially horizontal annular flange of the expanded lower tip of an upright tubular housing of quite substantial length having an expanded upper tip in which is mounted an opposing axial thrust radial antifriction bearing assembly immediately below a suitable airfoil bladed rotor mounted on the upper tip of a shaft suitably mounted through said upright tubular housing in said pair of opposed bearing assemblies; a vertical bisected cylindrical mounting sleeve, whose respective approximate halves have perforated parallel flanges (integrally attached thereto) through whose corresponding holes in said flanges are inserted horizontal bolts, whose nuts on the threaded tips thereof mount the joined bisected sleeve somewhat rigidly around the upper half of the upright tubular housing, provided with a hole therein into which extends the tip of a stud bolt screwed through a corresponding hole in the outer half of said mounting sleeve, to whose opposed inner half is rigidly attached the upper tip of a diagonally disposed angle-bracing frame member, whose lower inner tip is rigidly attached to the above-mentioned outer horizontal lateral tubular housing intermediate the tips thereof and to the upper tip of a substantially aligned diagonally disposed tubular truss frame member situated below said horizontal tubular housing, to which also is somewhat rigidly attached the upper tip of said tubular truss member, whose lower tip is somewhat rigidly attached to the adjacent one of the said parallel tubular landing frame members about midway between the points of attachment thereto of the lower tips of the inverted U-shaped fuselage frame members; a rearwardly disposed tubular bracing member (diagonally disposed with respect to vertical as horizontal planes including the longitudinal axis of the fuselage as well as with respect to a vertical plane including the axes of the aforesaid upright tubular housings in which are mounted the rotor-mounting shafts) whose upper outer forward tip is attached somewhat rigidly to the aforesaid bisected cylindrical mounting sleeve, and whose inner lower rear tip is somewhat rigidly attached to the wall of the fuselage and its enclosed inverted U-shaped tubular frame member adjacent the plane at which the hemispherical rear tip of the fuselage is joined to the generally cylindrical intermediate section thereof at somewhat the same level as the aforesaid horizontal lateral tubular drive shaft housing; a second forwardly disposed slightly conical tubular bracing frame member whose upper outer rear tip is somewhat rigidly attached to the aforesaid mounting sleeve, and whose lower inner forward tip is somewhat rigidly attached to the wall of the fuselage and to its inverted U-shaped interior frame member (adjacent the plane at which the hemispherical forward wall-tip of the fuselage is joined to the generally cylindrical intermediate section thereof and at somewhat the same level as the aforesaid horizontal lateral tubular housing of the drive shaft), the aforesaid conical tubular tensional bracing member between two fixed points of attachment of the tips thereof being disposed longitudinally through and serving as the spar of a fixed wing airfoil, whose chord is somewhat greater at its inner lower and forward point of attachment to the fuselage than at its outer upper rear point of attachment to the fuselage than at its outer upper rear point of attachment to said cylindrical mounting sleeve somewhat rigidly attached to the upper half of the upright tubular housing, and whose leading edge is somewhat higher than the trailing edge of the airfoil at said point of attachment to the fuselage, from which point the angle of attack of the airfoil increases gradually toward the outer upper rear tip thereof, said long and slender fixed airfoil thus being somewhat streamlined in the downwash of air from the blades of the rotor mounted on the aforesaid shaft in the outrigger framework but also having some lift on the forward tip of the fuselage in case of quite substantial diminution of power of the engine during rapid forward translational flight, at which time the paired fixed airfoils under tension serve as small slender stabilizing vane wings by virtue of their having suitable sharp dihedral angle with respect to the vertical plane including the longitudinal axis of the fuselage and by virtue of their having a pronounced backsweep of their longitudinal axes approximating 30° from the vertical plane perpendicular to said longitudinal axis of the fuselage at the upright plane of juncture of the hemispherical front end wall-tip of the fuselage with the generally cylindrical intermediate section thereof; means rotationally interconnecting the paired rotor-mounting shafts with each other and with the overrunning clutch at times driven by the drive shaft of the engine and employing (in conjunction with each of the above specified outrigger frameworks on each side of the fuselage respectively) a large speed-reducing bevel gear, rigidly mounted on the lower tip of the rotor-mounting shaft in its respective outside gear box, whose teeth intermesh with the teeth of a smaller pinion bevel gear rigidly mounted in that same gear box on the outer tip of the longer said horizontally disposed drive shaft, mounted in suitable antifriction bearings in the substantially aligned tubular housings and having its axially splined inner tip slidably mounted in the above-described rotatable ring gear retainer; a cylindrical tubular crossmember whose tips are rigidly attached to the parallel longitudinally disposed tubular landing frame members beneath the fuselage (at right angles to said parallel landing frame members and adjacent their front tips), and which is provided with means spacing on the midsection thereof an easily detachable U-shaped clevice (pivotally oscillatable around said midsection) having suitable means of quickly attaching to (and detaching from) the parallel tips of said clevice the forward tip of a rearwardly downward sloping tubular tongue member, to whose rear tip is rigidly attached a small truck having a somewhat horizontally disposed mounting member of a laterally disposed axle, on whose outer tips respectively are mounted suitable bearings of a pair of small wheels mounting pneumatic rubber tires, which thereby are made hingeable on the midsection of the aforesaid cylindrical tubular landing framework crossmember located beneath the front quarter of the fuselage, which on landing of the aircraft is supported in part by said small truck, on whose horizontally disposed axle mounting member rests a stout coiled compression spring, whose upper tip presses against the bottom of said fuselage, and which is loosely mounted around an upright cylindrical shaft of varying diameters, whose respective upper and lower threaded tips have mounted thereon washers and nuts of suitable size preventing escape of said cylindrical shaft of suitable length from respective loose fitting round holes in the said horizontally disposed axle mounting member of the small truck and in the bottom wall of the fuselage, although removal of said nuts and washers from the tips of the mounting shaft and removal of the aforesaid clevice from the mounting cylindrical tubular crossmember of the landing framework makes it easy to strip the entire hingeably mounted truck from the aircraft to reduce weight at the front tip of the fuselage for special emergency operations; a pair of doors hingeably mounted and closing a somewhat polygon-shaped opening (extending almost from ceiling to floor of the fuselage) in the somewhat hemispherical front end wall-tip of the fuselage, below which (on election for special occasions, such as the recovery of a body from the surface of a body of water) is installed in a few minutes a suitable auxiliary forwardly extending framework (on which to mount an ambulance stretcher, made largely of net material) comprising a laterally disposed horizontal tubular cross member of suitable length, to whose tips are rigidly attached diagonally disposed horizontal tubular frame members having rigidly attached to their respective rear tips short cylindrical rods slidably installed in the respective forward tips of the longitudinally disposed parallel main tubular landing frame members, which thus on occasion rigidly mount the forward extending normally somewhat horizontal auxiliary framework of suitable width (for the special job such as recovering a body from the surface of a body of water) having a pair of parallel slightly upturned extreme forward tubular projections, to whose forward tips respectively are securely attached a pair of diagonally disposed tubular bracing members, whose upper adjacent tips are attached to the front tip of the fuselage about halfway between the floor and roof thereof, thereby serving as truss members to lift on the said auxiliary forwardly extended framework more than the weight of one man, when the pitch of the blades of the auxiliary tail rotor of the aircraft is reversed collectively in response to the tilt-sensitive control mechanism actuating the valves of the hydraulic pressure control mechanism, which likewise is under control of the pilot simultaneously by his periodical operation of his fuselage tilt-control lever operating the larger other pressure fluid valve (according to his adjustment and fixation of said lever with respect to its fixed quadrant), although under such circumstances the pilot in recovering a body from the water has to pay attention only to his steering of the aircraft from side to side by means of his steering lever and to his control of engine speed and power (to secure vertical movement of the aircraft under varying load) by means of a foot-controlled throttle, since the side-by-side mounted main sustaining rotors have their precessional tendencies as gyroscopes (transferred from the blades to their mounting shafts respectively by means of the resiliently flexible connecting means) as well as their respective torques on the fuselage completely canceled by each other respectively and irrespective of any variations of torque on the shafts of the main sustaining rotors by the drive shaft of the engine in response to the pilot's throttle adjustments on the engine.

4. A rotary wing aircraft specified in claim 1 having a fuselage on which are rotatably mounted a pair of main sustaining rotors turning in opposite directions and mounted side-by-side at equal distances from the vertical plane containing the longitudinal axis of the fuselage on upright shafts rotationally connected, by means of suitable interconnecting gears and shafts mounting said gears respectively, with each other and with the rotationally free segment of an overrunning clutch driven in one rotational direction at times by an engine's driveshaft, said aircraft also employing in continued workable cooperative conjunction a pressure fluid pump as specified in claim 1 driven at somewhat constant speed, by a shaft in rotational connection with the mounting shafts of said side-by-side mounted main sustaining rotors, and furnishing fluid in suitable amount at suitable somewhat constant pressure to the inlet of a cylindrical cavity in the body member of a control valve assembly mechanism having a pair of cylindrical valve members (pivotally oscillatable in said cylindrical cavity), one of which is controlled by tilt-sensitive means and the other of which is pivotally adjustable manually by the pilot, but both of which are pivotally oscillatable on the same axis, which is parallel to the longitudinal axis of the fuselage (rather than perpendicular to the vertical plane including the longitudinal axis of the fuselage, as was specified for the cylindrical cavity and valves mounted therein for controlling pitch of the auxiliary tail rotor in claim 1), whose lateral stability and tilt are controlled by a pressure fluid actuated cylinder (having the interior compartments in the respective ends thereof connected by suitable flexible conduits with the pair of opposing outlets from the body member of said pair of cylindrical valves, just as specified in claim 1) regulating collective pitch of the blades of one of the side-by-side mounted main sustaining rotors.

5. A rotary wing aircraft employing in continued workable cooperative conjunction: a fuselage body member on which are rotatably mounted a pair of main sustaining rotors turning in opposite directions (and having inverse right and left airfoil blades corresponding in chord configuration to said rotational directions) mounted side-by-side, at equal distances from the vertical plane containing the longitudinal axis of the somewhat horizontally disposed fuselage, on upright shafts rotationally interconnected (by means of suitable interconnecting gears and shafts mounting said gears respectively) with each other and with the rotationally free segment of an overrunning clutch driven in one direction of rotation at times by the drive shaft of an engine, said aircraft employing as a primary means maintaining lateral stability of the craft in flight a rotor, mounted on each of the said pair of rotatably mounted mounting shafts respectively, having: a primary hub segment rigidly mounted on the upper tip of its respective mounting shaft; a secondary hub segment, providing pivotal cantilever mounting thereon of its blades, flexibly mounted on the primary hub segment by means permitting oscillation of the secondary hub segment with respect to the primary hub segment within limits on an axis perpendicular to the rotational axis of the mounting shaft by which it is rotated, and means gradually and progressively limiting such oscillation (with respect to the primary hub member and its mounting shaft) that the gradual means of limiting oscillation does not cause excessive vibration of the mounting shaft and the pylon in which said shaft is mounted in suitable opposed antifriction radial-axial thrust bearing assemblies, but at the same time has sufficient stiffness of its resiliency that, in conjunction with the centrifugal force of the blades rotating at sufficiently high speed, the gyroscopic tendencies of those rapidly rotating blades are imparted gradually during each phase of their orbits to the respective rotating mounting shafts, thereby maintaining lateral stability of the aircraft, even though (as a result of the rotation of said paired shafts in opposite directions) those shafts respectively have their lateral precessional tendencies (exerted on the means mounting them on the fuselage), as well as their reactionary torques resulting from power applied in varying amounts by the drive shaft of the engine in ascending and descending, completely cancelled by means of the fuselage on which those shafts are rotatably mounted, whenever the longitudinal tilt of the fuselage with respect to the horizon is varied by the pilot by means at his disposal.

6. A rotary wing aircraft specified in claim 5 in which the secondary hub member attached to the primary hub member by resiliently flexible means is universally oscillatable on multiple axes with respect to the rotatable shaft on whose upper tip it is mounted at approximately the same level as the primary hub member (rigidly attached to said shaft), around which the secondary hub member is suitably spaced and consists of an outer substantially rigid annular member, on which is provided pivotal substantially cantilever mounting of cylindrical roots (at least almost in alignment with the respective longitudinal axis of the airfoil blade to which each is respectively attached almost but not quite rigidly) of more than two blades rotating in substantially the same orbital path around the mounting shaft only very slightly from a plane perpendicular to the rotational axis of said mounting shaft by which said blades are rotated by an engine in normal powered flight.

7. A substantially foolproof vertical lift aircraft, capable of operation by any sensible person who can operate an automobile, operable by a skilled pilot in reverse direction translational flight at speeds up to 100 miles per hour, operable with complete safety in forward translational flight at speeds up to well in excess of 200 miles per hour, and employing in continual workable cooperative conjunction the following: a generally cylindrical fuselage having front and rear tips suitably streamlined for horizontal flight, in which said fuselage is disposed at generally horizontal posture; aligned tubular horizontal drive shaft housings, projecting laterally from the fuselage in the upper one-fourth thereof, having attached fixedly to the respective outer tips thereof gear boxes, to whose respective upper faces are fixedly attached upright tubular cylindrical housings of contrarotating shafts, mounted in suitable antifriction bearings, on whose respective lower tips are secured bevel gears whose speed reduction teeth mesh with the teeth of smaller gears secured on the outer tips of drive shafts rotatably mounted through the aligned horizontal lateral tubular housings fixedly attached to the fuselage, in which is mounted an engine having its drive shaft provided with a manually operable clutch as well as a conventional overrunning clutch rotationally interconnected with the drive shafts in the horizontal lateral tubular housing, which form the primary components of right and left open frameworks, permitting almost free passage of air therethrough in all directions, fixedly attached to the sides of the fuselage and providing with absolute minimum weight the maximum stiffness but not quite rigidity with respect to the fuselage of the mounting of said upright tubular housings of the contrarotating rotor-mounting shafts, on the upper tips of which are mounted inversely constructed right and left rotor hubs each of which respectively employs: an inner segment, fixedly attached to the upper tip of its shaft slightly above the antifriction bearing assembly mounted in the expanded upper tip of the upright tubular cylindrical housing, and an outer annular segment of slightly larger inner diameter than the inner segment, around which it is rotatable within fixed limits of several degrees, and with respect to which it is universally oscillatable within gradually restricting limits of a few degrees, provided by a resiliently flexible mounting on the inner segment of the almost rigid outer annular segment, in tubular cylindrical brackets of which are mounted at least three airfoil blades, whose respective cylindrical roots are disposed at least almost in alignment with their longitudinal axes and have at least almost cantilever pivotal mountings in their respective brackets, in which each of the blade roots are pivotal within fixed equal limits of a few degrees, thereby permitting variation of the angle of attack of each of the rotor blades cyclically as well as collectively in response to amount of torque of the engine on the rotor-mounting shaft at any time exerted by a frame, fixedly attached to the said mounting shaft immediately below the inner segment of the hub attached thereto, having fingers, equally spaced around said frame at equal distances from the mounting shaft, on which are mounted the rotationally rear tips of the same number of coiled compression springs, whose rotationally forward tips are mounted respectively on fingers attached fixedly to the blade roots, which simultaneously are rotated around the rotational axis of the mounting shaft by the expansion forces of the combined coiled compression springs, which however act individually also to permit individual cyclical variations in the angles of attack of the rotating blades, which go into immediate aerodynamic autorotation on decreases of torque of the engine to such extent that the rotors will not support the craft without slowly descending.

8. A rotary winged aircraft specified in claim 7 having substantially fixedly mounted in the rear one third of the fuselage a tubular cylindrical bracket, projecting rearwardly and upwardly therefrom at a suitable angle with respect to the longitudinal axis of the fuselage less than 45°, through which bracket is pivotally oscillatable within a range up to 180° a tubular cylindrical housing provided with suitable antifriction bearings, in which rotates a drive shaft, on the front tip of which is secured a beveled gear rotationally interconnected by suitable gear gears and shafts with the paired rotors mounted on the outer tips of the open outrigger frameworks, and on the rear tip of which is secured a second beveled gear rotating inside a gear box, fixedly attached to the rear end of the tubular housing that is oscillatable within said fixed bracket and having fixedly attached to the lower side thereof a second tubular housing of another drive shaft of shorter length, on the upper tip of which is secured a bevel gear whose teeth mesh with those of the other bevel gear in said gear box, and on the lower tip of which is mounted a suitable control rotor having airfoil blades of suitable relatively shorter length rotationally interconnected at all times with the paired rotors mounted on the outrigger frameworks, which control rotor, having blades whose angles of attack are adjustable and also reversible by tilt-sensitive means in the fuselage as well as by means at the handy election of the pilot to determine whether he wants the craft tilted to travel translationally forward to rearward or vertically, serves to control longitudinal posture of the fuselage, when the rotational axis of the shaft mounting the control rotor on its lower tip is in the vertical plane containing the oscillatory axis of the bracket in the rear segment of the fuselage through which the longitudinally disposed tubular drive shaft housing is oscillatable by means at the convenient disposal of the pilot, who can oscillate said housing and thereby the gear box fixedly attached to the rear end thereof to swing the control rotor from side to side with respect to said vertical plane beneath the axis of said tubular cylindrical housing through said fixed bracket, thereby steering the aircraft by shifting laterally the thrust of the normally lifting tail control rotor from its normal vertical posture, to which it will tend to fall by virtue of the weight of the parts attached to the lower side of said rear gear box, and simultaneously tending, by shifting laterally in the opposite direction the weight of the attachments secured to the lower side of said rear gear box, to augment lateral stability and banking of the aircraft, whose primary means of preserving lateral stability in the gyroscopic action of the substantially cantilever mounted blades of the side-by-side mounted contrarotating rotors mounted on substantially parallel shafts on the outrigger frameworks, to which lateral stability is imparted by said gyroscopic forces on the resilient attachment of the outer annular components of those paired right and left rotor hubs to their respective inner components fixedly attached to the upper tips of those mounting shafts in said open outrigger frameworks.

9. A vertical lift aircraft employing in continually workable cooperative conjunction the following features: a long fuselage at least almost but not necessarily absolutely horizontally disposed in flight, whether it be hovering or moving horizontally in translational flight; a pair of inversely constructed right and left open outrigger frameworks, fixedly mounted laterally at the sides of said fuselage in the rear half thereof, said open frameworks being constructed with minimum weight affording maximum sturdiness but not quite rigidity for rotatably mounting with little vibration on the outer upper tips thereof upright contrarotating shafts, on the upper respective tips of which are mounted, at equal distances from the vertical plane containing the longitudinal axis of the fuselage, inversely corresponding right and left hubs for mounting thereon respectively right and left designed airfoil rotors, whose relatively long primarily weight-sustaining blades of equal length are staggered with respect to blades of the same number mounted in the opposite hub, so that the orbital paths of the respective blades of the two said rotors may overlap to some extent, although it is not absolutely necessary that the outer tips of the blades of those two inversely paired rotors reach inwardly to the vertical plane including the longitudinal axis of the fuselage, with respect to which the tips of the blades of said paired rotors travel forward in their orbital phases adjacent said fuselage, beside which air is free to pass upward or downward as well as horizontally through said paired open frameworks with as much freedom as possible for such sturdy outriggers; a second pair of inversely constructed almost completely open outrigger frameworks, mounted laterally at the sides of said fuselage in the forward one-third thereof, said at least almost open frameworks being constructed with minimum weight to afford maximum stiffness but not quite rigidity for rotatably mounting on the outer tips thereof upright contrarotating shafts, on the upper respective tips of which are mounted, at equal distances from the vertical plane containing the longitudinal axis of the fuselage but at appreciably less equal distances from said vertical plane than the equal distances at which the first said inversely paired rotors are mounted on the outer tips of their respective right and left outrigger frameworks mounted on the sides of the rear half of said fuselage, two inversely corresponding right and left hubs for mounting thereon respectively right and left designed airfoil bladed rotors having rotationally staggered blades of equal suitable length rotating in opposite directions from the rotational directions of the respective rotors mounted on the rear half of said fuselage, so that in forward translational flight, employing all four of said rotors mounted on shafts rotationally interconnected with each other and with the freewheeling segment of a driving overrunning clutch attached to the drive shaft of a prime-mover engine mounted in the fuselage, a part of the downdraft of air from blades of each one of the forward mounted pair of rotors will tend to detract to some extent from the excessive lift of the blades of the rear pair of rotors during the phases of the orbits of those blades of the rear mounted pair of rotors adjacent each other and the fuselage, to the rear half of which their respective wider open outrigger frameworks are fixedly attached; and means mounted in the rear tip of the fuselage tending to control longitudinal posture of the fuselage with respect to the horizon at the election of the pilot as well as enabling the pilot for steering purposes to rotate the rear tip of the fuselage around the vertical axis of the craft, which requires no horizontal countertorque force on the fuselage to compensate torque of the driving engine on the respective four rotors, which are contrarotated in pairs so that torque of the engine's drive shaft on one of the rotationally interconnected rotors is compensated by torque of the engine on the inversely paired rotor of the same size turning at the same speed in the opposite rotational direction on the other side of the fuselage.

10. A rotary-winged aircraft employing in continued workable and safe cooperative conjunction the following features: a generally horizontally disposed fuselage having a more or less cylindrical midsection with front and rear tips suitably streamlined to facilitate rapid horizontal flight of the craft having mounted at the sides of the fuselage and fixedly attached thereto uprightly disposed paired tubular cylindrical housings, in each of which there is rotatably mounted, in axial-radial antifriction bearing assemblies at each expanded tip thereof, a shaft having a suitable airfoil-bladed rotor on the upper tip thereof, the axes of said contrarotating rotor-mounting shafts being disposed symmetrically with respect to and at equal distances from the vertical plane including the longitudinal axis of the fuselage in an upright lateral plane at right angles to said longitudinal axis of the fuselage at the point slightly forward of the gravitational center of the aircraft; a prime-mover engine located in the fuselage having its drive shaft, provided with an overrunning clutch operating in only one rotational direction in addition to a primary clutch operable at the election of the operating pilot, rotationally interconnected, through suitable tubular housing provided with means for retaining lubricants, by means of shaft and gear mounted thereon with a speed-reducing gear rotatably mounted in a gear box fixedly mounted in the fuselage adjacent the arcuate roof thereof and midway between the axes of the paired contrarotating uprightly disposed shafts, on whose upper tips are mounted the airfoil-bladed rotors, whose blades retreat rearwardly above the fuselage during forward translational flight, and on whose lower tips are fixedly mounted speed reduction gears rotationally interconnected by means of shaft and gear rotatably mounted through suitable housings with the overrunning clutch of the drive shaft of the engine; and most particularly including a tail rotor assembly including substantially the following: a relatively long tubular cylindrical bracket at least almost fixedly attached to the fuselage with the longitudinal axis of said tubular bracket being substantially in a vertical plane including the longitudinal axis of the fuselage and extending upwardly and rearwardly therefrom at a suitable angle between vertical and horizontal less than 45° from the horizon in forward translational flight; a tubular cylindrical housing extending through said tubular bracket, in which said tubular cylindrical housing of a drive shaft extending therethrough is pivotally oscillatable around said axis of said bracket by as much as 180° by means of a steering lever device fixedly attached to the forward tip of said tubular housing and conveniently operable almost instantaneously by the pilot in the fuselage, in which there is fixedly attached to the rear face of the previously mentioned centrally located gear box, enclosing the speed-reducing gear rotationally interconnected with the paired upright contrarotating rotor-mounting shafts, the expanded forward tip of a shorter and smaller diameter aligned second tubular housing, around which, as well as through the previously mentioned fixed tubular cylindrical bracket, is pivotally oscillatable the longer first said tubular cylindrical housing of the longitudinally disposed still longer drive shaft, on whose forward tip inside the central gear box is secured a bevel gear rotationally interconnecting by means of shafts and gears mounted thereon with the paired upright rotor-mounting shafts of the sustaining rotors, and on the rear tip of which there is secured another bevel gear inside a rear gear box fixedly attached to the rear end of the longer said tubular cylindrical drive shaft housing, in the rear tip of which is a suitable radial-axial antifriction bearing assembly rotatably mounting the rear tip of said longer longitudinally disposed drive shaft, whose forward tip is rotatably mounted in a suitable radial-axial antifriction bearing assembly installed in the expanded forward tip of the smaller shorter second said fixed tubular housing of said longitudinally disposed drive shaft of a tail rotor rotationally interconnected with the paired sustaining rotors by means of the longitudinally disposed drive shaft meshing with the teeth of a larger speed-reducing bevel gear inside the said rear gear box and secured on the upper tip of another rotor-mounting shaft, disposed at substantially right angles to the oscillatory axis of the longitudinally disposed tubular cylindrical housing in its fixed bracket and thereby at a suitable large angle from vertical by virtue of the fact that said tail rotor-mounting shaft is rotatably mounted in suitable radial-axial antifriction bearing assemblies installed in the expanded upper and lower tips of a tubular cylindrical housing, whose expanded upper tip is fixedly attached to the bottom wall of the rear gear box fixedly attached to the rear end of the longitudinally disposed tubular cylindrical housing oscillatable in said fixed tubular bracket at said angle less than 45° from horizontal posture; suitable annular washers conveniently made of felt installed around each of the drive shafts inside the respective gear boxes and tubular cylindrical housings attached thereto and enclosing the drive shafts to prevent excessive leakage therefrom of gear and bearing lubricants installed in said gear boxes; means whereby the pilot conveniently and substantially instantaneously can steer the craft from side to side by oscillating the long longitudinally disposed tubular housing in its substantially fixed tubular cylindrical bracket, thereby swinging the blades of the tail rotor, mounted on the lower tip of the shaft mounted through the tubular housing fixedly attached to the bottom of the rear gear box, beneath said oscillatory axis of said drive shaft housing in said bracket through arcs up to 90°, for short periods of time in special emergency circumstances, from the vertical plane including the axes of said continually rotating shafts, when the craft is not being steered around its vertical axis by the pilot, and simultaneously thereby, in the same said steering process controlling a lateral thrust component of the usual lift of the tail control rotor, when its rotational axis is swung from the normal posture in a vertical plane including said oscillator axis of said fixed bracket, shifting the weight of the tail rotor assembly attached to the bottom of the rear gear box in the direction required to augment lateral control of the craft by the pilot in the steering process; and means whereby the pilot varies collectively the angles of attack of the blades of the tail rotor and thereby controls longitudinal posture with respect to the horizon of the aircraft specified above.

11. A rotary winged aircraft substantially as specified in claim 10 in which there is mounted in the fuselage a hydraulic pump driven continually in flight, regardless of whether the engine may be operating at the moment, by means of one of the shafts rotationally interconnected to the shafts mounting the paired contrarotating right and left sustaining rotors, said pump being employed to circulate a suitable hydraulic fluid under suitable controlled pressure to a cylindrical valve provided with proper ports therethrough and rotationally controlled in oscillation by tilt-sensitive means, whereby such fluid under pressure is supplied through suitable flexible conduits alternately to opposed sides of a diaphragm in the midsection of a cylinder axially reciprocable within limits whereby is controlled collectively the angles of attack of the blades of the tail rotor to vary and also reverse the axial thrust of said tail rotor, thereby controlling the longitudinal posture of the fuselage with respect to the horizon regardless of the pilot's pivotal swinging in his steering operation of the tail rotor beneath the axis of the longitudinally disposed tubular housing through the fixed tubular bracket by as much as 30° on each side from the vertical plane including said pivotal axis of the said tubular bracket fixed with respect to the fuselage, in which the aforesaid hydraulic control valve operates in direct association with a second snugly fitting larger telescoping tubular cylindrical control valve, also having proper ports therethrough for conveying said hydraulic fluid thereby and mounted on the same oscillatory axis as the telescoped valve segment whose rotational posture is controlled by tilt-sensitive means, oscillatable in a snugly fitting cylindrical cavity in a valve-mounting body member, fixedly mounted within the fuselage, in which there is, in addition to the snugly fitting holes provided for installation of the cylindrical stems of the two aligned pivotally oscillatable control valves, a conduit leading from the conventional hydraulic pump, well known to the art and provided with the usual spring actuated overflow valve regulating pressure of the hydraulic fluid maintained in said conduit in the body member, to a conduit in the larger telescoping tubular cylindrical control valve, subject to pivotal oscillatory adjustment by the pilot at his immediate election by his fixing on a quadrant a lever attached to the horizontally disposed stem of said valve whereby he determines the desired longitudinal tilt of the fuselage for determining whether the craft will move forward or backward or otherwise, and thereby to a diverging conduit of the hydraulic fluid through the tilt-sensitive smaller telescoped cylindrical valve member, whose diverging outlets suitably spaced from each other alternately connect to one or the other of a pair of conduits through the wall of the larger telescoping tubular cylindrical control valve, whose outlets from said paired conduits through the wall of said larger valve remain in continual contact with conduits from the cylindrical cavity in said fixed body member through the wall of that body member provided with nipples in conjunction with said outlets connected by flexible conduits to the respective fluid inlets and outlets of the said cylinder collectively controlling pitch of the blades of said tail rotor, thereby determining the exact amount of thrust of said tail rotor necessary to provide, irrespective of the pilot's swinging of the tail rotor beneath the axis of the fixed mounting bracket to change direction of thrust of the tail rotor in his normal steering process, a vertical component force from the tail rotor necessary to provide the exact longitudinal tilt of the fuselage with respect to the horizon elected by the pilot at any time by virtue of the determination through which one of the two outlets of the divergent conduit through the inner telescoped valve will flow the circulating hydraulic fluid to one of the two respective inlets-outlets adjacent each end of the cylinder regulating collectively the angles of attack of the blades of the tail rotor in direct response to any necessary flow of the circulating fluid through the two completely cooperative valves, one of which is controlled by tilt-sensitive means, and the other one of which is controlled by the pilot, who also may in emergency assume control of the tilt-sensitive valve at any time to determine directly the flow of the circulating fluid necessary to regulate pitch of the blades of the tail rotor and thereby determine longitudinal posture of the fuselage, when desired for any possible reason, without any need for alteration of the hydraulic control mechanisms.

12. A rotary-winged aircraft substantially as specified in claim 10, in which the airfoil blades of each of the paired contrarotating sustaining rotors are rotationally staggered by a suitable number of degrees to make them intermeshing but nonconflicting with the corresponding blades of the other paired rotor, equally spaced from the vertical plane including the longitudinal axis of the generally cylindrical midsection of the fuselage having a laterally arcuate roof, over which the outer segments of said blades rotate rearwardly during forward translational flight of the aircraft.